(12) United States Patent
Horiuchi et al.

(10) Patent No.: US 10,763,684 B2
(45) Date of Patent: Sep. 1, 2020

(54) SECONDARY BATTERY CHARGING METHOD, CHARGING CONTROL APPARATUS, AND SECONDARY BATTERY

(71) Applicant: MURATA MANUFACTURING CO., LTD., Kyoto (JP)

(72) Inventors: Yuto Horiuchi, Kanagawa (JP); Yoshifumi Shimizu, Kanagawa (JP); Masatomo Tanaka, Tokyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/571,613

(22) PCT Filed: May 13, 2016

(86) PCT No.: PCT/JP2016/064283
§ 371 (c)(1),
(2) Date: Nov. 3, 2017

(87) PCT Pub. No.: WO2017/022292
PCT Pub. Date: Feb. 9, 2017

(65) Prior Publication Data
US 2018/0152039 A1    May 31, 2018

(30) Foreign Application Priority Data

Aug. 6, 2015  (JP) .................................. 2015-155738
Apr. 19, 2016 (JP) .................................. 2016-083477

(51) Int. Cl.
*H02J 7/00* (2006.01)
*H02J 7/14* (2006.01)
(Continued)

(52) U.S. Cl.
CPC ....... *H02J 7/007184* (2020.01); *H01M 10/44* (2013.01); *H02J 7/00718* (2020.01);
(Continued)

(58) Field of Classification Search
USPC ....... 320/164, 107, 162, 132, 134, 137, 152, 320/128, 141
See application file for complete search history.

(56) References Cited

U.S. PATENT DOCUMENTS 5,606,240 A    2/1997 Kokuga et al.
5,710,506 A *  1/1998 Broell ................... H02J 7/0073
                                              320/145
(Continued)

FOREIGN PATENT DOCUMENTS

EP    2276139       1/2011
JP    6-315234 A    11/1994
(Continued)

OTHER PUBLICATIONS

Official Action (no translation available) for Japanese Patent Application No. 2017-532399, dated Apr. 9, 2019, 3 pages.
(Continued)

*Primary Examiner* — Alexis B Pacheco
(74) *Attorney, Agent, or Firm* — Sheridan Ross P.C.

(57) ABSTRACT

In a secondary battery charging method, constant current charging is performed until a first predetermined voltage $V_0$ is attained, constant voltage charging is then performed at the first predetermined voltage $V_0$, the first constant voltage charging is completed when a charge current becomes $(I_n-\Delta I_n)$ from $I_n$, and then n is incremented by one; and constant voltage charging is performed at a voltage $V_n = V_{n-1}+\Delta V_n$, a step of completing the n-th constant voltage charging when the charge current becomes $(I_n-\Delta I_n)$ from $I_n$ is repeated by incrementing n by one, and the N-th constant voltage charging in which a value of the voltage $V_n$ reaches a second predetermined voltage $V_N$ ($>V_0$) is completed to terminate the constant voltage charging.

18 Claims, 21 Drawing Sheets

(51) Int. Cl.
  *H01M 10/44*   (2006.01)
  *H02J 7/02*    (2016.01)
  *B60L 53/20*   (2019.01)
  *H01M 10/0525* (2010.01)
(52) U.S. Cl.
  CPC ............... *H02J 7/02* (2013.01); *B60L 53/20* (2019.02); *H01M 10/0525* (2013.01)

(56) References Cited

U.S. PATENT DOCUMENTS

| | | | | |
|---|---|---|---|---|
| 6,275,006 | B1* | 8/2001 | Koike | H02J 7/0073 320/125 |
| 2009/0104510 | A1* | 4/2009 | Fulop | H01M 2/30 429/50 |
| 2011/0037438 | A1* | 2/2011 | Bhardwaj | H02J 7/0073 320/152 |
| 2011/0199055 | A1* | 8/2011 | Burchardt | H01M 10/44 320/148 |
| 2012/0086406 | A1 | 4/2012 | Maeagawa et al. | |
| 2012/0200266 | A1* | 8/2012 | Berkowitz | H01M 10/44 320/139 |
| 2013/0335034 | A1* | 12/2013 | Suzuki | H01M 4/525 320/160 |
| 2014/0347059 | A1* | 11/2014 | Sato | H01M 10/48 324/430 |
| 2016/0190843 | A1* | 6/2016 | Yang | H02J 7/0052 320/107 |
| 2017/0338666 | A1* | 11/2017 | Christensen | H02J 7/0021 |
| 2017/0352926 | A1* | 12/2017 | Kanomata | H01M 10/42 |

FOREIGN PATENT DOCUMENTS

| | | |
|---|---|---|
| JP | 2007-151261 A | 6/2007 |
| JP | 2008-220121 A | 9/2008 |
| JP | 2010-252474 A | 11/2010 |
| JP | 2011-024412 | 2/2011 |

OTHER PUBLICATIONS

International Search Report prepared by the Japan Patent Office dated May 6, 2016, for International Application No. PCT/JP2016/061934.
Extended European Search Report for European Patent Application No. 16832572.8, dated Sep. 20, 2018, 8 pages.
Official Action (no translation available) for Japanese Patent Application No. 2017-532399, dated Nov. 5, 2019, 3 pages.
Official Action (no translation available) for Korean Patent Application No. 10-2017-7031564, dated Apr. 20, 2020, 6 pages.
Office Action (no translation available) for Chinese Patent Application No. 201680025613.8, dated May 18, 2020, 12 pages.

* cited by examiner

SECONDARY BATTERY CHARGING METHOD, CHARGING CONTROL APPARATUS, AND SECONDARY BATTERY

CROSS REFERENCE TO RELATED APPLICATIONS

This application is a national stage application under 35 U.S.C. 371 and claims the benefit of PCT Application No. PCT/JP2016/064283 having an international filing date of 13 May 2016, which designated the United States, which PCT application claimed the benefit of Japanese Patent Application No. 2015-155738 filed 6 Aug. 2015 and Japanese Patent Application No. 2016-083477 filed 19 Apr. 2016, the disclosures of which are incorporated herein by reference in their entirety.

TECHNICAL FIELD

The present disclosure relates to a secondary battery charging method, a charging control apparatus, and a secondary battery.

BACKGROUND ART

With widespread of portable electronic apparatuses and the like, lithium ion secondary batteries are regarded as important devices as power sources therefor. Further, with widespread of smartphones and wearable instruments in recent years, high safety, high life span, high energy density, and the like are required in the lithium ion secondary batteries. In addition, charging the lithium ion secondary batteries in a short time while degradation in capacity at the time of long-term use (cycle degradation) is suppressed becomes an important problem.

In this regard, as a charging method for a lithium ion secondary battery of the related art, there are used methods such as a constant current and constant voltage method (CC-CV method) in which charging is started at a constant current and charging is performed at the time point of reaching a predetermined voltage while a constant voltage is held; a multi-stage charging method in which charging is started at a constant current and charging is performed by lowering a current value stepwise at the time point of reaching a predetermined voltage; and a stepwise charging method in which charging is started at a constant current, supplying current is stopped at the time point of reaching a predetermined voltage, and then charging is intermittently repeated.

Further, for example, in a charging method disclosed in Japanese Patent Application Laid-Open No. 2011-024412, a lithium ion secondary battery is charged fast using a variable charge-profile.

CITATION LIST

Patent Document

Patent Document 1: Japanese Patent Application Laid-Open No. 2011-024412

SUMMARY OF THE INVENTION

Problems to be Solved by the Invention

In the charging method for a lithium ion secondary battery of the related art, in a case where a charging time is tried to be shortened, cycle degradation may occur. Further, in a case where cycle degradation is tried to be suppressed, a problem arises in that a charging time is lengthened. The charging method disclosed in Japanese Patent Application Laid-Open No. 2011-024412 uses a variable charge-profile so that charging control becomes complicated.

Therefore, an object of the present disclosure is to provide a secondary battery charging method capable of easily achieving shortening of a charging time and/or suppressing of cycle degradation regardless of a simple charging control method, a charging control apparatus suitable for execution of the secondary battery charging method, and a secondary battery in which shortening of a charging time and/or suppressing of cycle degradation can be easily achieved.

Solutions to Problems

To attain the above-described object, according to a first aspect of the present disclosure, there is provided a secondary battery charging method in which constant current charging is performed until a first predetermined voltage $V_0$ is attained, constant voltage charging is then performed at the first predetermined voltage $V_0$, the first constant voltage charging is completed when a charge current becomes $(I_n - \Delta I_n)$ from $I_n$, and then n is incremented by one, and constant voltage charging is performed at a voltage $V_n = V_{n-1} + \Delta V_n$, a step of completing the n-th constant voltage charging when the charge current becomes $(I_n - \Delta I_n)$ from $I_n$ is repeated by incrementing n by one, and the N-th constant voltage charging in which a value of the voltage $V_n$ reaches a second predetermined voltage $V_N$ ($>V_0$) is completed to terminate the constant voltage charging.

To attain the above-described object, according to a second aspect of the present disclosure, there is provided a secondary battery charging method in which when a value of a constant current in constant current charging is regarded as $I_0$, constant current charging is performed by combining a constant current value $k_1 \cdot I_0$ (provided that, $0.4 < k_1 < 1$) and the constant current value $I_0$, and then constant voltage charging is performed.

To attain the above-described object, according to the first aspect of the present disclosure, there is provided a charging control apparatus configured to control charging of a secondary battery, the charging control apparatus performing, on the secondary battery, a process of:

performing constant current charging until a first predetermined voltage $V_0$ is attained, then performing constant voltage charging at the first predetermined voltage $V_0$, completing the first constant voltage charging when a charge current becomes $(I_n - \Delta I_n)$ from $I_n$, and then incrementing n by one, and performing constant voltage charging at a voltage $V_n = V_{n-1} + \Delta V_n$, repeating a step of completing the n-th constant voltage charging when the charge current becomes $(I_n - \Delta I_n)$ from $I_n$ by incrementing n by one, and completing the N-th constant voltage charging in which a value of the voltage $V_n$ reaches a second predetermined voltage $V_N$ ($>V_0$) to terminate the constant voltage charging.

To attain the above-described object, according to the second aspect of the present disclosure, there is provided a charging control apparatus configured to control charging of a secondary battery, the charging control apparatus performing, on the secondary battery, a process of:

when a value of a constant current in constant current charging is regarded as $I_0$, performing constant current charging by combining a constant current value $k_1 \cdot I_0$ (provided that, $0.4 < k_1 < 1$) and the constant current value $I_0$, and then performing constant voltage charging.

To attain the above-described object, according to the first aspect of the present disclosure, there is provided a secondary battery
on which a process of performing constant current charging until a first predetermined voltage $V_0$ is attained, then performing constant voltage charging at the first predetermined voltage $V_0$, completing the first constant voltage charging when a charge current becomes $(I_n - \Delta I_n)$ from $I_n$, and then incrementing n by one, and
performing constant voltage charging at a voltage $V_n = V_{n-1} + \Delta V_n$, repeating a step of completing the n-th constant voltage charging when the charge current becomes $(I_n - \Delta I_n)$ from $I_n$, by incrementing n by one, and completing the N-th constant voltage charging in which a value of the voltage $V_n$ reaches a second predetermined voltage $V_N$ ($>V_0$) to terminate the constant voltage charging, is performed.

To attain the above-described object, according to the second aspect of the present disclosure, there is provided a secondary battery
on which a process of, when a value of a constant current in constant current charging is regarded as $I_0$, performing constant current charging by combining a constant current value $k_1 \cdot I_0$ (provided that, $0.4 < k_1 < 1$) and the constant current value $I_0$, and then performing constant voltage charging, is performed.

Effects of the Invention

In the secondary battery charging method according to the first aspect of the present disclosure, the charging control apparatus according to the first aspect of the present disclosure, or the secondary battery according to the first aspect of the present disclosure,
since the operation or process of performing constant current charging until a first predetermined voltage $V_0$ is attained, then performing constant voltage charging at the first predetermined voltage $V_0$, completing the first constant voltage charging when a charge current becomes $(I_n - \Delta I_n)$ from $I_n$, and then incrementing n by one, and
performing constant voltage charging at a voltage $V_n = V_{n-1} + \Delta V_n$, repeating a step of completing the n-th constant voltage charging when the charge current becomes $(I_n - \Delta I_n)$ from $I_n$, by incrementing n by one, and completing the N-th constant voltage charging in which a value of the voltage $V_n$ reaches a second predetermined voltage $V_N$ ($>V_0$) to terminate the constant voltage charging, is performed,
cycle degradation does not occur even in a case where the charging time is tried to be shortened and the charging time is not lengthened even in a case where cycle degradation is tried to be suppressed. That is, in the constant voltage charging step, the charge voltage is increased stepwise so that the current value is decreased stepwise in a high electrical potential range during charging. For example, in a case where a lithium ion secondary battery is configured as the secondary battery, diffusion failure of lithium ions in a charge voltage range in which an electrical potential difference between an electrical potential of a positive electrode and an electrical potential of a negative electrode is large, is suppressed. As a result, capacity degradation in accordance with an increase in side reaction including precipitation of lithium is suppressed. Moreover, a time required until completion of charging is shortened by homogenization of lithium precipitation in the negative electrode. Further, it is sufficient for the constant voltage charging step to determine the first predetermined voltage $V_0$, the second predetermined voltage $V_N$, $\Delta V_n$, and $\Delta I_n$ in advance, and thus simplification of charging control can be achieved. In addition, the lithium precipitation on the surface of the negative electrode is suppressed, and as a result, a change (increase) in the thickness of the secondary battery is suppressed. In the secondary battery charging method according to the second aspect of the present disclosure, the charging control apparatus according to the second aspect of the present disclosure, or the secondary battery according to the second aspect of the present disclosure, since the constant current charging is performed by combining a constant current value $k_1 \cdot I_0$ (provided that, $0.4 < k_1 < 1$) and the constant current value $I_0$, cycle degradation can be suppressed. Incidentally, the effects described in this specification are merely examples and are not limited, and additional effects may be demonstrated.

MODE FOR CARRYING OUT THE INVENTION

Figure 1:
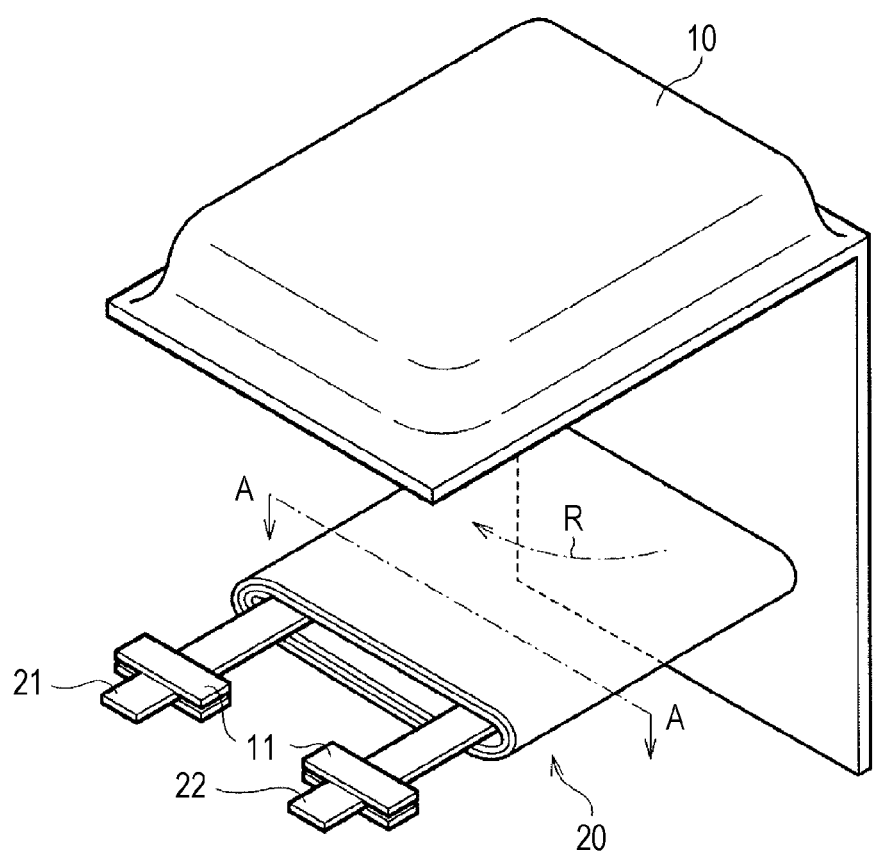
FIG. 1 is a schematic exploded perspective view of a laminated film type lithium ion secondary battery of Example 1 and Example 2.

Hereinafter, the present disclosure will be described on the basis of Examples with reference to the drawings. However, the present disclosure is not limited to Examples and various numerical values or materials in Examples are illustrative examples. Incidentally, the description will be made in the following order.

1. General description of a secondary battery charging method according to first and second aspects of the present disclosure, a charging control apparatus according to the first and second aspects of the present disclosure, and a secondary battery according to the first and second aspects of the present disclosure
2. Example 1 (the secondary battery charging method according to the first aspect of the present disclosure and the secondary battery according to the first aspect of the present disclosure)
3. Example 2 (the secondary battery charging method according to the second aspect of the present disclosure and the secondary battery according to the second aspect of the present disclosure)
4. Example 3 (an application example of the charging control apparatus according to the first and second aspects of the present disclosure and the secondary battery according to the first and second aspects of the present disclosure)
5. Example 4 (modifications of Example 1 to Example 3)
6. Other In the charging method, the charging control apparatus, or the secondary battery according to the second aspect of the present disclosure (hereinafter, these are simply and collectively referred to as "the second aspect of the present disclosure" in some cases),
it is possible to adopt an aspect in which constant current charging is performed until a first predetermined voltage $V_0$ is attained, constant voltage charging is then performed at the first predetermined voltage $V_0$, the first constant voltage charging is completed when a charge current becomes $(I_n-\Delta I_n)$ from $I_n$, and then n is incremented by one, and constant voltage charging is performed at a voltage $V_n=V_{n-1}+\Delta V_n$, a step of completing the n-th constant voltage charging when the charge current becomes $(I_n-\Delta I_n)$ from $I_n$ is repeated by incrementing n by one, and the N-th constant voltage charging in which a value of the voltage $V_n$ reaches a second predetermined voltage $V_N$ ($>V_0$) is completed to terminate the constant voltage charging. That is, the charging method, the charging control apparatus, or the secondary battery according to the second aspect of the present disclosure can be combined with the charging method, the charging control apparatus, or the secondary battery according to the first aspect of the present disclosure.

In the second aspect of the present disclosure including the aforementioned preferred aspect, it is possible to adopt an aspect in which constant current charging is performed at the constant current value $I_0$, and then constant current charging is performed at the constant current value $k_1 \cdot I_0$.

Furthermore, in the second aspect of the present disclosure including the foregoing preferred aspect, it is possible to adopt an aspect in which constant current charging is further performed by combination with a constant current value $k_2 \cdot I_0$ (provided that, $1 < k_2 < 1.6$). Further, in this case, it is possible to adopt an aspect in which the constant current charging is performed at the constant current value $k_2 \cdot I_0$ before the constant current charging is performed at the constant current value $I_0$.

Furthermore, in the second aspect of the present disclosure including the foregoing preferred aspect, it is possible to adopt an aspect in which when an average value of a negative electrode diffusion time constant during the constant current charging at the constant current value $I_0$ is regarded as A (sec) and an average value of a negative electrode diffusion time constant during the constant current charging at the constant current value $k_1 \cdot I_0$ is regarded as B (sec), the following in equation is satisfied.

$$0.1 \leq B/A \leq 5$$

Herein, the negative electrode diffusion time constant (t) and the obtaining method therefor are described in "Studies in Science and Technology, Volume 3, Number 2, 2014," Pages 137 to 144 and "Analysis on overvoltage relaxation of lithium ion secondary batteries (LiSB) after current interruption," Tatsuo Nishina, et al. Herein, the average value of the negative electrode diffusion time constant is defined as a value obtained by arithmetically averaging diffusion time constants which are obtained with an interval of 1% with respect to SOC values.

In the charging method, the charging control apparatus, or the secondary battery according to the first aspect of the present disclosure (hereinafter, these are collectively and simply referred to as "the first aspect of the present disclosure" in some cases) and the second aspect of the present disclosure including the foregoing preferred aspect, it is possible to adopt an aspect in which the SOC value at the time of completion of the constant current charging (also referred to as a depth of charge or a relative remaining capacity value) is set to less than 100%, specifically, for example, 30% or more and 90% or less, preferably, 70% or more and 90% or less. Herein, the SOC value is defined by the following equation.

SOC value=(Electrical quantity having been charged)/(Full charge capacity)×100(%)

In addition, it is possible to adopt an aspect in which the SOC value at the time of completion of the constant current charging is lowered as the number of charge and discharge cycles is increased.

Furthermore, in the first and second aspects of the present disclosure including the foregoing preferred aspects, it is desirable that the following in equation is satisfied from the viewpoint of suppressing degradation caused by a side reaction including lithium precipitation.

$$0.95 \times V_N \leq V_0 \leq 0.99 \times V_N$$

In the first and second aspects of the present disclosure including the foregoing various preferred aspects, it is possible to adopt an aspect in which the second predetermined voltage $V_N$ is equal to or less than a set voltage. Incidentally, the set voltage refers to a voltage at the time of completion of charging determined depending on the types of the secondary battery.

In the first and second aspects of the present disclosure including the foregoing various preferred aspects, the value of N is inherently arbitrary, but for example, 3 to 8 can be exemplified as the value of N.

Furthermore, in the first and second aspects of the present disclosure including the foregoing various preferred aspects, the value of $\Delta V_n$ can be configured to be positive. Further, in this case, it is possible to adopt an aspect in which the value of $\Delta V_n$ is equal to or less than the set voltage and preferably 1.05 V or less. The value of $\Delta V_n$ (n=2, 3, . . . , N) may be the same value or different values from each other.

Alternatively, in the first and second aspects of the present disclosure including the foregoing various preferred aspects, the value of $\Delta V_n$ can be configured to be positive or negative. With such a configuration, further shortening of the charging time can be achieved.

Furthermore, in the first and second aspects of the present disclosure including the foregoing various preferred aspects and configurations, the secondary battery is a lithium ion secondary battery, and the negative electrode can be configured by a graphite material, silicon, or a mixed material of the graphite material and silicon. Further, in this case, the area density of the negative electrode can be configured to be 10 mg/cm² to 51 mg/cm², and preferably 13 mg/cm² to 28 mg/cm². Alternatively, the volume density of the negative electrode can be configured to be 1.1 g/cm³ to 3 g/cm³, and preferably 1.45 g/cm³ to 1.95 g/cm³.

Furthermore, in the first and second aspects of the present disclosure including the foregoing various preferred aspects and configurations, a value obtained by dividing a charge current value by a value of the first discharge capacity at 0.05 C {β=(the charge current value)/(the value of the first discharge capacity at 0.05 C)} is 0.2 or more and 100 or less, preferably 0.5 or more and 70 or less, and more preferably 0.5 or more and 15 or less. Herein, the charge current value means a current value to be used in charging until the first predetermined voltage $V_0$ is attained. Incidentally, the charge current value at the first cycle is the same as the charge current values at the second cycle, the third cycle, . . . , and the N-th cycle.

The second predetermined voltage $V_N$ is a value determined on the basis of the specification of the secondary battery. For each of the first predetermined voltage $V_0$, the second predetermined voltage $V_N$, $\Delta V_n$, and $\Delta I_n$, an optimal value may be determined by performing various tests on the secondary battery. Incidentally, the value of $\Delta I_n$ is positive.

For the secondary battery in the first and second aspects of the present disclosure including the foregoing preferred aspects and configurations, structural elements of a lithium secondary battery (a lithium ion secondary battery) in which the capacity of a negative electrode is obtainable by insertion and extraction of lithium that is an electrode reactant will be hereinafter described.

In the lithium ion secondary battery, it is possible to adopt an aspect in which a lithium atom is contained in a positive electrode active material. A positive electrode has a positive electrode active material layer formed on one surface or both surfaces of a positive electrode current collector. Examples of a material that constitutes the positive electrode current collector may include copper (Cu), aluminum (Al), nickel (Ni), magnesium (Mg), titanium (Ti), iron (Fe), cobalt (Co), zinc (Zn), germanium (Ge), indium (In), gold (Au), platinum (Pt), silver (Ag), palladium (Pd), and the like or an alloy including any of these elements, and a conductive material such as stainless steel. The positive electrode active material layer contains a positive electrode material that has ability to insert and extract lithium as the positive electrode active material. The positive electrode active material layer may further contain a positive electrode binder, a positive electrode conducting agent, or the like. As the positive electrode material, a lithium-containing compound (a compound containing a lithium atom) can be exemplified, and from the viewpoint of achieving high energy density, lithium-containing composite oxide or a lithium-containing phosphate compound is preferably used. The lithium-containing composite oxide is an oxide containing one or two or more elements (hereinafter, referred to as "other elements," provided that, lithium is excluded) as constituent elements, and has a layered rock-salt crystal structure or a spinel crystal structure. Specifically, for example, a lithium-cobalt-based material, a lithium-nickel-based material, a spinel manganese-based material, and a superlattice structure material can be exemplified. Alternatively, the lithium-containing phosphate compound is a phosphate compound containing lithium and one or two or more elements (other elements) as constituent elements and has an olivine crystal structure.

A negative electrode has a negative electrode active material layer formed on one surface or both surfaces of a negative electrode current collector. Examples of a material that constitutes the negative electrode current collector may include copper (Cu), aluminum (Al), nickel (Ni), magnesium (Mg), titanium (Ti), iron (Fe), cobalt (Co), zinc (Zn), germanium (Ge), indium (In), gold (Au), platinum (Pt), silver (Ag), palladium (Pd), and the like or an alloy including any of these elements, and a conductive material such as stainless steel. The negative electrode active material layer contains a negative electrode material that has ability to insert and extract lithium as the negative electrode active material. The negative electrode active material layer may further contain a negative electrode binder, a negative electrode conducting agent, or the like. The negative electrode binder and the negative electrode conducting agent can be configured similarly to the positive electrode binder and the positive electrode conducting agent. The surface of the negative electrode current collector is preferably roughened from the viewpoint of improving adhesibility of the negative electrode active material layer with respect to the negative electrode current collector on the basis of a so-called anchor effect. In this case, the surface of the area of the negative electrode current collector in which at least the negative electrode active material layer is to be formed may be roughened. As a roughening method, for example, a method of forming fine particles with use of an electrolytic treatment can be exemplified. The electrolytic treatment is a method in which fine particles are formed on the surface of the negative electrode current collector in an electrolytic bath with use of an electrolytic method to provide unevennesses on the surface of the negative electrode current collector. Alternatively, the negative electrode can be configured by a lithium foil, a lithium sheet, or a lithium plate.

The negative electrode active material layer can be formed, for example, on the basis of a coating method, a vapor-phase method, a liquid-phase method, a spraying method, or a firing method (a sintering method). The coating method refers to a method in which a particulate (powdery) negative electrode active material is mixed with a negative electrode binder or the like, the mixture is then dispersed in a solvent such as an organic solvent, and the resultant solution is applied to a negative electrode current collector. The vapor-phase method refers to a physical vapor deposition method (PVD method) such as a vacuum evaporation method, a sputtering method, an ion plating method, or a laser ablation method, or various chemical vapor deposition methods (CVD methods) including a plasma CVD method. As the liquid-phase method, an electrolytic plating method and an electroless plating method can be exemplified. The spraying method refers to a method in which a negative electrode active material in a fused state or a semi-fused state is sprayed on a negative electrode current collector. The firing method refers to a method in which a mixture dispersed in a solvent is applied to a negative electrode current collector, for example, using a coating method and then is subjected to a heat treatment at a temperature higher than a melting point of a negative electrode binder or the like, and examples thereof may include an atmosphere firing method, a reactive firing method, and a hot press firing method.

In order to prevent lithium from being unintentionally precipitated on the negative electrode in the middle of charge, chargeable capacity of the negative electrode material is preferably larger than discharge capacity of the positive electrode. That is, electrochemical equivalent of the negative electrode material that has ability to insert and extract lithium is preferably larger than electrochemical equivalent of the positive electrode. Incidentally, lithium that is precipitated on the negative electrode is, for example, lithium metal in a case where the electrode reactant is lithium.

A separator separates the positive electrode from the negative electrode, and passes lithium ions therethrough while preventing current short circuit that results from contact between the positive electrode and the negative electrode. The separator is configured by, for example, a porous film formed from a synthetic resin such as a polyolefin-based resin (a polypropylene resin or a polyethylene resin), a polyimide resin, a polytetrafluoroethylene resin, or an aromatic polyamide; a porous film such as ceramics; glass fiber; and a non-woven fabric formed from liquid crystalline polyester fiber, aromatic polyamide fiber, or cellulose fiber. Alternatively, the separator can be configured by a laminated film in which two or more kinds of porous films are laminated or may be a separator coated with an inorganic material layer or an inorganic material-containing separator.

Examples of the lithium salt that constitutes the non-aqueous electrolytic solution suitable for use in the lithium ion secondary battery may include $LiPF_6$, $LiClO_4$, $LiBF_4$, $LiAsF_6$, $LiSbF_6$, $LiTaF_6$, $LiNbF_6$, $LiAlCl_4$, $LiCF_3SO_3$, $LiCH_3SO_3$, $LiN(CF_3SO_2)_2$, $LiC(CF_3SO_2)_3$, $LiC_4F_9SO_3$, $Li(FSO_2)_2N$, $Li(CF_3SO_2)_2N$, $Li(C_2F_5SO_2)_2N$, $Li(CF_3SO_2)_3C$, $LiBF_3(C_2F_5)$, $LiB(C_2O_4)_2$, $LiB(C_6F_5)_4$, $LiPF_3(C_2F_5)_3$, $\frac{1}{2}Li_2B_{12}F_{12}$, $Li_2SiF_6$, LiCl, LiBr, and LiI, but the lithium salt is not limited thereto. In addition, examples of the organic solvent may include cyclic carbonic acid ester such as ethylene carbonate (EC), propylene carbonate (PC), or butylene carbonate (BC); chain carbonate such as dimethyl carbonate (DMC), ethylmethyl carbonate (EMC), or diethyl carbonate (DEC); cyclic ether such as tetrahydrofuran (THF), 2-methyltetrahydrofuran (2-MeTHF), 1,3-dioxolane (DOL), or 4-methyl-1,3-dioxolane (4-MeDOL); chain ether such as 1,2-dimethoxyethane (DME) or 1,2-diethoxyethane (DEE); cyclic ester such as γ-butyrolactone (GBL) or γ-valerolactone (GVL); and chain ester such as methyl acetate, ethyl acetate, propyl acetate, methyl formate, ethyl formate, propyl formate, methyl butyrate, methyl propionate, ethyl propionate, or propyl propionate. Alternatively, examples of the organic solvent may include tetrahydropyran, 1,3-dioxane, 1,4-dioxane, N,N-dimethylformamide (DMF), N,N-dimethylacetamide (DMA), N-methylpyrrolidinone (NMP), N-methyloxazolidinone (NMO), N,N'-dimethylimidazolidinone (DMI), dimethyl sulfoxide (DMSO), trimethyl phosphate (TMP), nitromethane (NM), nitroethane (NE), sulfolane (SL), acetonitrile (AN), glutaronitrile (GLN), adiponitrile (ADN), methoxyacetonitrile (MAN), 3-methoxypropionitrile (MPN), and diethyl ether. Alternatively, an ionic liquid can also be used. As the ionic liquid, known ionic liquids can be used, and the ionic liquid may be selected as needed.

The electrolyte layer can be configured by a non-aqueous electrolytic solution and a polymer compound for retention. The non-aqueous electrolytic solution is retained, for example, by the polymer compound for retention. The electrolyte layer in such an aspect is a gel electrolyte and achieves high ionic conductivity (for example, 1 mS/cm or more at room temperature) and prevents leakage of the non-aqueous electrolytic solution. The electrolyte may be a liquid electrolyte or a gel electrolyte.

Specific examples of the polymer compound for retention may include polyacrylonitrile, polyvinylidene fluoride, polytetrafluoroethylene, polyhexafluoropropylene, polyethylene oxide, polypropylene oxide, polyphosphazene, polysiloxane, polyvinyl fluoride (PVF), polychlorotrifluoroethylene (PCTFE), perfluoroalkoxy fluororesin (PFA), tetrafluoroethylene-hexafluoropropylene copolymer (FEP), ethylene-tetrafluoroethylenecopolymer (ETFE), ethylene-chlorotrifluoroethylene copolymer (ECTFE), polyvinyl acetate, polyvinyl alcohol, polymethyl methacrylate, polyacrylic acid, polymethacrylic acid, styrene-butadiene rubber, nitrile-butadiene rubber, polystyrene, polycarbonate, polyethylene oxide, and vinyl chloride. These may be used singly or as a mixture. In addition, the polymer compound for retention may be a copolymer. Specific examples of the copolymer may include a copolymer of vinylidene fluoride and hexafluoropylene, and the like. In particular, from the viewpoint of electrochemical stability, polyvinylidene fluoride is preferable as a homopolymer, and a copolymer of vinylidene fluoride and hexafluoropylene is preferable as a copolymer. Further, as a filler, $Al_2O_3$, $SiO_2$, $TiO_2$, or BN (a compound having high heat resistance such as boron nitride may be contained.

Examples of the shape or form of the lithium ion secondary battery may include a coin type, a button type, a flat type, a square type, a cylindrical type, and a laminate type (laminated film type).

For an outer package member in the laminate type (laminated film type) lithium ion secondary battery, a form having a laminate structure of a plastic material layer (a fusion bonding layer), a metal layer, and a plastic material layer (a surface protective layer), that is, a laminated film form is preferable. In the case of the laminated film type lithium ion secondary battery, for example, the outer package member is folded such that the fusion bonding layers face each other with a structure interposed therebetween, and then the outer peripheral edges of the fusion bonding layers are fusion-bonded. Here, the outer package member may be formed by bonding two laminated films by an adhesive or the like. The fusion bonding layer is formed, for example, from a film of an olefin resin such as polyethylene, polypropylene, modified polyethylene, modified polypropylene, and polymers thereof. The metal layer is formed, for example, from an aluminum foil, a stainless steel foil, a nickel foil, or the like. The surface protective layer is formed, for example, from nylon, polyethylene terephthalate, or the like. In particular, the outer package member is preferably an aluminum laminated film in which a polyethylene film, an aluminum foil, and a nylon film are laminated in this order. However, the outer package member may be a laminated film having another laminate structure, a polymer film such as polypropylene, or a metal film.

Example 1

Example 1 relates to the secondary battery charging method according to the first aspect of the present disclosure and the secondary battery according to the first aspect of the present disclosure.

Figure 2A:
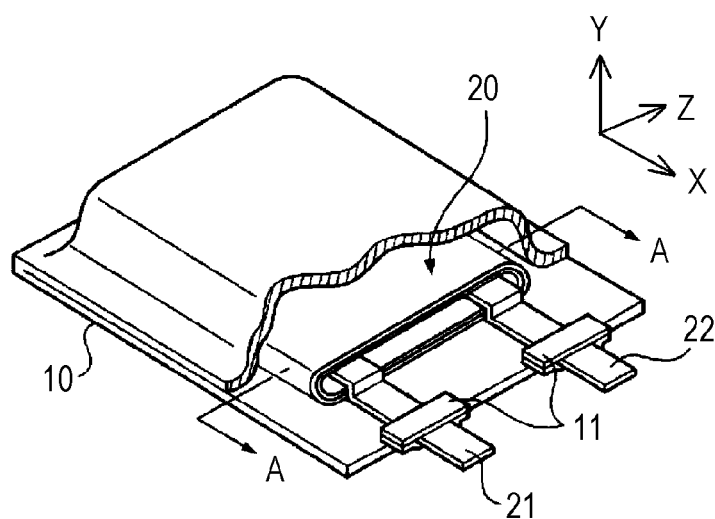
FIG. 2A is a schematic exploded perspective view of the laminated film type lithium ion secondary battery of Example 1 and Example 2 in a state different from the state illustrated in FIG. 1.
Figure 2B:
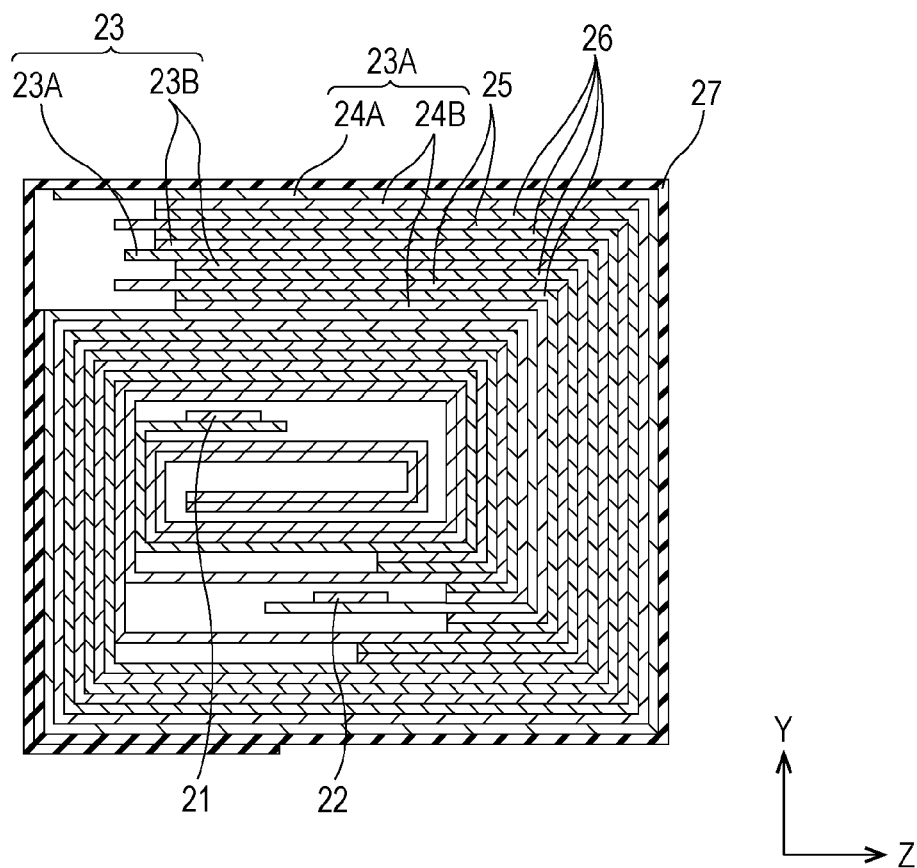
FIG. 2B is a schematic cross-sectional view of a spirally wound electrode body (structure), which is taken along arrow A-A of FIG. 1 and FIG. 2A, of the laminated film type lithium ion secondary battery of Example 1 and Example 2.
Figure 3A:
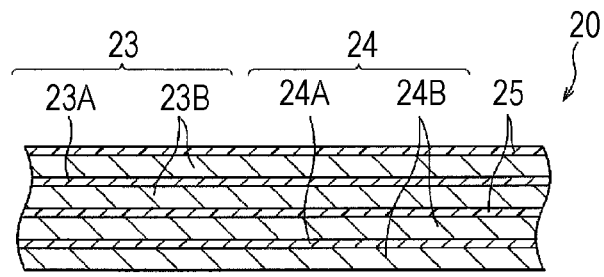
FIG. 3A is a schematic partial cross-sectional view illustrating an enlarged part of the spirally wound electrode body illustrated in FIG. 1.

A secondary battery of Example 1 or a secondary battery of Example 2 to be described later is configured as a lithium ion secondary battery, and specifically, for example, is configured as a flat laminated film type lithium ion secondary battery, and a positive electrode, a separator, and a negative electrode are spirally wound. A schematic exploded perspective view of the lithium ion secondary battery is illustrated in FIG. 1 and FIG. 2A, and a schematic enlarged cross-sectional view taken along arrow A-A of a spirally wound electrode body (structure) illustrated in FIG. 1 and FIG. 2A (a schematic enlarged cross-sectional view taken along a YZ plane) is illustrated in FIG. 2B. Furthermore, a schematic partial cross-sectional view in which a part of the spirally wound electrode body illustrated in FIG. 2B is enlarged (a schematic partial cross-sectional view taken along an XY plane) is illustrated in FIG. 3A.

In the lithium ion secondary battery of Example 1 or the lithium ion secondary battery of Example 2 to be described later, a spirally wound electrode body 20 is contained inside an outer package member 10 formed from a laminated film. The spirally wound electrode body 20 can be produced by laminating a positive electrode 23 and a negative electrode 24 with a separator 25 and an electrolyte layer 26 interposed therebetween, and then spirally winding the obtained laminate. A positive electrode lead 21 is attached to the positive electrode 23, and a negative electrode lead 22 is attached to the negative electrode 24. An outermost periphery of the spirally wound electrode body 20 is protected by a protective tape 27.

The positive electrode lead 21 and the negative electrode lead 22 protrude from the inside to the outside of the outer package member 10 in a same direction. The positive electrode lead 21 is formed from a conductive material such as aluminum. The negative electrode lead 22 is formed from a conductive material such as copper, nickel, or stainless steel. These conductive materials may have a thin plate shape or a mesh shape, for example.

The outer package member 10 is one film that is foldable in a direction of arrow R illustrated in FIG. 1, and the outer package member 10 is provided with a depression (embossment) for containing the spirally wound electrode body 20 in part thereof. The outer package member 10 is, for example, a laminated film in which a fusion bonding layer, a metal layer, and a surface protective layer are laminated in this order. In a process of manufacturing the lithium ion secondary battery, the outer package member 10 is folded such that portions of the fusion bonding layer face each other with the spirally wound electrode body 20 interposed therebetween, and then outer peripheral edges of the portions of the fusion bonding layer are fusion-bonded. Here, the outer package member may be formed by bonding two laminated films by an adhesive or the like. The fusion bonding layer is formed, for example, from a film of polyethylene, polypropylene, or the like. The metal layer is formed, for example, from an aluminum foil or the like. The surface protective layer is formed, for example, from nylon, polyethylene terephthalate, or the like. In particular, the outer package member 10 is preferably an aluminum laminated film in which a polyethylene film, an aluminum foil, and a nylon film are laminated in this order. Here, the outer package member 10 may be a laminated film having another laminate structure, a polymer film such as polypropylene, or a metal film. Specifically, the outer package member 10 is formed from a moisture-resistant aluminum laminated film (total thickness: 100 μm) in which a nylon film (thickness: 30 μm), an aluminum foil (thickness: 40 μm), and a cast polypropylene film (thickness: 30 μm) are laminated from outside in this order.

An adhesive film 11 for prevention of outside air intrusion is inserted between the outer package member 10 and the positive electrode lead 21 and between the outer package member 10 and the negative electrode lead 22. The adhesive film 11 is formed from a material having adhesibility with respect to the positive electrode lead 21 and the negative electrode lead 22, for example, a polyolefin resin or the like, more specifically, is formed from a polyolefin resin such as polyethylene, polypropylene, modified polyethylene, or modified polypropylene.

As illustrated in FIGS. 2B and 3A, the positive electrode 23 has a positive electrode active material layer 23B on one surface or both surfaces of a positive electrode current collector 23A. Further, the negative electrode 24 has a negative electrode active material layer 24B on one surface or both surfaces of a negative electrode current collector 24A.

In the case of producing the positive electrode 23, first, 91 parts by mass of a positive electrode active material <$LiCoO_2$>, 3 parts by mass of a positive electrode binder (polyvinylidene fluoride), and 6 parts by mass of a positive electrode conducting agent (graphite) are mixed to obtain a positive electrode mixture. Then, the positive electrode mixture is mixed with an organic solvent (N-methyl-2-pyrrolidone) to obtain paste positive electrode mixture slurry. Subsequently, the positive electrode mixture slurry is applied on both surfaces of the strip-shaped positive electrode current collector 23A (an aluminum foil having a thickness of 12 μm) using a coating apparatus, and then the positive electrode mixture slurry is dried to form the positive electrode active material layer 23B. Then, the positive electrode active material layer 23B is compression-molded using a roll pressing machine.

In the case of producing the negative electrode 24, first, 97 parts by mass of a negative electrode active material (graphite, or a mixed material of graphite and silicon) and 3 parts by mass of a negative electrode binder (polyvinylidene fluoride) are mixed to obtain a negative electrode mixture. The average particle diameter $d_{50}$ of graphite is set to 20 μm. Then, the negative electrode mixture is mixed with an organic solvent (N-methyl-2-pyrrolidone) to obtain paste negative electrode mixture slurry. Subsequently, the negative electrode mixture slurry is applied on both surfaces of the strip-shaped negative electrode current collector 24A (a copper foil having a thickness of 15 μm) using a coating apparatus, and then the negative electrode mixture slurry is dried to form the negative electrode active material layer 24B. Then, the negative electrode active material layer 24B is compression-molded using a roll pressing machine.

Alternatively, the negative electrode active material (silicon) and a precursor (polyamic acid) of the negative electrode binder are mixed so that a negative electrode mixture can be obtained. In this case, the mixing ratio is set to silicon:polyamic acid=80:20 at dry mass ratio. The average particle diameter $d_{50}$ of silicon is set to 1 μm. As a solvent of the polyamic acid, N-methyl-2-pyrrolidone and N,N-dimethylacetamide are used. Further, after the compression molding, the negative electrode mixture slurry is heated in the vacuum atmosphere under the condition of 100° C.×12 hours. Thereby, polyimide that is a negative electrode binder is formed.

The separator 25 is formed from a microporous polyethylene film having a thickness of 20 μm. In addition, the spirally wound electrode body 20 is impregnated with the non-aqueous electrolytic solution that is a gel electrolyte.

The electrolyte layer 26 contains a non-aqueous electrolytic solution and a polymer compound for retention, and the non-aqueous electrolytic solution is held by the polymer compound for retention. The electrolyte layer 26 is a gel electrolyte. The electrolyte layer 26 achieves high ionic conductivity (for example, 1 mS/cm or more at room temperature) and prevents liquid leakage of the non-aqueous electrolytic solution. Further, the electrolyte layer 26 may contain other material such as an additive.

The composition in the following Table 1 can be exemplified as the composition of the non-aqueous electrolytic solution.

TABLE 1

| | |
|---|---|
| Organic solvent: | EC/PC = 1/1 at mass ratio |
| Lithium salt constituting non-aqueous electrolytic solution: | $LiPF_6$ 1.0 mol/organic solvent 1 kg |
| Other additives: | 1% by mass of vinylene carbonate (VC) |

Incidentally, in the electrolyte layer 26 that is a gel electrolyte, the solvent of the non-aqueous electrolytic solution refers to a wide concept that encompasses not only a liquid material but also a material having ionic conductivity that has ability to dissociate the electrolyte salt. Hence, in a case where a polymer compound having ionic conductivity is used, the polymer compound is also encompassed by the solvent. The non-aqueous electrolytic solution may be used without any change instead of the gel electrolyte layer 26. In this case, the spirally wound electrode body 20 is impregnated with the non-aqueous electrolytic solution.

Specifically, in the case of forming the electrolyte layer 26, first, a non-aqueous electrolytic solution is prepared. Then, the non-aqueous electrolytic solution, the polymer compound for retention, and an organic solvent (dimethyl carbonate) are mixed to prepare a sol precursor solution. A copolymer of hexafluoropropylene and vinylidene fluoride (the copolymerization amount of hexafluoropropylene=6.9% by mass) is used as the polymer compound for retention. Subsequently, the precursor solution is applied to the positive electrode 23 and the negative electrode 24, and then the precursor solution is dried to form the gel electrolyte layer 26.

The lithium ion secondary battery provided with the gel electrolyte layer 26 can be manufactured, for example, on the basis of the following three procedures.

In a first procedure, first, the positive electrode active material layer 23B is formed on both surfaces of the positive electrode current collector 23A, and the negative electrode active material layer 24B is formed on both surfaces of the negative electrode current collector 24A. Meanwhile, the non-aqueous electrolytic solution, the polymer compound for retention, and the organic solvent are mixed to prepare a sol precursor solution. Then, the precursor solution is applied to the positive electrode 23 and the negative electrode 24, and then the precursor solution is dried to form the gel electrolyte layer 26. Thereafter, the positive electrode lead 21 is attached to the positive electrode current collector 23A and the negative electrode lead 22 is attached to the negative electrode current collector 24A, using a welding method or the like. Then, the positive electrode 23 and the negative electrode 24 are laminated with the separator 25, which is formed from a microporous polypropylene film having a thickness of 25 µm, interposed therebetween, and are spirally wound to produce the spirally wound electrode body 20, and then the protective tape 27 is attached to the outermost periphery of the spirally wound electrode body 20. Subsequently, the outer package member 10 is folded to interpose the spirally wound electrode body 20, and then the outer peripheral edges of the outer package member 10 are bonded using a thermal fusion bonding method or the like to seal the spirally wound electrode body 20 inside the outer package member 10. Incidentally, the adhesive film (an acid-modified propylene film having a thickness of 50 µm) 11 is inserted between the positive electrode lead 21 and the outer package member 10 and between the negative electrode lead 22 and the outer package member 10.

Alternatively, in a second procedure, first, the positive electrode 23 and the negative electrode 24 are produced. Then, the positive electrode lead 21 is attached to the positive electrode 23 and the negative electrode lead 22 is attached to the negative electrode 24. Thereafter, the positive electrode 23 and the negative electrode 24 are laminated with the separator 25 interposed therebetween and spirally wound to produce a spirally wound body that is a precursor of the spirally wound electrode body 20, and then the protective tape 27 is attached to the outermost periphery of the spirally wound body. Subsequently, the outer package member 10 is folded to interpose the spirally wound body, and then the outer peripheral edges other than a peripheral edge of one side of the outer package member 10 are bonded using a thermal fusion bonding method or the like, and the spirally wound body is contained inside the bag-shaped outer package member 10. Meanwhile, the non-aqueous electrolytic solution, monomers that are raw materials of the polymer compound, a polymerization initiator, and if necessary, other materials such as a polymerization inhibitor are mixed to prepare a composition for electrolyte. Then, the composition for electrolyte is injected inside the bag-shaped outer package member 10, and then the outer package member 10 is hermetically sealed using a thermal fusion bonding method or the like. Thereafter, the monomers are thermally polymerized to form a polymer compound. The gel electrolyte layer 26 is thereby formed.

Alternatively, in a third procedure, the spirally wound body is produced and contained inside the bag-shaped outer package member 10 in a similar manner to that of the second procedure, except that the separator 25 in which the polymer compound is applied on both surfaces is used. The polymer compound applied to the separator 25 is, for example, a polymer containing vinylidene fluoride as a component (a homopolymer, a copolymer, or a multicomponent copolymer) or the like. Specific examples of the polymer compound include polyvinylidenefluoride, a binary copolymer containing vinylidene fluoride and hexafluoropropylene as components, and a ternary copolymer containing vinylidene fluoride, hexafluoropropylene, and chlorotrifluoroethylene as components. One or two or more of other polymer compounds may be used with a polymer containing vinylidene fluoride as a component. Thereafter, the non-aqueous electrolytic solution is prepared and then injected inside the outer package member 10, and then an opening of the outer package member 10 is hermetically sealed using a thermal fusion bonding method or the like. Subsequently, the resultant is heated while a load is applied to the outer package member 10 to cause the separator 25 to be closely attached to the positive electrode 23 and the negative electrode 24 with the polymer compound interposed therebetween. Therefore, the polymer compound is impregnated with the non-aqueous electrolytic solution and the polymer compound is gelated, thereby forming the electrolyte layer 26.

In the third procedure, swollenness of the lithium ion secondary battery is suppressed as compared to the first procedure. Further, in the third procedure, as compared to the second procedure, the polymer compound formation step is favorably controlled since the solvent, the monomer that is a raw material for the polymer compound, and the like do not almost remain in the electrolyte layer 26. Therefore, the positive electrode 23, the negative electrode 24, and the separator 25 are sufficiently and closely attached to the electrolyte layer 26.

The lithium ion secondary battery of Example is operated as follows, for example. That is, when lithium ions are extracted from the positive electrode 23 at the time of charging, the lithium ions are inserted in the negative electrode 24 through the non-aqueous electrolytic solution. On the other hand, when lithium ions are extracted from the negative electrode 24 at the time of discharging, the lithium ions are inserted in the positive electrode 23 through the non-aqueous electrolytic solution. The lithium ion secondary battery is designed, for example, such that an open circuit voltage (a battery voltage) at the time of completely charging becomes $V_N$ V. In this case, as compared to a case where the lithium ion secondary battery is designed such that the open circuit voltage at the time of completely charging becomes 4.2 V, the extraction amount of lithium per unit mass becomes larger even when the same type of the positive electrode active material is used. In this way, by designing the lithium ion secondary battery such that the open circuit voltage (a battery voltage) at the time of completely charging becomes a predetermined voltage (an upper limit voltage) by adjusting the amount of the positive electrode active material and the amount of the negative electrode active material, high energy density is achieved.

In Example 1A, Example 1B, Example 1C, and Example 1D, specifically, samples of the aforementioned lithium ion secondary batteries were produced to be provided to various tests. Incidentally, in Example 1A, Example 1B, and Example 1C, a graphite material was used as the negative electrode active material. On the other hand, in Example 1D, a mixed material of a graphite material and silicon was used as the negative electrode active material. The area density and the volume density of the negative electrode in the secondary battery of Example 1A were 20.5 mg/cm$^2$ and 1.45 g/cm$^3$, respectively.

In the secondary battery charging method of Example 1,
constant current charging is performed until a first predetermined voltage $V_0$ is attained, constant voltage charging is then performed at the first predetermined voltage $V_0$, the first constant voltage charging is completed when a charge current becomes $(I_n-\Delta I_n)$ from $I_n$, and then n is incremented by one, and
constant voltage charging is performed at a voltage $V_n=V_{n-1}+\Delta V_n$, a step of completing the n-th constant voltage charging when the charge current becomes $(I_n-\Delta I_n)$ from $I_n$ is repeated by incrementing n by one, and the N-th constant voltage charging in which a value of the voltage $V_n$ reaches a second predetermined voltage $V_N$ ($>V_0$) is completed to terminate the constant voltage charging. Incidentally, the value of $\Delta I_n$ is positive regardless of the value of n. That is, the value of $(I_n-I_{n-1})$ is positive regardless of the value of n. In the secondary battery of Example 1 described next, the values are similarly set to this.

In addition, the secondary battery of Example 1 is a secondary battery on which a process of performing constant current charging until a first predetermined voltage $V_0$ is attained, then performing constant voltage charging at the first predetermined voltage $V_0$, completing the first constant voltage charging when a charge current becomes $(I_n-\Delta I_n)$ from $I_n$, and then incrementing n by one, and performing constant voltage charging at a voltage $V_n=V_{n-1}+\Delta V_n$, repeating a step of completing the n-th constant voltage charging when the charge current becomes $(I_n-\Delta I_n)$ from $I_n$, by incrementing n by one, and completing the N-th constant voltage charging in which a value of the voltage $V_n$ reaches a second predetermined voltage $V_N$ (>$V_0$) to terminate the constant voltage charging, is performed.

Herein, $$0.95 \times V_N \leq V_0 \leq 0.99 \times V_N, \text{ and}$$

the second predetermined voltage $V_N$ is equal to or less than the set voltage. In addition, the SOC value at the time of completion of the constant current charging is less than 100%, specifically 30% or more and 90% or less, and preferably 70% or more and 90% or less. Furthermore, the value of $\Delta V_n$ is positive, the value of $\Delta V_n$ is equal to or less than the set voltage and preferably 1.05 V or less, and the value of N is inherently arbitrary, but for example, is 3 to 8.

Further, a sample of the aforementioned lithium ion secondary battery was produced and various tests were performed thereon on the basis of charge by a CC-CV method.

Example 1A

In Example 1A, specifically, the first predetermined voltage $V_0$ was set to 4.30 V, and the second predetermined voltage $V_N$ was set to 4.35 V. The first predetermined voltage $V_0$ is a voltage when a depth of charge (SOC value) became 67%.

In Example 1A, N was set to six. The value of $\Delta V_n$ (n=2, 3, ..., N) was set to the same value (specifically, 0.01 V). Values of $V_{n-1}$, $\Delta V_E$, $V_n$, $I_n$, $\Delta I_n$, and $(I_n-\Delta I_n)$ in each constant voltage charging were set as described in the following Table 2. The charge current at the time of constant current charging was set to 2930 mA. In the table, units of $V_{n-1}$, $\Delta V_n$, and $V_N$ are volt (V), and units of $I_n$ and $\Delta I_n$ are milliampere (mA).

That is, in the secondary battery charging method in Example 1A, more specifically, constant current charging is performed at 2930 mA until the first predetermined voltage $V_0$ (=4.30 V) is attained, and then constant voltage charging is performed at the first predetermined voltage $V_0$ (4.30 V). Then, when the charge current becomes $(I_n-\Delta I_n)$ (=2930−488=2442 mA) from $I_n$ (=2930 mA), the first constant voltage charging is completed. Subsequently, n is incremented by one. That is, n is set to two.

Then, the second constant voltage charging is performed. Specifically, constant voltage charging is performed at a voltage $V_2=V_1+\Delta V_2$ (=4.30+0.01=4.31 V), and when the charge current becomes $(I_n-\Delta I_n)$ (=2442−489=1953 mA) from $I_n$ (=2442 mA), the second constant voltage charging is completed. Subsequently, n is incremented by one. That is, n is set to three.

Then, the third constant voltage charging is performed. Specifically, constant voltage charging is performed at a voltage $V_3=V_2+\Delta V_3$ (=4.31+0.01=4.32 V), and when the charge current becomes $(I_n-\Delta I_n)$ (=1953−488=1465 mA) from $I_n$ (=1953 mA), the third constant voltage charging is completed. Subsequently, n is incremented by one. That is, n is set to four.

Then, the fourth constant voltage charging is performed. Specifically, constant voltage charging is performed at a voltage $V_4=V_3+\Delta V_4$ (=4.32+0.01=4.33 V), and when the charge current becomes $(I_n-\Delta I_n)$ (=1465−488=977 mA) from $I_n$ (=1465 mA), the fourth constant voltage charging is completed. Subsequently, n is incremented by one. That is, n is set to five.

Then, the fifth constant voltage charging is performed. Specifically, constant voltage charging is performed at a voltage $V_5=V_4+\Delta V_5$ (=4.33+0.01=4.34 V), and when the charge current becomes $(I_n-\Delta I_n)$ (=977−489=488 mA) from $I_n$ (=977 mA), the fifth constant voltage charging is completed. Subsequently, n is incremented by one. That is, n is set to six.

Then, the sixth constant voltage charging is performed. Specifically, constant voltage charging is performed at a voltage $V_6=V_5+\Delta V_6$ (=4.34+0.01=4.35 V), and when the charge current becomes $(I_n-\Delta I_n)$ (=488−341=147 mA) from $I_n$ (=488 mA), the sixth constant voltage charging is completed. Herein, the N-th (=the sixth) constant voltage charging in which the value of the voltage $V_6$ reaches the second predetermined voltage $V_N$(>$V_0$) is completed, and thus the constant voltage charging is terminated.

Comparative Example 1A

For comparison with Example 1A, for charging in the CC-CV method, first, constant current charging was performed at a charge current of 2930 mA and constant voltage charging was performed at the time point when a charge voltage became 4.35 V.

TABLE 2

| n | $V_{n-1}$ | $\Delta V_n$ | $V_n$ | $I_n$ | $\Delta I_n$ | $I_n - \Delta I_n$ |
|---|-----------|--------------|-------|-------|--------------|---------------------|
| 1 |           |              | 4.30  | 2930  | 488          | 2442                |
| 2 | 4.30      | 0.01         | 4.31  | 2442  | 489          | 1953                |
| 3 | 4.31      | 0.01         | 4.32  | 1953  | 488          | 1465                |
| 4 | 4.32      | 0.01         | 4.33  | 1465  | 488          | 977                 |
| 5 | 4.33      | 0.01         | 4.34  | 977   | 489          | 488                 |
| 6 | 4.34      | 0.01         | 4.35  | 488   | 341          | 147                 |

Figure 7A:
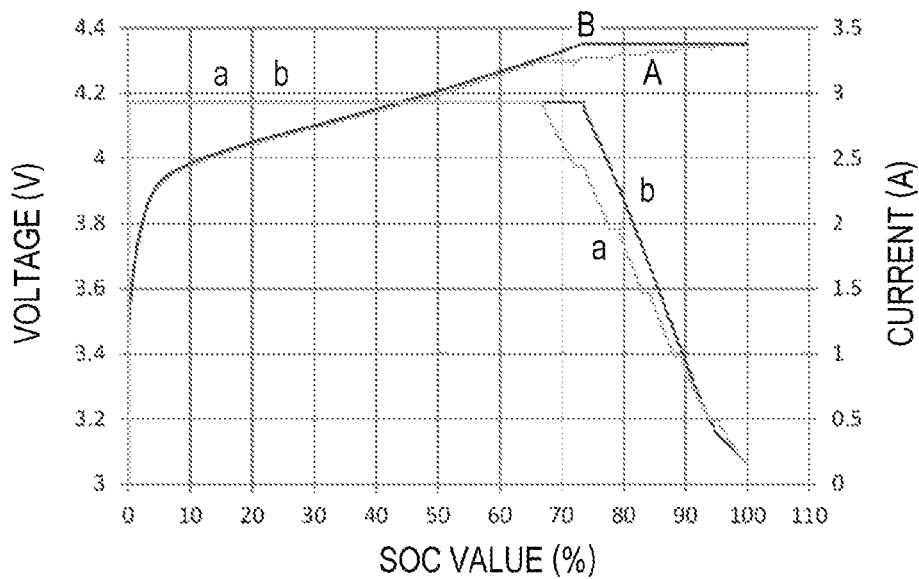
FIGS. 7A and 7B are a graph showing a relation between a charge voltage and a charge current with respect to a depth of charge at the first cycle in a secondary battery charging method of Example 1A and Comparative Example 1A and a graph showing a relation between a charge voltage and a charge current with respect to a charging time at the first cycle in the secondary battery charging method of Example 1A and Comparative Example 1A, respectively.
Figure 7B:
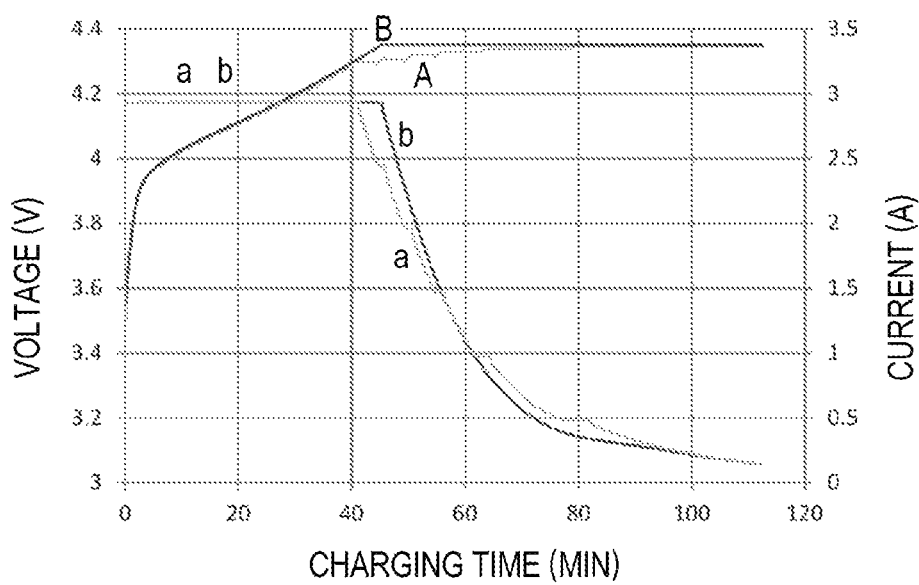

A relation between a charge voltage and a charge current with respect to a depth of charge (SOC value) at the first cycle is shown in FIG. 7A. Further, a relation between a charge voltage and a charge current with respect to a charging time at the first cycle is shown in FIG. 7B. In FIGS. 7A and 7B, "A" represented by a light solid line indicates a charge voltage of Example 1A, "B" represented by a dark solid line indicates a charge voltage of Comparative Example 1A, "a" represented by a light solid line indicates a charge current of Example 1A, and "b" represented by a dark solid line indicates a charge current of Comparative Example 1A. The charging complete time at the first cycle based on each of the secondary battery charging method of Example 1A and the CC-CV method of the related art is as described in the following Table 3. A difference in charging time was not recognized.

TABLE 3

| Charging method for secondary battery of Example 1A | 112 min 35 sec |
| CC-CV method of the related art | 112 min 23 sec |

Figure 8A:
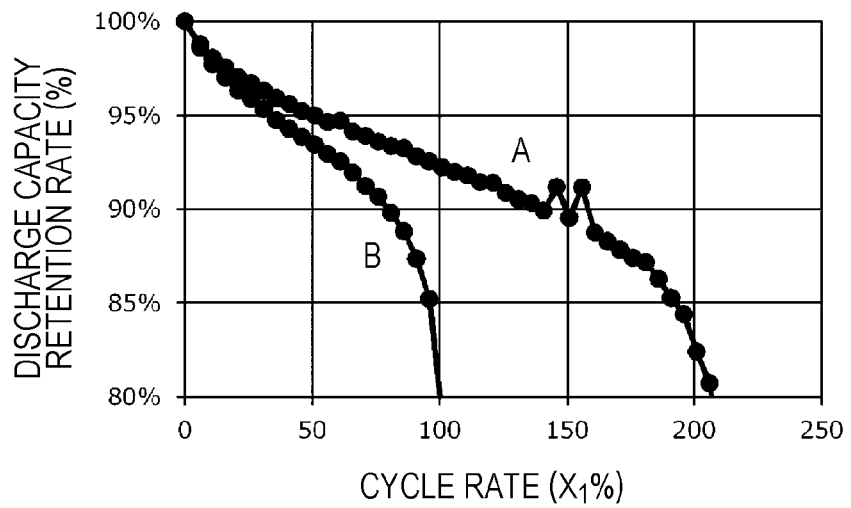
FIGS. 8A and 8B are a graph showing cycle characteristics in the secondary battery charging method of Example 1A and Comparative Example 1A and a graph showing the cycle transition of a charging time in the secondary battery charging method of Example 1A and Comparative Example 1A, respectively.

Comparison results of cycle characteristics are shown in FIG. 8A. In FIG. 8A, "A" indicates a charge capacity retention rate of Example 1A, and "B" indicates a charge capacity retention rate of Comparative Example 1A. Further, the horizontal axis of each of FIGS. 8A, 8B, 10A, 10B, 12A, 12B, 13A, 13B, 14A, 14B, 16A, 16B, 18A, 18B, 19A, and 19B is a cycle rate $X_1$ that is the normalized number of cycles when the number of cycles is regarded as "100%" when the charge capacity retention rate in Comparative Example as a comparison target becomes 80%.

$X_1$=(Number of cycles)/(Number of cycles when the charge capacity retention rate in Comparative Example as a comparison target becomes 80%)×100(%)

Figure 8B:
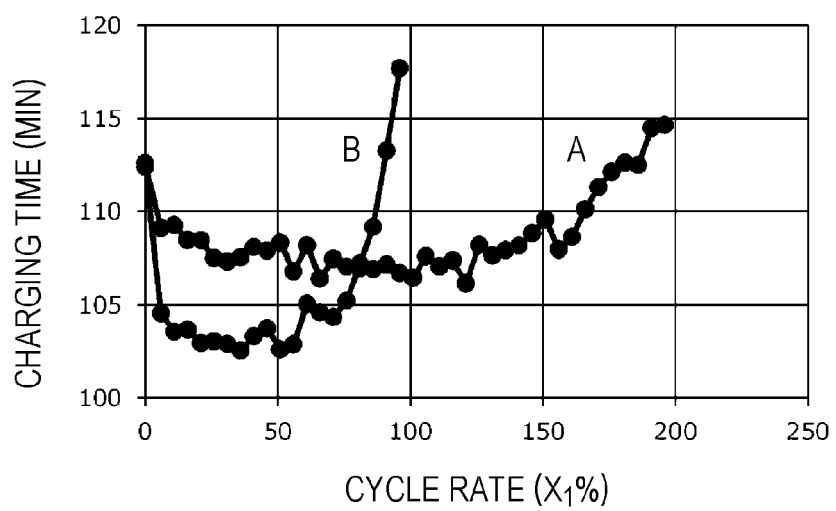

The cycle characteristics in the secondary battery charging method of Example 1A are more favorable than those in the CC-CV method of the related art. In addition, the cycle transition of a charging time is shown in FIG. 8B. In FIG. 8B, "A" indicates a charging time of Example 1A, and "B" indicates a charging time of Comparative Example 1A. Although there is a variation between the secondary batteries, the secondary battery having poor cycle characteristics in the CC-CV method of the related art has a lengthened charging time. On the other hand, the cycle characteristics in the secondary battery charging method of Example 1A are favorable and the charging time is shortened in accordance with the passage of the cycle.

Example 1B

Next, in Example 1B, specifically, the first predetermined voltage $V_0$ was set to 4.30 V, and the second predetermined voltage $V_N$ was set to 4.35 V. The first predetermined voltage $V_0$ is a voltage when a depth of charge (SOC value) became 67%.

More specifically, in Example 1B, N was set to five. In addition, the value of $\Delta V_n$ is positive and negative. More specifically, values of $V_{n-1}$, $\Delta V_n$, $V_n$, $I_n$, $\Delta I_n$, and $(I_n - \Delta I_n)$ in each constant voltage charging were set as described in the following Table 4. The charge current at the time of constant current charging was set to 2930 mA.

TABLE 4

| n | $V_{n-1}$ | $\Delta V_n$ | $V_n$ | $I_n$ | $\Delta I_n$ | $I_n - \Delta I_n$ |
|---|---|---|---|---|---|---|
| 1 | | | 4.30 | 2930 | 488 | 2442 |
| 2 | 4.30 | 0.01 | 4.31 | 2442 | 489 | 1953 |
| 3 | 4.31 | 0.09 | 4.40 | 1953 | 976 | 977 |
| 4 | 4.40 | −0.06 | 4.34 | 977 | 489 | 488 |
| 5 | 4.34 | 0.01 | 4.35 | 488 | 341 | 147 |

Figure 9A:
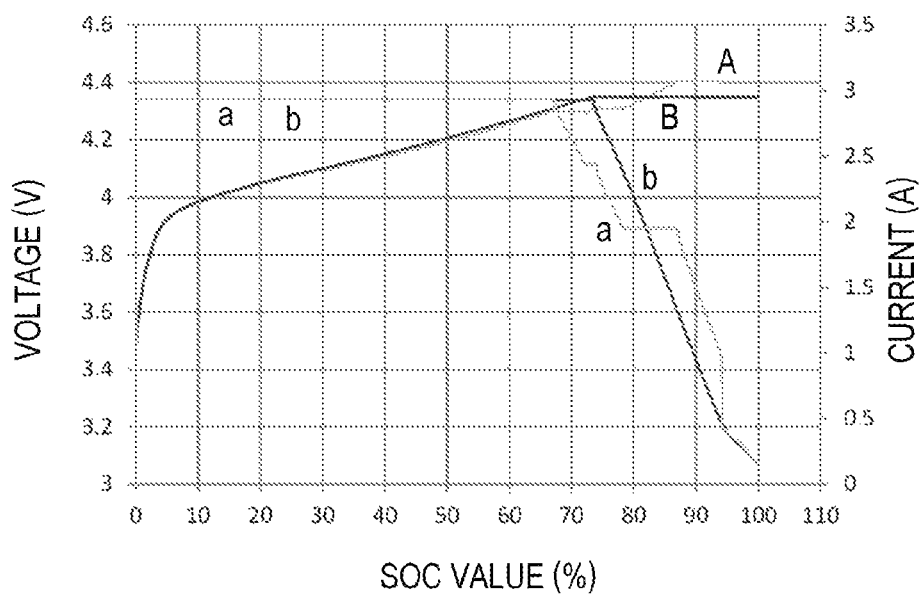
FIGS. 9A and 9B are a graph showing a relation between a charge voltage and a charge current with respect to a depth of charge at the first cycle in a secondary battery charging method of Example 1B and Comparative Example 1A and a graph showing a relation between a charge voltage and a charge current with respect to a charging time at the first cycle in the secondary battery charging method of Example 1B and Comparative Example 1A, respectively.
Figure 9B:
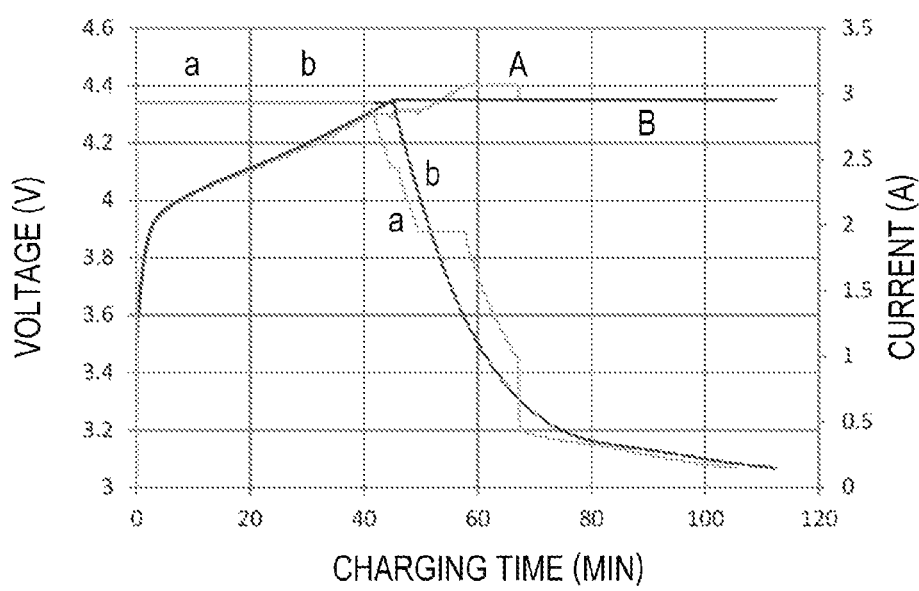

A relation between a charge voltage and a charge current with respect to a depth of charge (SOC value) at the first cycle is shown in FIG. 9A. Further, a relation between a charge voltage and a charge current with respect to a charging time at the first cycle is shown in FIG. 9B. In FIGS. 9A and 9B, "A" represented by a light solid line indicates a charge voltage of Example 1B, "B" represented by a dark solid line indicates a charge voltage of Comparative Example 1A, "a" represented by a light solid line indicates a charge current of Example 1B, and "b" represented by a dark solid line indicates a charge current of Comparative Example 1A. The charging complete time at the first cycle based on each of the secondary battery charging method of Example 1B and the CC-CV method of the related art is as described in the following Table 5. The charging time in the secondary battery charging method of Example 1B was shortened. That is, 6.2% of the charging time was shortened in terms of percentage.

TABLE 5

| | |
|---|---|
| Charging method for secondary battery of Example 1B | 105 min 26 sec |
| CC-CV method of the related art | 112 min 23 sec |

Figure 10A:
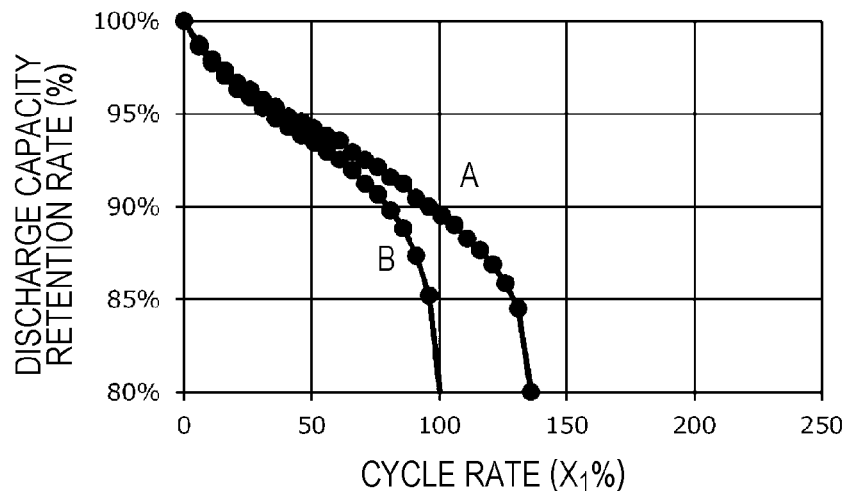
FIGS. 10A and 10B are a graph showing cycle characteristics in the secondary battery charging method of Example 1B and Comparative Example 1A and a graph showing the cycle transition of a charging time in the secondary battery charging method of Example 1B and Comparative Example 1A, respectively.
Figure 10B:
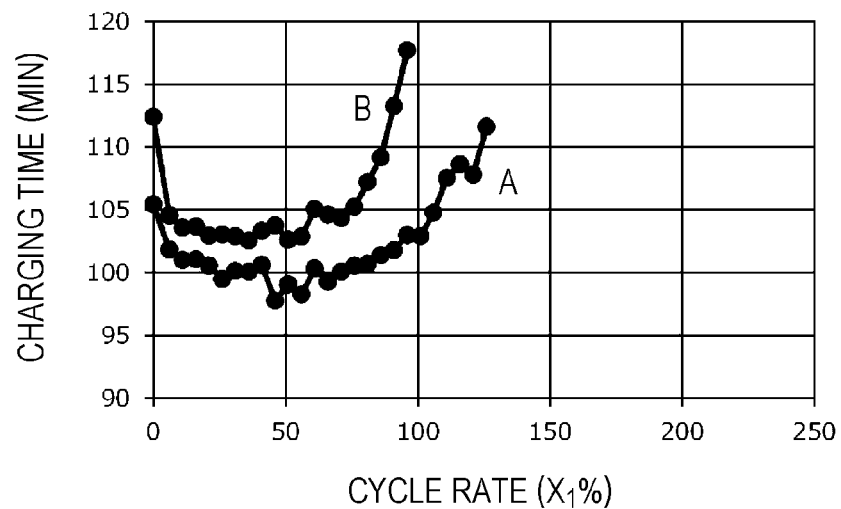

Comparison results of cycle characteristics are shown in FIG. 10A. In FIG. 10A, "A" indicates a charge capacity retention rate of Example 1B, and "B" indicates a charge capacity retention rate of Comparative Example 1A. The cycle characteristics in the secondary battery charging method of Example 1B are more favorable than those of the CC-CV method of the related art. Further, the cycle transition of a charging time is shown in FIG. 10B. The charging time in the secondary battery charging method of Example 1B is shorter than that in the CC-CV method of the related art. In FIG. 10B, "A" indicates a charging time of Example 1B, and "B" indicates a charging time of Comparative Example 1A Example 1C Next, in Example 1C, specifically, the first predetermined voltage $V_0$ was set to 4.30 V, and the second predetermined voltage $V_N$ was set to 4.35 V. The first predetermined voltage $V_0$ is a voltage when a depth of charge (SOC value) became 56%.

More specifically, in Example 1C, N was set to six. In addition, the value of $\Delta V_n$ was positive, and the value of $\Delta V_n$ was set to 0.01 V. Values of $\Delta V_n$ (n=2, 3, ..., N) were set to the same value. More specifically, values of $V_{n-1}$, $\Delta V_n$, $V_n$, $I_n$, $\Delta I_n$, and $(I_n - \Delta I_n)$ in each constant voltage charging were set as described in the following Table 6. The charge current at the time of constant current charging was set to 4395 mA. The different point in Example 1C from Example 1A is the charge current value at the time of constant current charging.

TABLE 6

| n | $V_{n-1}$ | $\Delta V_n$ | $V_n$ | $I_n$ | $\Delta I_n$ | $I_n - \Delta I_n$ |
|---|---|---|---|---|---|---|
| 1 | | | 4.30 | 4395 | 1953 | 2442 |
| 2 | 4.30 | 0.01 | 4.31 | 2442 | 489 | 1953 |
| 3 | 4.31 | 0.01 | 4.32 | 1953 | 488 | 1465 |
| 4 | 4.32 | 0.01 | 4.33 | 1465 | 488 | 977 |
| 5 | 4.33 | 0.01 | 4.34 | 977 | 489 | 488 |
| 6 | 4.34 | 0.01 | 4.35 | 488 | 341 | 147 |

Figure 11A:
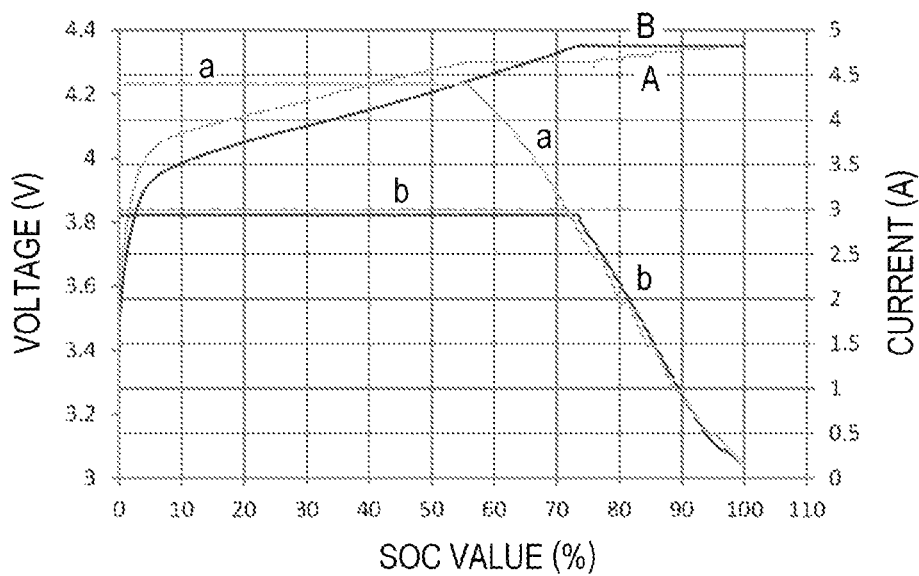
FIGS. 11A and 11B are a graph showing a relation between a charge voltage and a charge current with respect to a depth of charge at the first cycle in a secondary battery charging method of Example 1C and Comparative Example 1A and a graph showing a relation between a charge voltage and a charge current with respect to a charging time at the first cycle in the secondary battery charging method of Example 1C and Comparative Example 1A, respectively.
Figure 11B:
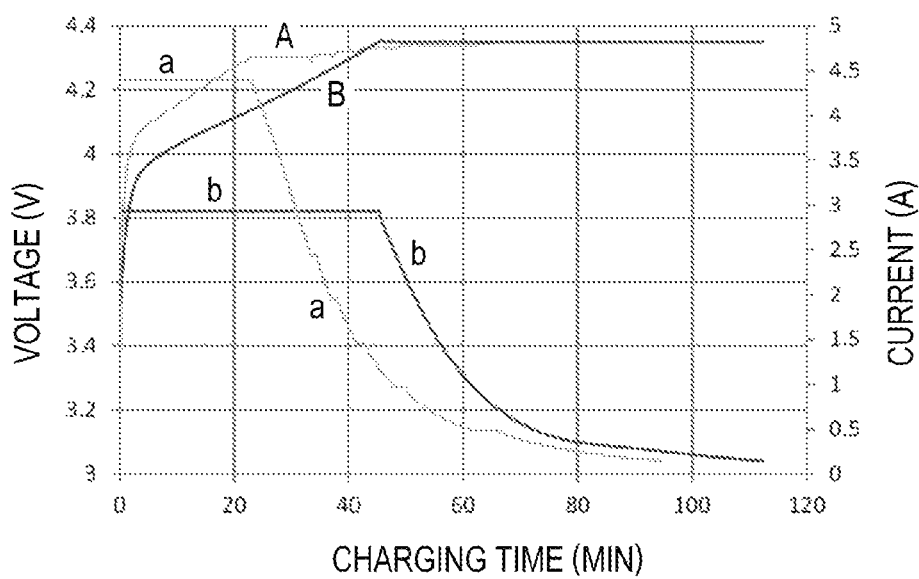

A relation between a charge voltage and a charge current with respect to a depth of charge (SOC value) at the first cycle is shown in FIG. 11A. Further, a relation between a charge voltage and a charge current with respect to a charging time at the first cycle is shown in FIG. 11B. In FIGS. 11A and 11B, "A" represented by a light solid line indicates a charge voltage of Example 1C, "B" represented by a dark solid line indicates a charge voltage of Comparative Example 1A, "a" represented by a light solid line indicates a charge current of Example 1C, and "b" represented by a dark solid line indicates a charge current of Comparative Example 1A. The charging complete time at the first cycle based on each of the secondary battery charging method of Example 1C and the CC-CV method of the related art is as described in the following Table 7. The charging time in the secondary battery charging method of Example 1C was shortened. That is, 15.5% of the charging time was shortened in terms of percentage.

TABLE 7

| Charging method for secondary battery of Example 1C | 94 min 59 sec |
|---|---|
| CC-CV method of the related art | 112 min 23 sec |

Figure 12A:
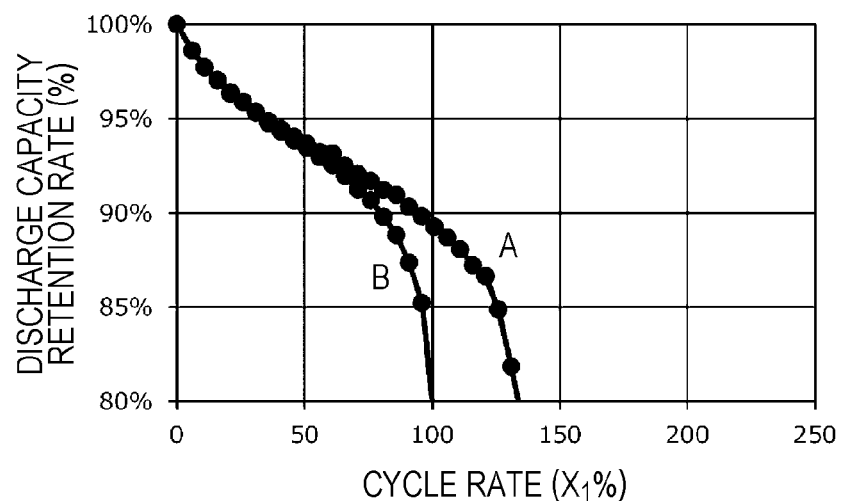
FIGS. 12A and 12B are a graph showing cycle characteristics in the secondary battery charging method of Example 1C and Comparative Example 1A and a graph showing the cycle transition of a charging time in the secondary battery charging method of Example 1C and Comparative Example 1A, respectively.
Figure 12B:
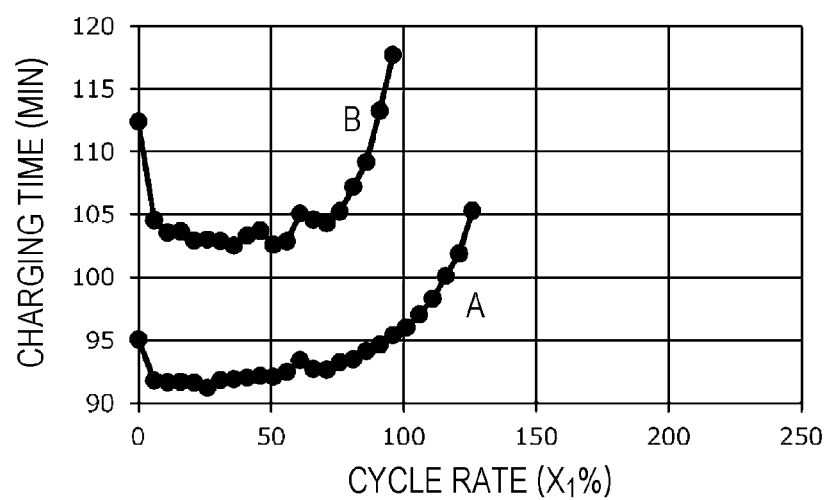

Comparison results of cycle characteristics are shown in FIG. 12A. In FIG. 12A, "A" indicates a charge capacity retention rate of Example 1C, and "B" indicates a charge capacity retention rate of Comparative Example 1A. The cycle characteristics in the secondary battery charging method of Example 1C are more favorable than those of the CC-CV method of the related art. Further, the cycle transition of a charging time is shown in FIG. 12B. The charging time in the secondary battery charging method of Example 1C is shorter than that in the CC-CV method of the related art. In FIG. 12B, "A" indicates a charging time of Example 1C, and "B" indicates a charging time of Comparative Example 1A.

Example 1D

Next, in Example 1D, specifically, the first predetermined voltage $V_0$ was set to 4.30 V, and the second predetermined voltage $V_N$ was set to 4.35 V. The first predetermined voltage $V_0$ is a voltage when a depth of charge (SOC value) became 67%.

More specifically, in Example 1D, N was set to six. In addition, the value of $\Delta V_n$ was positive, and the value of $\Delta V_n$ was set to 0.01 V. Values of $\Delta V_n$ (n=2, 3, . . . , N) were set to the same value. More specifically, values of $V_{n-1}$, $\Delta V_E$, $V_n$, $I_n$, $\Delta I_n$, and $(I_n - \Delta I_n)$ in each constant voltage charging were set as described in the following Table 8. The charge current at the time of constant current charging was set to 1789 mA. The different point in Example 1D from Example 1A is, as described above, the negative electrode active material.

Comparative Example 1D

For comparison with Example 1D, for charging in the CC-CV method, first, constant current charging was performed at a charge current of 2930 mA and constant voltage charging was performed at the time point when a charge voltage became 4.35 V.

TABLE 8

| n | $V_{n-1}$ | $\Delta V_n$ | $V_n$ | $I_n$ | $\Delta I_n$ | $I_n - \Delta I_n$ |
|---|---|---|---|---|---|---|
| 1 | | | 4.30 | 1789 | 298 | 1491 |
| 2 | 4.30 | 0.01 | 4.31 | 1491 | 298 | 1193 |
| 3 | 4.31 | 0.01 | 4.32 | 1193 | 298 | 895 |
| 4 | 4.32 | 0.01 | 4.33 | 895 | 299 | 596 |
| 5 | 4.33 | 0.01 | 4.34 | 596 | 298 | 298 |
| 6 | 4.34 | 0.01 | 4.35 | 298 | 253 | 45 |

The charging complete time at the first cycle based on each of the secondary battery charging method of Example 1D and the CC-CV method of the related art is as described in the following Table 9. The charging time was slightly lengthened in the secondary battery charging method of the Example 1D. That is, 0.91% of the charging time was lengthened in terms of percentage. However, the increase rate thereof is extremely small.

TABLE 9

| Charging method for secondary battery of Example 1D | 138 min 13 sec |
|---|---|
| CC-CV method of the related art | 136 min 58 sec |

Figure 13A:
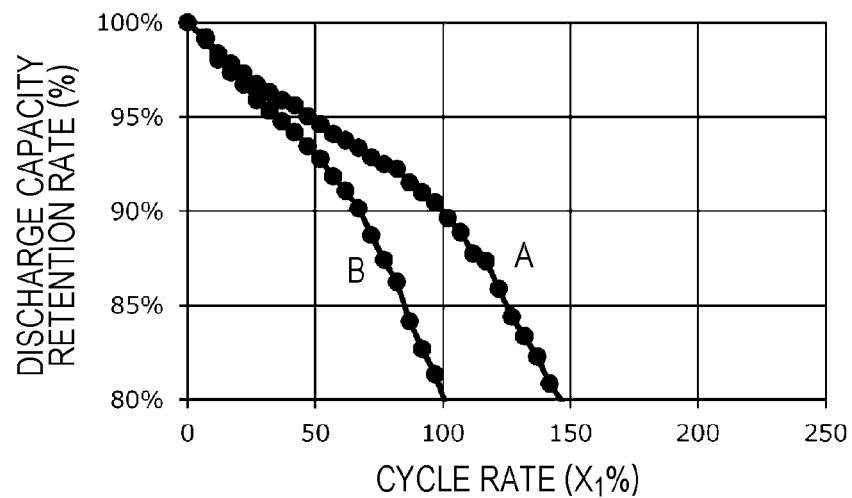
FIGS. 13A and 13B are a graph showing cycle characteristics in a secondary battery charging method of Example 1D and Comparative Example 1D and a graph showing the cycle transition of a charging time in the secondary battery charging method of Example 1D and Comparative Example 1D, respectively.
Figure 13B:
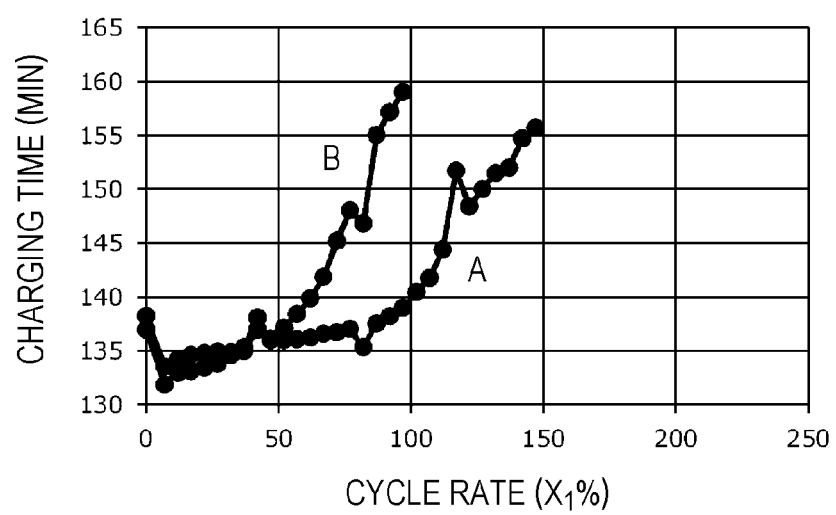

Comparison results of cycle characteristics are shown in FIG. 13A. In FIG. 13A, "A" indicates a charge capacity retention rate of Example 1D, and "B" indicates a charge capacity retention rate of Comparative Example 1D. The cycle characteristics in the secondary battery charging method of Example 1D are more favorable than those of the CC-CV method of the related art. Further, the cycle transition of a charging time is shown in FIG. 13B. The charging time is similar level until $X_1$ becomes about 50%, but since cycle degradation is suppressed, when and after $X_1$ becomes about 50%, the charging time is clearly shortened in Example 1D. In FIG. 13B, "A" indicates a charging time of Example 1D, and "B" indicates a charging time of Comparative Example 1D.

In evaluation of the cycle characteristics, when the number of cycles is increased, the discharge capacity retention rate is decreased. When the first evaluation result of the cycle characteristics is regarded as 100%, the discharge capacity retention rate in the secondary battery charging method of Example 1A when the discharge capacity retention rate becomes "P %" is regarded as $B_p$, and the discharge capacity retention rate in the secondary battery charging method of Comparative Example 1A is regarded as $A_p$, a life lengthening rate α(P) is defined as follows.

$$\alpha(P) = B_p/A_p \times 100(\%)$$

A value β (unit: $h^{-1}$) obtained by dividing a charge current value by a value (unit: ampere hour, Ah) of the first discharge capacity at 0.05 C was obtained. The results thereof are shown in the following Table 10, but the value β is preferably 0.2 or more and 100 or less. β correlates with a charging rate. Also from Table 10, it is found that the discharge capacity can be retained with a high retention rate in the secondary battery charging method of Example 1A as compared to the secondary battery charging method of Comparative Example 1A. In addition, a tendency that a value of the life lengthening rate a is increased as a value of 3 is increased is recognized.

TABLE 10

| β | α (95) | α (90) | α (85) | α (80) |
|---|---|---|---|---|
| 0.61 | 103 | 109 | 111 | — |
| 0.72 | 100 | — | — | — |
| 0.95 | 125 | 156 | 196 | 233 |
| 0.95 | 130 | 152 | 166 | 181 |
| 0.96 | 151 | 198 | 237 | — |
| 0.97 | 139 | 149 | 147 | 146 |
| 1.03 | 153 | 185 | 200 | 207 |
| 1.96 | 211 | 247 | 252 | 254 |

Figure 14A:
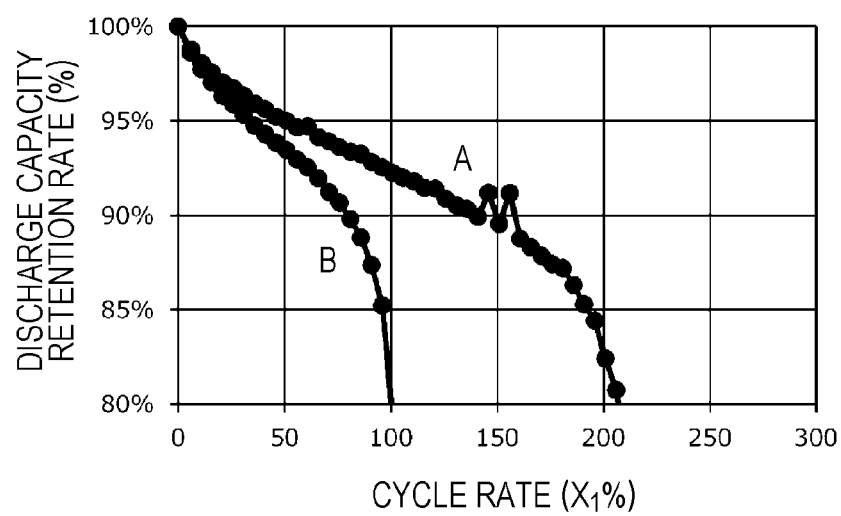
FIGS. 14A and 14B are a graph showing a result of discharge capacity retention rate obtained when charging is performed at β=1.03 and a graph showing a result of discharge capacity retention rate obtained when charging is performed at β=1.96 in the secondary battery charging method of Example 1A and Comparative Example 1A, respectively.
Figure 14B:
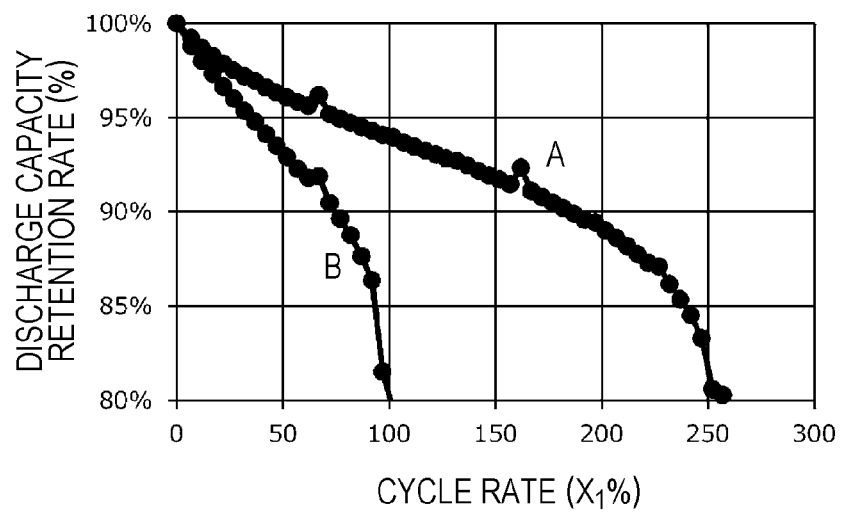

Furthermore, results of the discharge capacity retention rates obtained when the lithium ion secondary battery is charged at 1 C and 2 C in the secondary battery charging method of Example 1A and the secondary battery charging method of Comparative Example 1A are shown in FIG. 14A (charging at 3=1.03) and FIG. 14B (charging at β=1.96). In FIGS. 14A and 14B, "A" indicates a charge capacity retention rate of Example 1A and "B" indicates a charge capacity retention rate of Comparative Example 1A. In addition, the charging time is shown in the following Tables 11 and 12. Furthermore, a cycle ratio when the charge capacity retention rate becomes 97% (=the number of cycles of Example/ the number of cycles of Comparative Example) is shown in the following Tables 11 and 12.

TABLE 11

|  | Charging at β = 1.03 | Cycle ratio |
|---|---|---|
| Example 1A | 106.5 min | 1.27 |
| Comparative Example 1A | 103.3 min |  |

TABLE 12

|  | Charging at β = 1.96 | Cycle ratio |
|---|---|---|
| Example 1A | 80.0 min | 1.82 |
| Comparative Example 1A | 80.4 min |  |

From FIG. 14A, FIG. 14B, Table 11, and Table 12, it is found that the discharge capacity can be retained with a high retention rate in the secondary battery charging method of Example 1A as compared to the secondary battery charging method of Comparative Example 1A. Moreover, it is found that a high effect is achieved as the charging rate is increased.

As described above, in the secondary battery charging method of Example 1, cycle degradation does not occur even in a case where the charging time is tried to be shortened and the charging time is not lengthened even in a case where cycle degradation is tried to be suppressed. Further, it is sufficient for the constant voltage charging step to determine the first predetermined voltage $V_0$, the second predetermined voltage $V_N$, $\Delta V_n$, and $\Delta I_n$ in advance, and thus simplification of charging control can be achieved.

Incidentally, it is also possible to adopt an aspect of configuring a laminated electrode assembly in which a positive electrode, a separator, and a negative electrode are laminated. Specifically, the laminated electrode assembly can be produced by laminating the positive electrode and the negative electrode with the separator and the electrolyte layer interposed therebetween. The positive electrode is configured, similarly to the above description, by a positive electrode current collector and a positive electrode active material layer, and the positive electrode active material layer is formed on both surfaces of the positive electrode current collector. Also, the negative electrode is configured, similarly to the above description, by a negative electrode current collector and a negative electrode active material layer, and the negative electrode active material layer is formed on both surfaces of the negative electrode current collector. More specifically, the negative electrode current collector/the negative electrode active material layer/the separator/the positive electrode active material layer/the positive electrode current collector/the positive electrode active material layer/the separator/the negative electrode active material layer/the negative electrode current collector/the negative electrode active material layer/the separator/the positive electrode active material layer/the positive electrode current collector/the positive electrode active material layer/the separator . . . are laminated in this order. A positive electrode lead is attached to each positive electrode, and a negative electrode lead is attached to each negative electrode. The plurality of positive electrode leads are bundled by one positive electrode terminal. The plurality of negative electrode leads are bundled by one negative electrode terminal.

Example 2

Example 2 relates to the secondary battery charging method according to the second aspect of the present disclosure and the secondary battery according to the second aspect of the present disclosure. In Example 2, a sample of the lithium ion secondary battery described in Example 1 was produced and provided to various tests. Incidentally, in Example 2, a graphite material was used as the negative electrode active material. The area density and the volume density of the negative electrode in the secondary battery of Example 2 were 14 mg/cm$^2$ and 1.5 g/cm$^3$, respectively.

In the secondary battery charging method of Example 2, when a value of a constant current in constant current charging is regarded as $I_0$, constant current charging is performed by combining a constant current value $k_1 \cdot I_0$ (provided that, $0.4 < k < 1$) and the constant current value $I_0$, and then constant voltage charging is performed. Specifically, in the secondary battery of Example 2, the process of, when a value of a constant current in constant current charging is regarded as $I_0$, performing constant current charging by combining a constant current value $k_1 \cdot I_0$ (provided that, $0.4 < k_1 < 1$) and the constant current value $I_0$, and then performing constant voltage charging, is performed.

In the secondary battery charging method or secondary battery of Example 2, further, constant current charging is performed until a first predetermined voltage $V_0$ is attained, constant voltage charging is then performed at the first predetermined voltage $V_0$, the first constant voltage charging is completed when a charge current becomes $(I_n - \Delta I_n)$ from $I_n$, and then n is incremented by one, and constant voltage charging is performed at a voltage $V_n = V_{n-1} + \Delta V_n$, a step of completing the n-th constant voltage charging when the charge current becomes $(I_n - \Delta I_n)$ from $I_n$ is repeated by incrementing n by one, and the N-th constant voltage charging in which a value of the voltage $V_n$ reaches a second predetermined voltage $V_N$ ($> V_0$) is completed to terminate the constant voltage charging. That is, after the constant current charging is performed, the process of performing constant voltage charging described in Example 1 is performed.

Specifically, in Example 2, the constant voltage charging described in Example 1A is performed. However, after the constant current charging is performed, it is not necessary to perform the constant voltage charging described in Example 1.

In Example 2, $k_1$ was set to 0.5. Then, in Example 2A, Example 2B, and Example 2C, constant current charging was performed under the conditions described in Table 13. Incidentally, values described in Table 13 are SOC values (unit: %).

$I_0$ 2930 mA
$0.5 \times I_0$ 1465 mA

TABLE 13

|  | SOC value (%) | | |
|---|---|---|---|
|  | Example 2A | Example 2B | Example 2C |
| Constant current charging at constant current value $I_0$ | — | 0-17 | 0-34 |
| Constant current charging at constant current value of $0.5 \times I_0$ | 0-17 | 17-34 | 34-51 |
| Constant current charging at constant current value $I_0$ | 17-67 | 34-67 | 51-67 |

Figure 15:
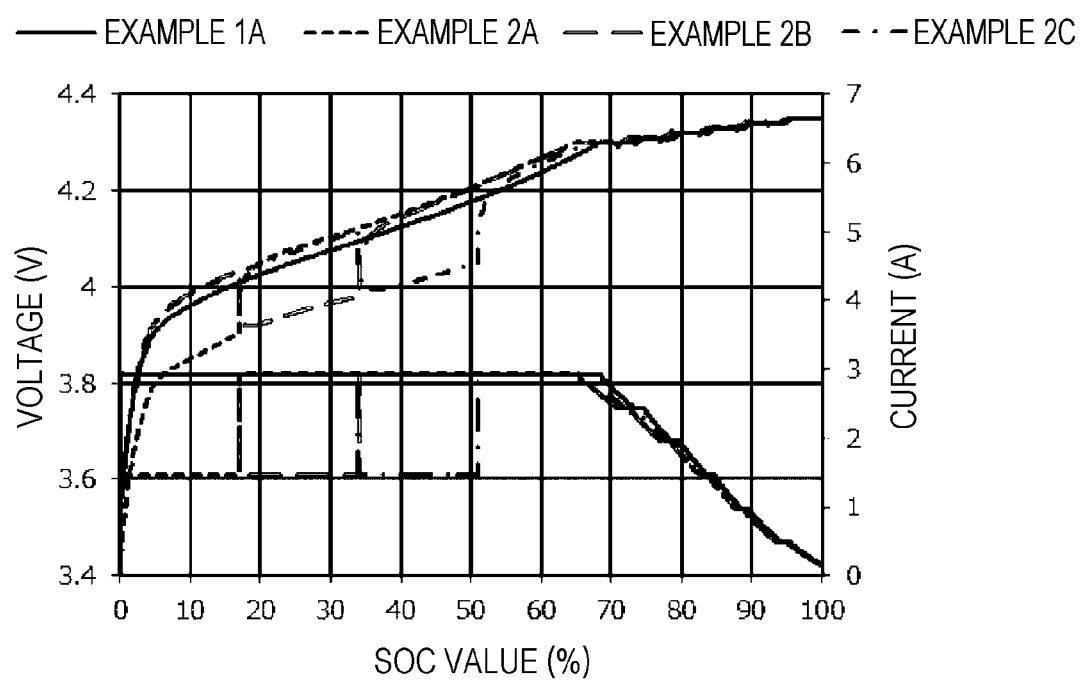
FIG. 15 is a graph showing a relation between a charge voltage and a charge current with respect to a depth of charge at the first cycle in a secondary battery charging method of Example 2A, Example 2B, and Example 2C.
Figure 16A:
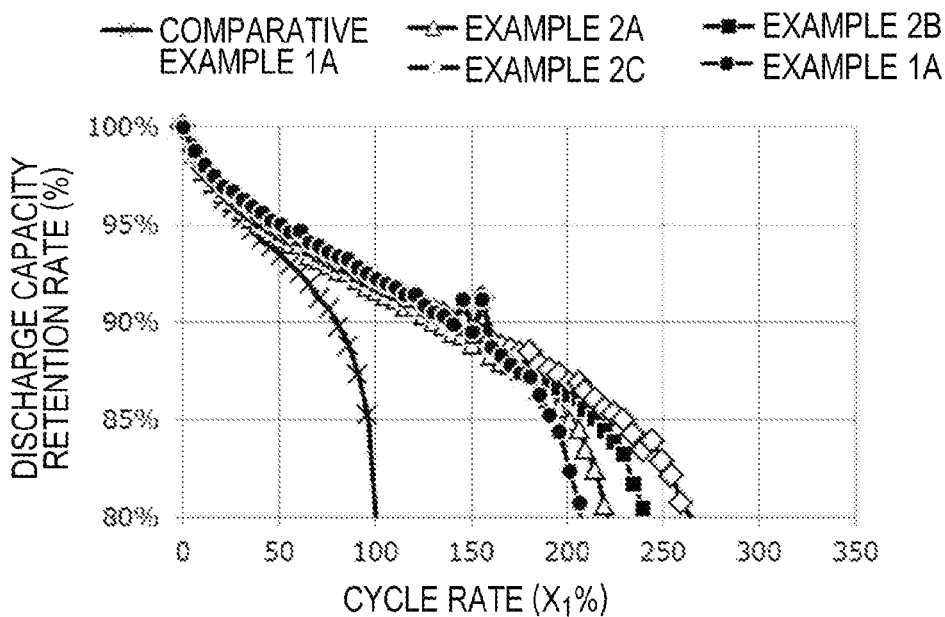
FIGS. 16A and 16B are a graph showing cycle characteristics and a graph showing the cycle transition of a charging time in the secondary battery charging method of Example 2A, Example 2B, Example 2C, Example 1A, and Comparative Example 1A, respectively.
Figure 16B:
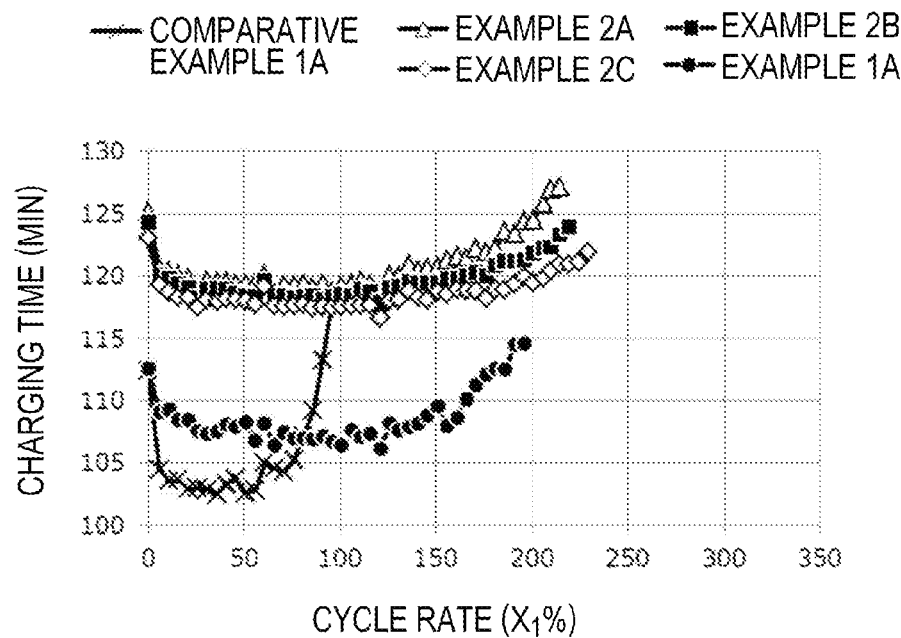

FIG. 15 is a graph showing a relation between a charge voltage and a charge current with respect to a depth of charge at the first cycle in a secondary battery charging method of Example 2A, Example 2B, and Example 2C. Further, FIGS. 16A and 16B are a graph showing cycle characteristics and a graph showing the cycle transition of a charging time in the secondary battery charging method of Example 2A, Example 2B, Example 2C, Example 1A, and Comparative Example 1A, respectively. The cycle rate $X_1$ is presented in the following Table 14. In addition, the charging time at the first cycle is also presented in Table 14.

TABLE 14

| | Cycle rate $X_1$ | Charging time |
|---|---|---|
| Example 2A | 221 | 125 min 10 sec |
| Example 2B | 243 | 124 min 22 sec |
| Example 2C | 262 | 123 min 03 sec |
| Example 2D | 242 | 115 min 59 sec |
| Example 2E | 255 | 116 min 04 sec |
| Example 2F | 320 | 117 min 50 sec |
| Example 1A | 206 | 112 min 35 sec |
| Comparative Example 1A | 100 | |

From the above results, it is found that in Example 2A, Example 2B, and Example 2C, a high cycle rate $X_1$ is obtained and cycle characteristics are improved as compared to Example 1A. Moreover, it is found that a high cycle rate $X_1$ is obtained as the SOC value when constant current charging is performed at a constant current value of $0.5 \times I_0$ is increased. That is, it is found that it is preferable to perform constant current charging at a constant current value $k_1 \cdot I_0$ after constant current charging is performed at the constant current value $I_0$.

That is, by controlling the charge current in such constant current charging, the charge current value is lowered in the region where diffusion of lithium ions in the negative electrode is low (for example, around 60% in terms of SOC value), and thus diffusion failure of lithium ions in the negative electrode is suppressed. Then, with this suppression, capacity degradation in accordance with an increase in side reaction including precipitation of lithium is suppressed. Moreover, by increasing the charge current value in the region where diffusion of lithium ions in the negative electrode is relatively favorable (for example, around 0% to 20% in terms of SOC value), lengthening of the charging time can be suppressed as much as possible.

In Example 2D, Example 2E, and Example 2F, constant current charging was performed under the conditions described in Table 15. Incidentally, values described in Table 15 are SOC values (unit: %).
$I_0$ 2930 mA
$0.5 \times I_0$ 1465 mA
$1.5 \times I_0$ 4395 mA

TABLE 15

| | SOC value (%) | | |
|---|---|---|---|
| | Example 2D | Example 2E | Example 2F |
| Constant current charging at constant current value of $1.5 \times I_0$ | — | 0-17 | 0-17 |
| Constant current charging at constant current value $I_0$ | — | — | 17-52 |
| Constant current charging at constant current value of $0.5 \times I_0$ | 0-17 | 17-34 | 52-69 |

TABLE 15-continued

| | SOC value (%) | | |
|---|---|---|---|
| | Example 2D | Example 2E | Example 2F |
| Constant current charging at constant current value of $1.5 \times I_0$ | 17-34 | — | — |
| Constant current charging at constant current value $I_0$ | 34-67 | 34-67 | — |

Figure 17A:
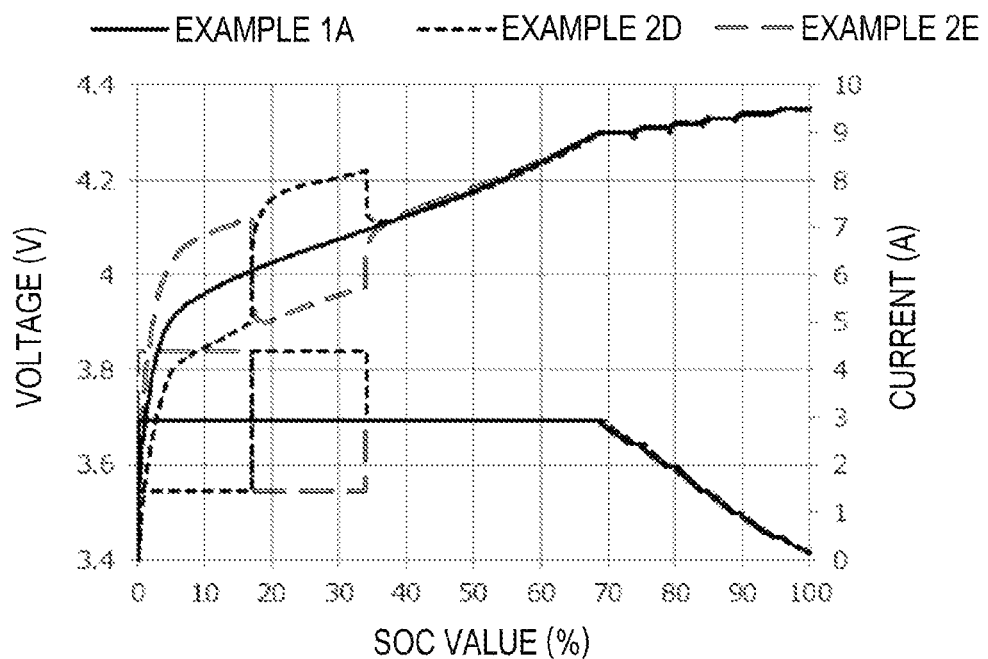
FIG. 17A is a graph showing a relation between a charge voltage and a charge current with respect to a depth of charge at the first cycle in a secondary battery charging method of Example 2D and Example 2E and FIG. 17B is a graph showing a relation between a charge voltage and a charge current with respect to a depth of charge at the first cycle in a secondary battery charging method of Example 2F.
Figure 17B:
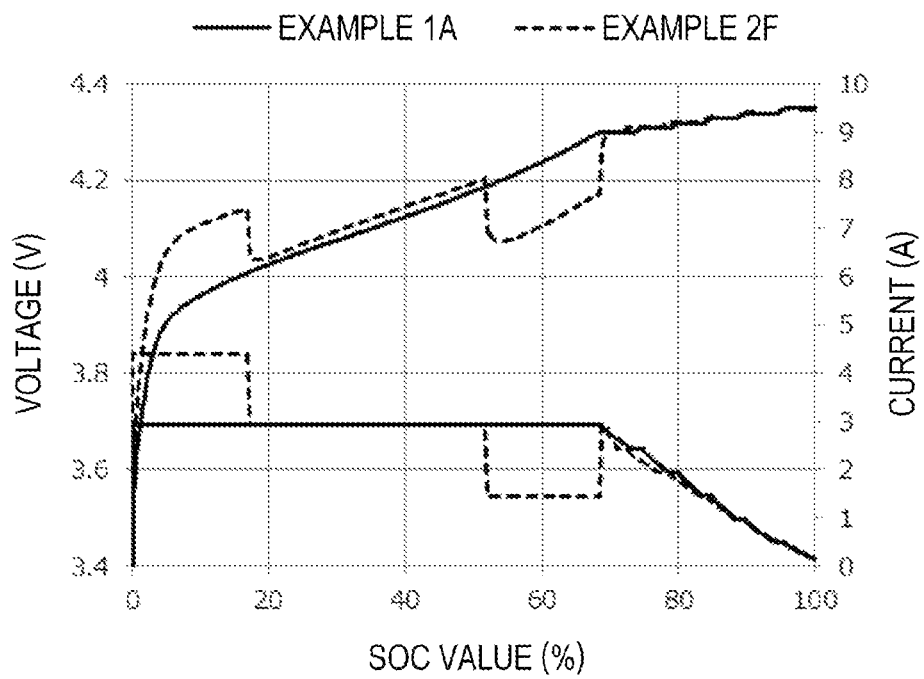
Figure 18A:
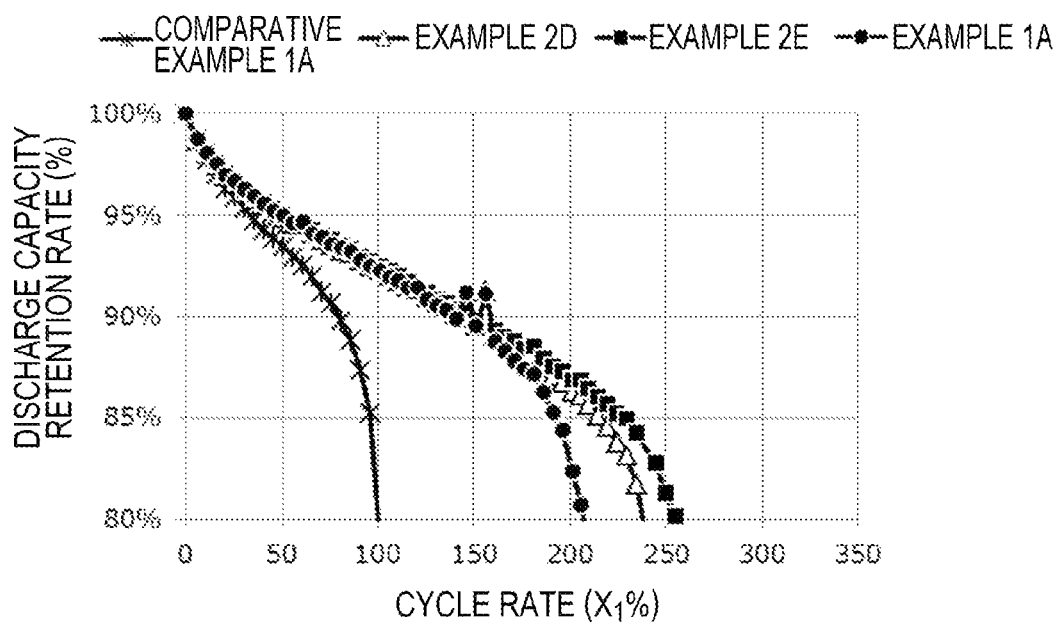
FIGS. 18A and 18B are a graph showing cycle characteristics and a graph showing the cycle transition of a charging time in the secondary battery charging method of Example 2D, Example 2E, Example 1A, and Comparative Example 1A, respectively.
Figure 18B:
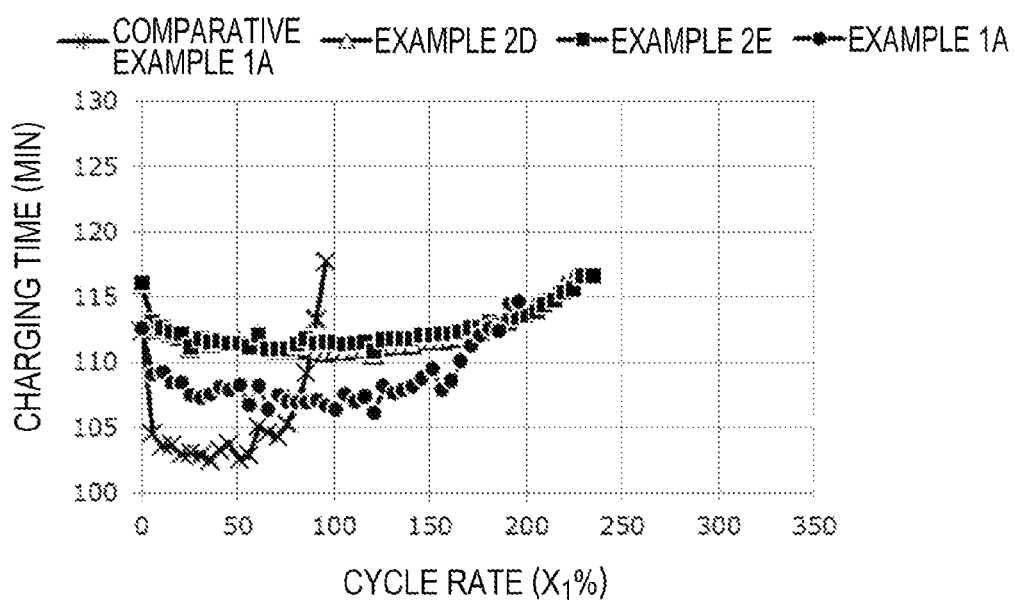
Figure 19A:
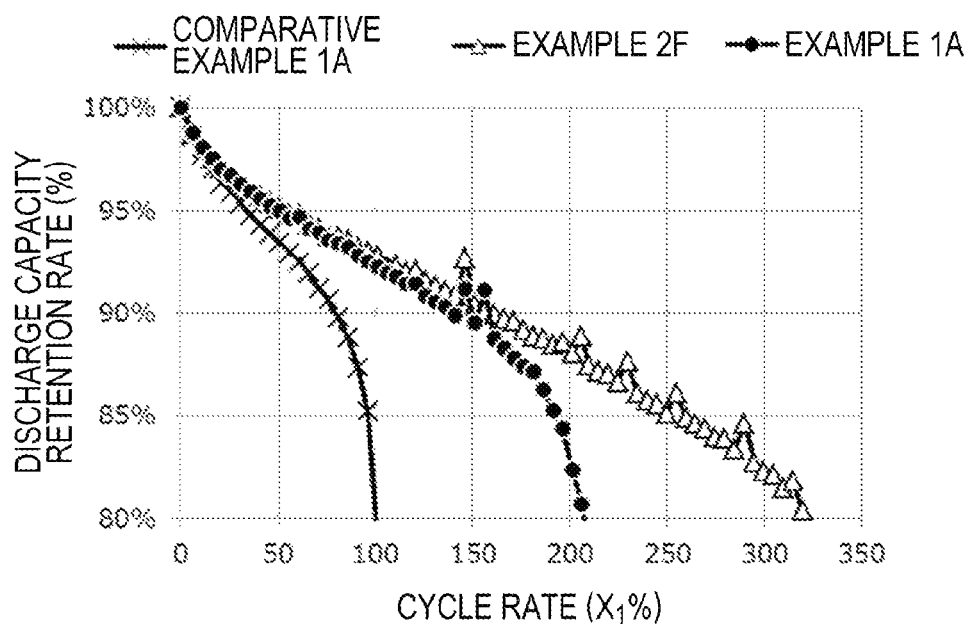
FIGS. 19A and 19B are a graph showing cycle characteristics and a graph showing the cycle transition of a charging time in the secondary battery charging method of Example 2F, Example 1A, and Comparative Example 1A, respectively.
Figure 19B:
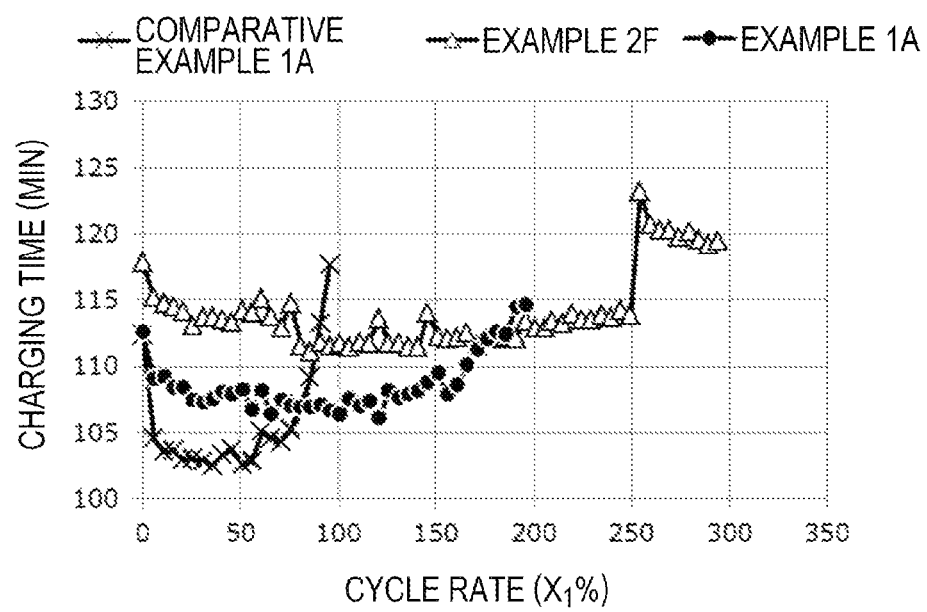

FIGS. 17A and 17B are graphs showing a relation between a charge voltage and a charge current with respect to a depth of charge at the first cycle in a secondary battery charging method of Example 2D, Example 2E, and Example 2F. Further, FIGS. 18A and 18B are a graph showing cycle characteristics and a graph showing the cycle transition of a charging time in the secondary battery charging method of Example 2D, Example 2E, Example 1A, and Comparative Example 1A, respectively. FIGS. 19A and 19B are a graph showing cycle characteristics and a graph showing the cycle transition of a charging time in the secondary battery charging method of Example 2F, Example 1A, and Comparative Example 1A, respectively. The cycle rate $X_1$ is presented in the following Table 14. In addition, the charging time at the first cycle is also presented in Table 14.

From the above results, it is found that in Example 2D, Example 2E, and Example 2F, a further higher cycle rate $X_1$ is obtained and cycle characteristics are further improved. Moreover, it is found that a high cycle rate $X_1$ is obtained as the SOC value when constant current charging is performed at a constant current value of $0.5 \times I_0$ is increased. Furthermore, it is found that when constant current charging is performed in order of constant current charging performed at a constant current value of $1.5 \times I_0$, constant current charging performed at a constant current value $I_0$, and constant current charging performed at a constant current value of $0.5 \times I_0$, most excellent characteristics can be achieved without much lengthening of the charging time. That is, it is found that it is more preferable to perform constant current charging by combination with a constant current value $k_2 \cdot I_0$ (provided that, $1 < k_2 < 1.6$), and further, it is still further preferable to perform constant current charging at the constant current value $k_2 \cdot I_0$ before the constant current charging is performed at the constant current value $I_0$.

Figure 20:
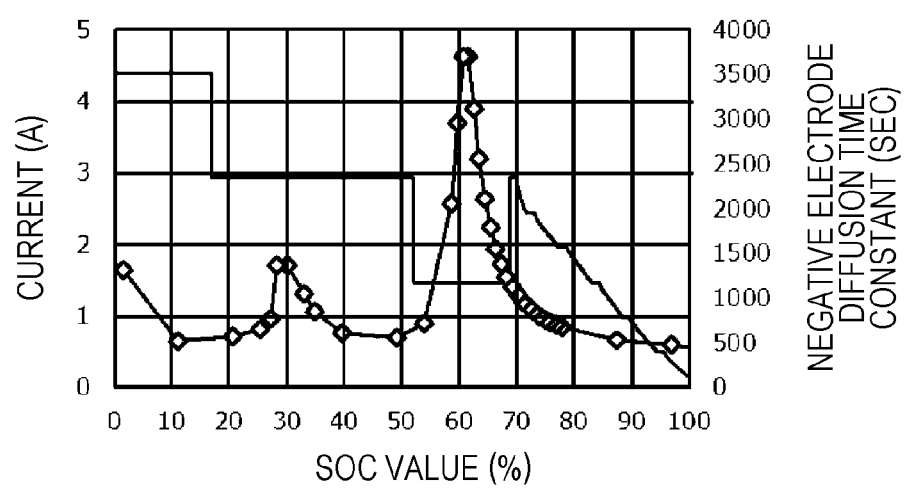
FIG. 20 is a graph showing a relation between a negative electrode diffusion time constant and a charge current value with respect to a depth of charge in the secondary battery charging method of Example 2F.

FIG. 20 shows a relation between a time constant of diffusion of lithium ions in the negative electrode (negative electrode diffusion time constant) and a charge current value with respect to a depth of charge in the secondary battery charging method of Example 2F.

It is found that in Comparative Example 1A, the value of the time constant of diffusion of lithium ions (negative electrode diffusion time constant) is high in the region where the depth of charge is high (around 60% in terms of SOC value) in the constant current charging. This indicates that diffusion of lithium ions in the negative electrode deteriorates. Therefore, in Example 2F, by controlling the charge current in the constant current charging, that is, by decreasing the charge current value in the region of around 60% in terms of SOC value, the value of the time constant of diffusion of lithium ions (negative electrode diffusion time constant) is decreased, and thus diffusion of lithium ions in the negative electrode is suppressed and capacity degradation in accordance with an increase in side reaction including precipitation of lithium is prevented.

Furthermore, in the second aspect of the present disclosure including the foregoing preferred aspect, when an average value of a negative electrode diffusion time constant during the constant current charging at the constant current value $I_0$ is regarded as A (sec) and an average value of a negative electrode diffusion time constant during the constant current charging at the constant current value $k_1 \cdot I_0$ is regarded as B (sec), the following in equation is satisfied.

$$0.1 \leq B/A \leq 5$$

More specifically, in Example 2F, B/A was 1.9.

Further, as results of various tests, it was recognized that cycle characteristics are degraded in accordance with an increase in the number of charge and discharge cycles and the SOC value when an increase in the negative electrode diffusion time constant is started tends to change to a low value. Herein, as the method for evaluating the degradation of the positive electrode and the negative electrode in accordance with an increase in the number of charge and discharge cycles, for example, Hannah M. Dahn, et al., "User-Friendly Differential Voltage Analysis Freeware for the Analysis of Degradation Mechanisms in Li-Ion Batteries", Journal of The Electrochemical Society, 159(9) A1405-A1409 (2012) can be exemplified. Therefore, it was found that it is preferable to decrease the SOC value at the time of completion of the constant current charging in accordance with an increase in the number of charge and discharge cycles.

Example 3

Example 3 relates to the charging control apparatus according to the first and second aspects of the present disclosure. Further, in Example 3, an application example of the secondary battery in the first and second aspects of the present disclosure (hereinafter, referred to as "the secondary battery of the present disclosure" in some cases) will be described.

Applications of the secondary battery in the present disclosure are not particularly limited as long as the secondary battery is applied to, for example, a machine, a device, an instrument, an apparatus, and a system (a collective entity of, for example, a plurality of devices) that are able to use the secondary battery in the present disclosure as a driving power source or an electric power storage source for electric power accumulation. The secondary battery (specifically, the lithium ion secondary battery) used as the power source may be a main power source (a power source used preferentially), or may be an auxiliary power source (a power source used instead of the main power source or used being switched from the main power source). In a case where the lithium ion secondary battery is used as the auxiliary power source, the kind of the main power source is not limited to the lithium ion secondary battery.

Specific examples of the applications of the secondary battery (specifically, the lithium ion secondary battery) in the present disclosure may include various electronic apparatuses such as a video camera or camcorder, a digital still camera, a mobile phone, a personal computer, a television receiver, various display devices, a cordless phone, a headphone stereo, a music player, a portable radio, electronic paper (such as an electronic book or electronic newspaper), and a portable information terminal including a personal digital assistant (PDA), and electrical apparatuses (including portable electronic apparatuses); toys; mobile lifestyle appliances such as an electric shaver; lighting apparatuses such as an interior lamp; medical electronic apparatuses such as a pacemaker and a hearing aid; storage devices such as a memory card; a battery pack used as an attachable and detachable power source of, for example, a personal computer; electric power tools such as an electric drill and an electric saw; an electric power storage system or home energy server (home electric power storage device) such as a home battery system for accumulation of electric power for, for example, emergency, and electric power supply system; an electric power storage unit and a backup power source; electric vehicles such as an electric motorcar, an electric motorcycle, an electric bicycle, and Segway®; and power/driving force converting devices (specifically, for example, driving motor) for aircraft or ships. The applications of the secondary battery are not limited to these examples.

In particular, the secondary battery (specifically, the lithium ion secondary battery) in the present disclosure is effectively applicable to, for example, the battery pack, the electric vehicle, the electric power storage system, the electric power supply system, the electric power tool, the electronic apparatuses, and the electrical apparatuses. In these applications, superior battery characteristics are demanded, and using the lithium ion secondary battery in the present disclosure makes it possible to effectively improve performance. The battery pack is a power source that uses the lithium ion secondary battery, and is a so-called assembled battery or the like. The electric vehicle is a vehicle that operates (runs) using the lithium ion secondary battery as a driving power source, and may be an automobile (such as a hybrid automobile) that includes together a drive source other than the secondary battery. The electric power storage system or electric power supply system is a system that uses the lithium ion secondary battery as an electric power storage source. For example, in a home electric power storage system (electric power supply system), electric power is accumulated in the lithium ion secondary battery that is the electric power storage source, which makes it possible to use, for example, home electric products using the accumulated electric power. The electric power tool is a tool in which a movable section (such as a drill) is allowed to be moved using the lithium ion secondary battery as a driving power source. The electronic apparatuses or electrical apparatuses are apparatuses that exhibit various functions using the lithium ion secondary battery as an operating power source (an electric power supply source).

Hereinafter, specific description is give of some application examples of the laminated film type secondary battery (the lithium ion secondary battery) in the present disclosure which have been described in Example 1 and Example 2. Incidentally, the configurations of the respective application examples described below are mere examples, and may be changed as appropriate.

The battery pack is a simple battery pack using one secondary battery in the present disclosure (a so-called soft pack) and is mounted in, for example, an electronic apparatus typified by a smartphone.

A charging control apparatus of Example 3 provided in controllers 1010, 2001, 3001, and 4001 described below performs, on the secondary battery, a process of:

performing constant current charging until a first predetermined voltage $V_0$ is attained, then performing constant voltage charging at the first predetermined voltage $V_0$, completing the first constant voltage charging when a charge current becomes $(I_n - \Delta I_n)$ from $I_n$, and then incrementing n by one, and performing constant voltage charging at a voltage $V_n = V_{n-1} + \Delta V_n$, repeating a step of completing the n-th constant voltage charging when the charge current becomes $(I_n-\Delta I_n)$ from $I_n$, by incrementing n by one, and completing the N-th constant voltage charging in which a value of the voltage $V_n$ reaches a second predetermined voltage $V_N (>V_O)$ to terminate the constant voltage charging.

The controller 1010 may be formed as one chip.

Alternatively, the charging control apparatus of Example 3 provided in the controllers 1010, 2001, 3001, and 4001 described below performs, on the secondary battery, a process of:

when a value of a constant current in constant current charging is regarded as $I_O$, performing constant current charging by combining a constant current value $k_1 \cdot I_O$ (provided that, $0.4 < k_1 < 1$) and the constant current value $I_O$, and then performing constant voltage charging.

Furthermore, constant current charging is performed until a first predetermined voltage $V_O$ is attained, then constant voltage charging is performed at the first predetermined voltage $V_O$, the first constant voltage charging is completed when a charge current becomes $(I_n-\Delta I_n)$ from $I_n$, and then n is incremented by one, and constant voltage charging is performed at a voltage $V_n = V_{n-1} + \Delta V_n$, a step of completing the n-th constant voltage charging when the charge current becomes $(I_n-\Delta I_n)$ from $I_n$ is repeated by incrementing n by one, and the N-th constant voltage charging in which a value of the voltage $V_n$ reaches a second predetermined voltage $V_N (>V_O)$ is completed to terminate the constant voltage charging.

Figure 4:
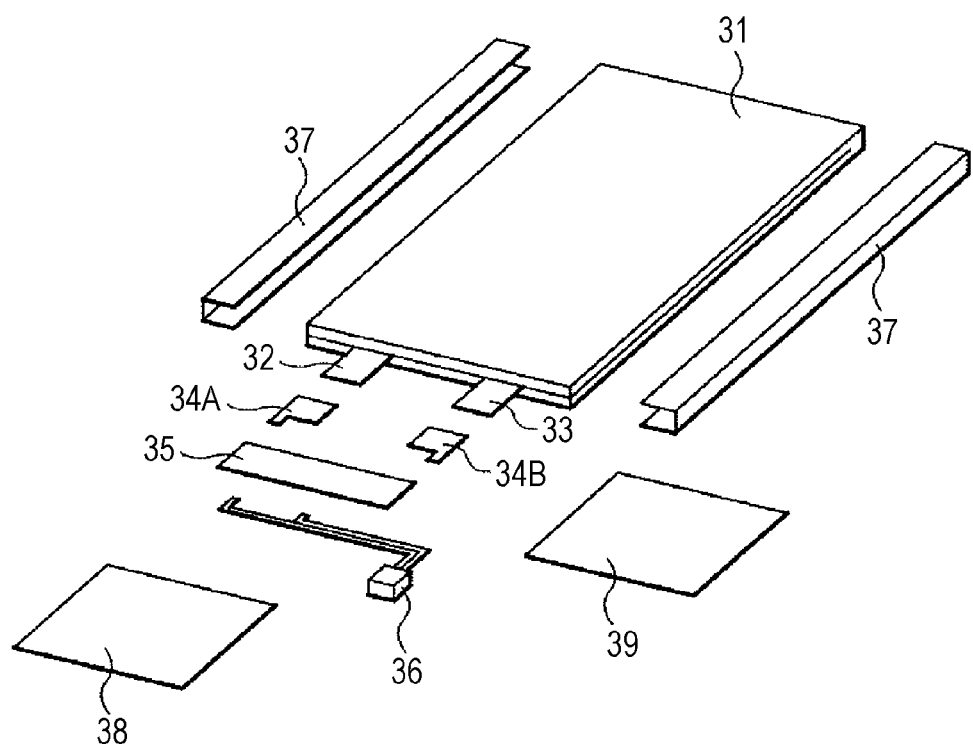
FIG. 4 is a schematic exploded perspective view of an application example (a battery pack: a single battery) of the lithium ion secondary battery in the present disclosure in Example 1.
Figure 5:
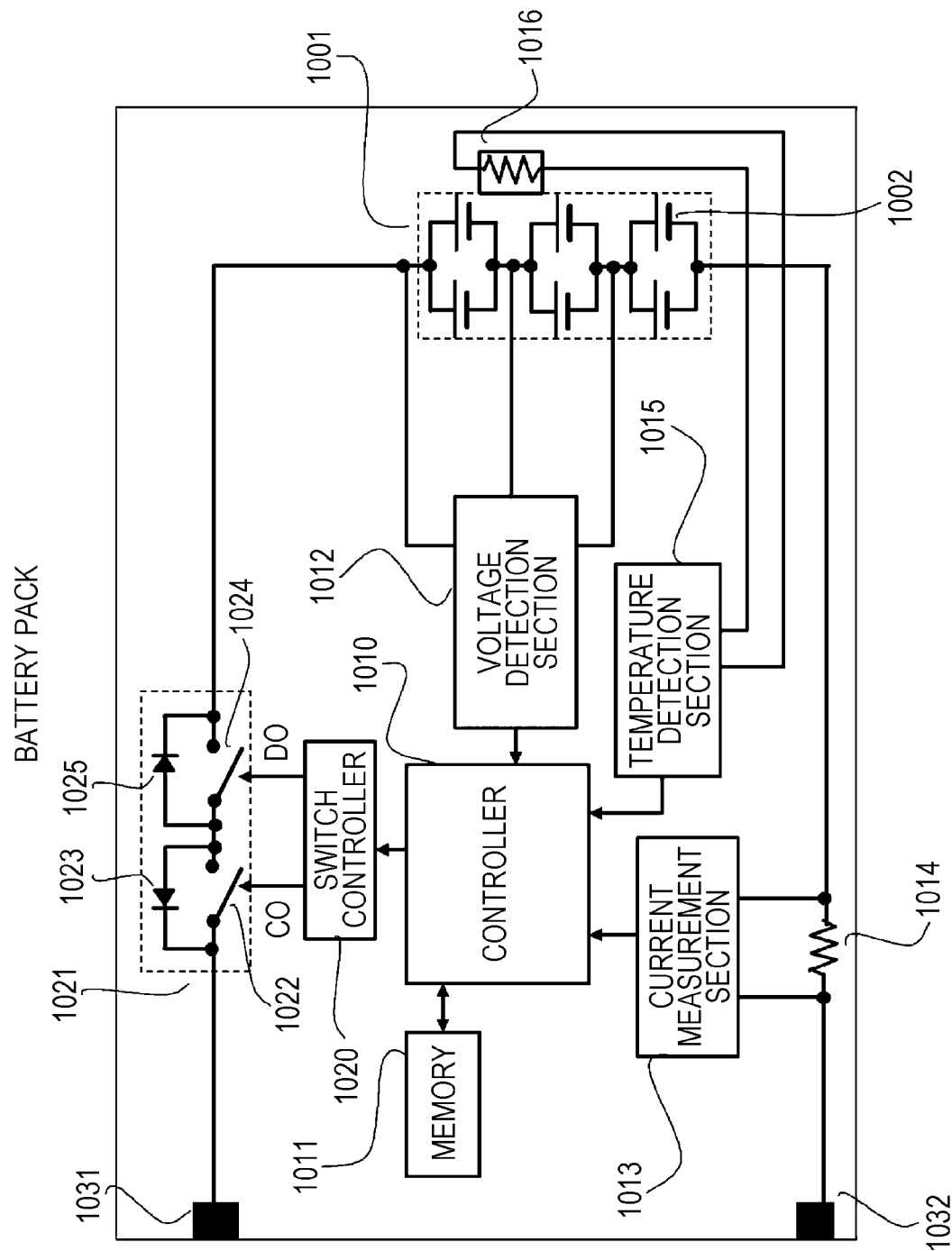
FIG. 5 is a block diagram illustrating a circuit configuration example in a case where the secondary battery in the present disclosure described in Example 1 and Example 2 is applied to a battery pack.

A schematic perspective view in which a battery pack in a case where the secondary battery in the present disclosure is applied to the battery pack is exploded is illustrated in FIG. 4, and a block diagram illustrating a circuit configuration example in a case where the secondary battery in the present disclosure is applied to the battery pack is illustrated in FIG. 5. The battery pack includes a cell (an assembled battery) 1001, an outer package member, a switch section 1021, a current detection resistor 1014, a temperature detecting element 1016, and a controller 1010. The switch section 1021 includes a charge control switch 1022 and a discharge control switch 1024. In addition, the battery pack includes a positive electrode terminal 1031 and a negative electrode terminal 1032. At the time of charging, the positive electrode terminal 1031 and the negative electrode terminal 1032 are connected to a positive electrode terminal and a negative electrode terminal of a battery charger, respectively, and thus charging is performed. Further, at the time of using the electronic apparatus, the positive electrode terminal 1031 and the negative electrode terminal 1032 are connected to a positive electrode terminal and a negative electrode terminal of the electronic apparatus, respectively, and thus discharging is performed.

The cell 1001 is configured such that a plurality of secondary batteries 1002 in the present disclosure are connected in series and/or in parallel. Incidentally, FIG. 5 illustrates a case where six secondary batteries 1002 are connected in an arrangement of two cells in parallel and three cells in series (2P3S). However, any connection method, such as p cells in parallel and q cells in series (provided that, p and q are integers), may be employed. That is, the connection form of the secondary batteries may be in series, in parallel, or in a mixed type thereof.

The switch section 1021 includes the charge control switch 1022 and a diode 1023, and the discharge control switch 1024 and a diode 1025, and is controlled by the controller 1010. The diode 1023 has a polarity in an opposite direction to a charge current flowing in a direction from the positive electrode terminal 1031 to the cell 1001 and in a forward direction with respect to the discharge current flowing from the negative electrode terminal 1032 to the cell 1001. The diode 1025 has a polarity in a forward direction with respect to the charge current and in an opposite direction to the discharge current. Incidentally, in the example, the switch section is provided at the plus (+) side, but may be provided at the minus (-) side. The charge control switch 1022 is controlled by the controller 1010 such that the charge control switch is turned off in a case where the battery voltage reaches the overcharge detection voltage and no charge current flows through the current path of the cell 1001. After the turning-off of the charge control switch 1022, only discharging is enabled by means of the diode 1023. Further, the charge control switch 1022 is controlled by the controller 1010 such that the charge control switch is turned off in a case where a large current flows at the time of charging and cuts off the charge current flowing through the current path of the cell 1001. The discharge control switch 1024 is controlled by the controller 1010 such that the charge control switch is turned off in a case where the battery voltage reaches the overdischarge detection voltage and no discharge current flows through the current path of the cell 1001. After the turning-off of the discharge control switch 1024, only charging is enabled by means of the diode 1025. Further, the discharge control switch 1024 is controlled by the controller 1010 such that the discharge control switch is turned off in a case where a large current flows at the time of discharging and cuts off the discharge current flowing through the current path of the cell 1001.

The temperature detecting element 1016 is, for example, formed by a thermistor, and is provided near the cell 1001. The temperature measurement section 1015 measures the temperature of the cell 1001 using the temperature detecting element 1016 and sends the measurement result to the controller 1010. A voltage measurement section 1012 measures the voltage of the cell 1001 and the voltage of each secondary battery 1002 that constitutes the cell 1001, performs A/D conversion of the measurement result, and sends the converted result to the controller 1010. A current measurement section 1013 measures a current using the current detection resistor 1014 and sends the measurement result to the controller 1010.

A switch controller 1020 controls the charge control switch 1022 and the discharge control switch 1024 of the switch section 1021 on the basis of the voltage and the current sent from the voltage measurement section 1012 and the current measurement section 1013. The switch controller 1020 prevents overcharge, overdischarge, and overcurrent charge and discharge by sending a control signal to the switch section 1021 when any of the voltages of the secondary batteries 1002 becomes the overcharge detection voltage or the overdischarge detection voltage or less, or when the large current drastically flows. The charge control switch 1022 and the discharge control switch 1024 can be configured, for example, by a semiconductor switch such as MOSFET. In this case, the diodes 1023 and 1025 are configured by a parasitic diode of the MOSFET. In a case where a p-channel FET is used as the MOSFET, the switch controller 1020 supplies control signals DO and CO to respective gates of the charge control switch 1022 and the discharge control switch 1024. The charge control switch 1022 and the discharge control switch 1024 are turned on by a gate potential that is lower than a source potential by a predetermined value or more. That is, in normal charge and discharge operations, the control signals CO and DO are set to a low level, and the charge control switch 1022 and the discharge control switch 1024 are turned to be an on state.

Then, at the time of overcharge or overdischarge, for example, the control signals CO and DO are set to a high level, and the charge control switch 1022 and the discharge control switch 1024 are turned to be an off state.

A memory 1011 is configured, for example, by an erasable programmable read only memory (EPROM) that is a non-volatile memory, or the like. The memory 1011 may store, in advance, numerical values calculated by the controller 1010 and internal resistance values of the secondary battery in the initial state of each secondary battery 1002 to be measured in the stage of a manufacturing process, and the like, and may be appropriately rewritable. Further, in a case where the full charge capacity of the secondary battery 1002 is stored, for example, remaining capacity can be calculated together with the controller 1010.

In the temperature measurement section 1015, temperature is measured using the temperature detecting element 1016, charge and discharge control is performed at the time of abnormal heat generation, and correction in calculation of remaining capacity is performed.

Figure 6A:
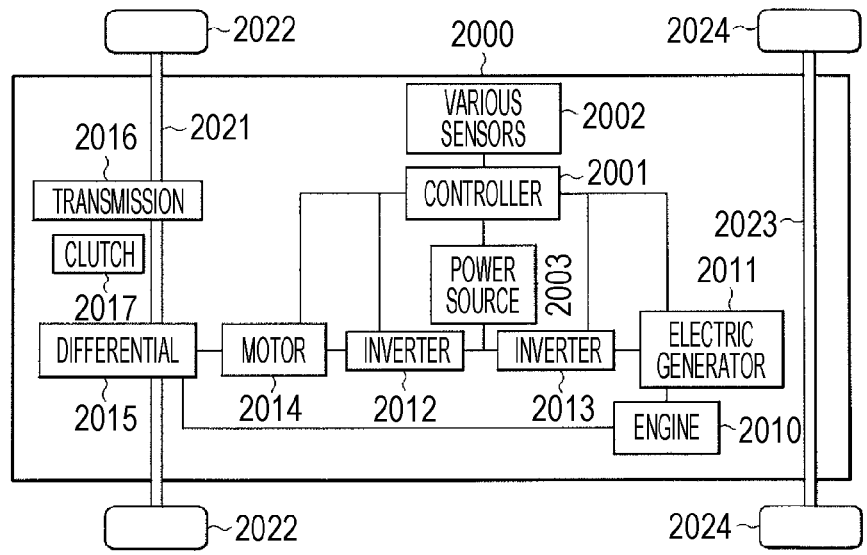
FIGS. 6A, 6B, and 6C are a block diagram illustrating a configuration of an application example (an electric vehicle) of the present disclosure in Example 3, a block diagram illustrating a configuration of an application example (an electric power storage system) of the present disclosure in Example 3, and a block diagram illustrating a configuration of an application example (an electric power tool) of the present disclosure in Example 3, respectively.

Next, FIG. 6A is a block diagram illustrating a configuration of an electric vehicle of a hybrid automobile that is an example of the electric vehicle. The electric vehicle includes, for example, a controller 2001, various sensors 2002, a power source 2003, an engine 2010, an electric generator 2011, inverters 2012 and 2013, a driving motor 2014, a differential 2015, a transmission 2016, and a clutch 2017 inside a housing 2000 made of metal. Other than the components mentioned above, the electric vehicle includes, for example, a front drive shaft 2021, a front tire 2022, a rear drive shaft 2023, and a rear tire 2024 that are connected to the differential 2015 and the transmission 2016.

The electric vehicle is runnable with use of any one of the engine 2010 and the motor 2014 as a drive source. The engine 2010 is a main power source, and is, for example, a gasoline engine or the like. In a case where the engine 2010 is used as the power source, drive power (torque) of the engine 2010 is transmitted to the front tire 2022 or the rear tire 2024 via the differential 2015, the transmission 2016, and the clutch 2017 that are drive sections, for example. The torque of the engine 2010 is also transmitted to the electric generator 2011. With use of the torque, the electric generator 2011 generates alternating-current electric power. The alternating-current electric power is converted into direct-current electric power via the inverter 2013, and the converted electric power is accumulated in the power source 2003. Meanwhile, in a case where the motor 2014 that is a conversion section is used as the power source, electric power (direct-current electric power) supplied from the power source 2003 is converted into alternating-current electric power via the inverter 2012, and the motor 2014 is driven using the alternating-current electric power. The drive power (torque) converted from the electric power by the motor 2014 is transmitted to the front tire 2022 or the rear tire 2024 via the differential 2015, the transmission 2016, and the clutch 2017 that are drive sections, for example.

When speed of the electric vehicle is decreased by a brake mechanism (not illustrated), resistance at the time of speed reduction may be transmitted to the motor 2014 as torque, and the motor 2014 may generate alternating-current electric power with use of the torque. The alternating-current electric power is converted into direct-current electric power via the inverter 2012, and the direct-current regenerative electric power is accumulated in the power source 2003.

The controller 2001 controls an operation of the entire electric vehicle, and includes, for example, a CPU or the like. The power source 2003 includes one or two or more secondary batteries (not illustrated) described in Example 1 and Example 2. The power source 2003 can be configured to be connected to an external power source and accumulate electric power by receiving electric power supply from the external power source. The various sensors 2002 are used, for example, for control of the number of revolutions of the engine 2010 and for control of an opening level (a throttle opening level) of a throttle valve (not illustrated). The various sensors 2002 include, for example, a speed sensor, an acceleration sensor, an engine frequency sensor, and the like.

Incidentally, the description has been given of a case where the electric vehicle is a hybrid automobile, but the electric vehicle may be a vehicle (an electric automobile) that operates using only the power source 2003 and the motor 2014 without using the engine 2010.

Figure 6B:
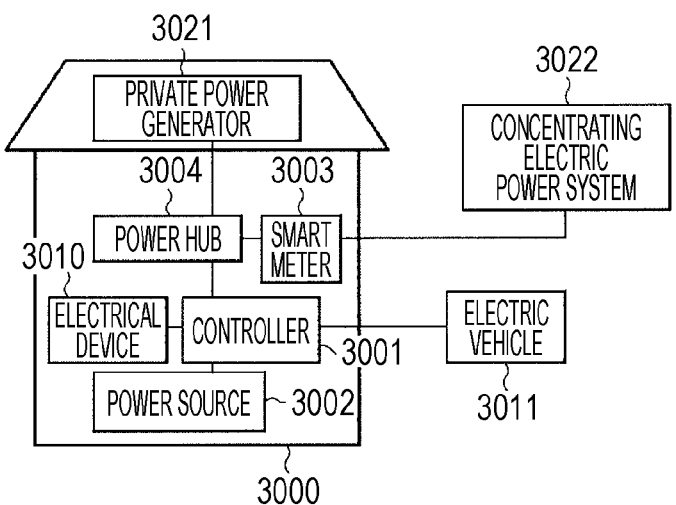

Next, FIG. 6B is a block diagram illustrating a configuration of an electric power storage system (an electric power supply system). The electric power storage system includes, for example, a controller 3001, a power source 3002, a smart meter 3003, and a power hub 3004 inside a house 3000 such as a general residence or a commercial building.

For example, the power source 3002 can be connected to an electrical device (electronic device) 3010 provided inside the house 3000 and be connected to an electric vehicle 3011 parked outside the house 3000. In addition, for example, the power source 3002 can be connected to a private power generator 3021 provided in the house 3000 via the power hub 3004 and be connected to an outside concentrating electric power system 3022 via the smart meter 3003 and the power hub 3004. The electrical device (electronic device) 3010 includes, for example, one or two or more home electric products. Examples of the home electric products may include a refrigerator, an air conditioner, a television receiver, a water heater, and the like. The private power generator 3021 is configured, for example, by a solar power generator, a wind power generator, or the like. Examples of the electric vehicle 3011 may include an electric motorcar, a hybrid automobile, an electric motorcycle, an electric bicycle, Segway®, and the like. Examples of the concentrating electric power system 3022 may include a commercial power source, a power generating device, a power grid, and a smart grid (a next-generation power grid), and may also include a thermal power plant, an atomic power plant, a hydraulic power plant, a wind power plant, and the like. Examples of the power generating device provided in the concentrating electric power system 3022 may include various photovoltaic cells, fuel cells, wind power generating devices, micro hydro power generating devices, geothermal power generating devices, and the like, but the power generating device is not limited thereto.

The controller 3001 controls an operation of the entire electric power storage system (including a used state of the power source 3002) and includes, for example, a CPU or the like. The power source 3002 includes one or two or more secondary batteries (not illustrated) described in Example 1 and Example 2. The smart meter 3003 is, for example, an electric power meter that is compatible with a network and is provided in the house 3000 demanding electric power, and is communicable with an electric power supplier. Accordingly, for example, while the smart meter 3003 communicates, for example, with outside, the smart meter 3003 controls balance between supply and demand in the house 3000, which allows for effective and stable energy supply.

In the electric power storage system, for example, electric power is accumulated in the power source 3002 from the concentrating electric power system 3022 that is an external power source via the smart meter 3003 and the power hub 3004, and the electric power is accumulated in the power source 3002 from the private power generator 3021 that is an independent power source via the power hub 3004. The electric power accumulated in the power source 3002 is supplied to the electrical device (electronic device) 3010 and the electric vehicle 3011 in accordance with an instruction from the controller 3001. This allows the electrical device (electronic device) 3010 to be operable and allows the electric vehicle 3011 to be chargeable. That is, the electric power storage system is a system that makes it possible to accumulate and supply electric power in the house 3000 with use of the power source 3002.

The electric power accumulated in the power source 3002 is allowed to be utilized optionally. Hence, for example, electric power can be accumulated in the power source 3002 from the concentrating electric power system 3022 in the middle of night when an electric rate is inexpensive, and the electric power accumulated in the power source 3002 can be used during daytime hours when the electric rate is expensive.

The foregoing electric power storage system may be provided for each household (each family unit) or may be provided for a plurality of households (a plurality of family units).

Figure 6C:
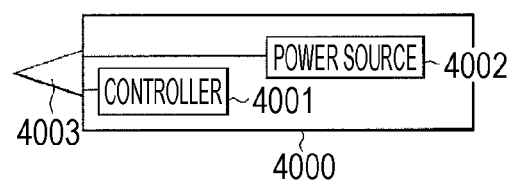

Next, FIG. 6C is a block diagram illustrating a configuration of an electric power tool. The electric power tool is, for example, an electric drill and includes a controller 4001 and a power source 4002 inside a tool body 4000 made of a plastic material or the like. A drill section 4003 that is a movable section is attached to the tool body 4000 in a rotatable manner, for example. The controller 4001 controls an operation of the entire electric power tool (including a used state of the power source 4002) and includes, for example, a CPU or the like. The power source 4002 includes one or two or more secondary batteries (not illustrated) described in Example 1 and Example 2. The controller 4001 allows electric power to be supplied from the power source 4002 to the drill section 4003 in accordance with an operation by an operation switch (not illustrated).

Example 4

Figure 21:
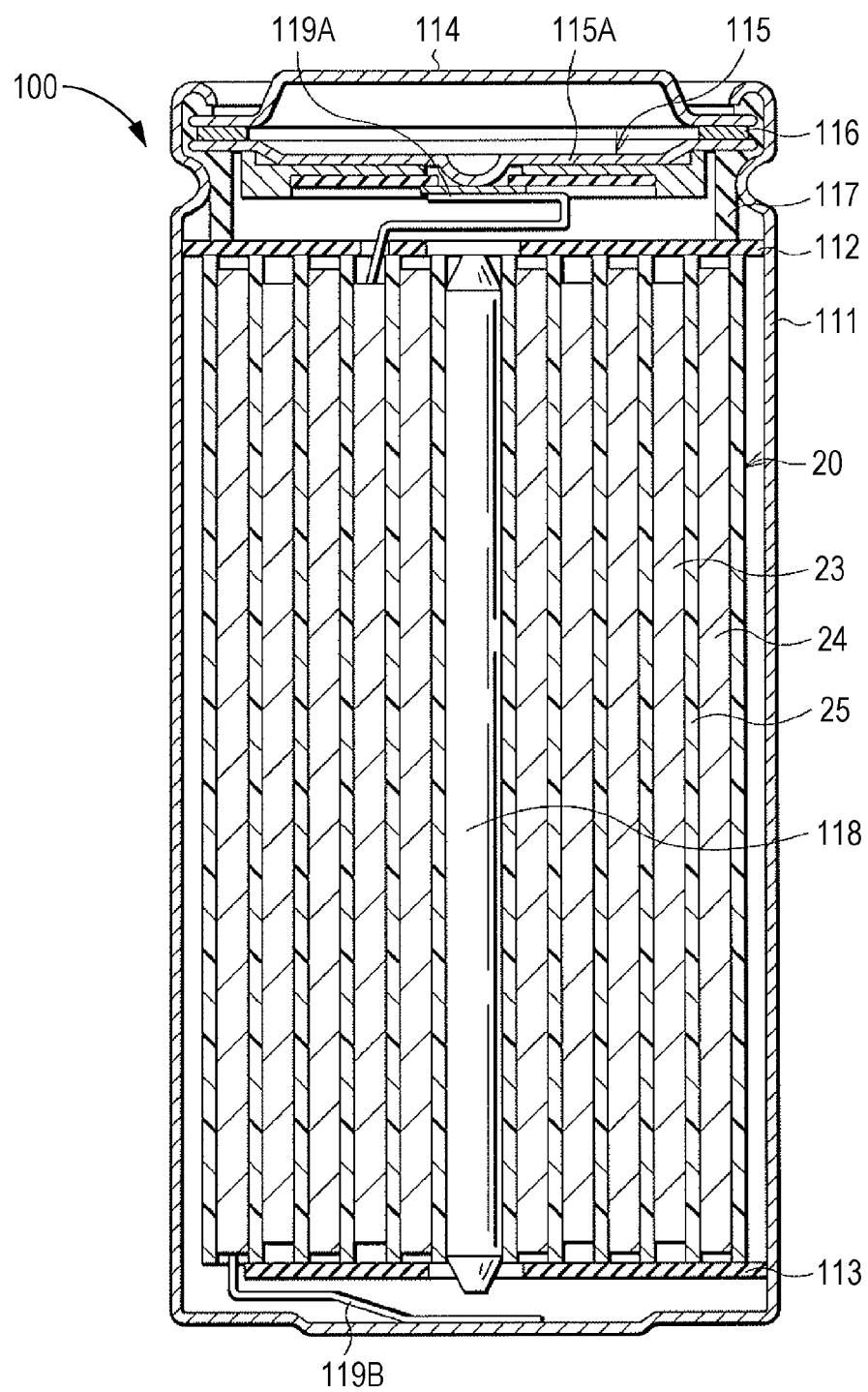
FIG. 21 is a schematic exploded perspective view of a cylindrical lithium ion secondary battery of Example 4.

Example 4 is a modification of Example 1 to Example 3. A lithium ion secondary battery of Example 4 is configured as a cylindrical lithium ion secondary battery. FIG. 21 is a schematic cross-sectional view of the lithium ion secondary battery of Example 4. Incidentally, a schematic enlarged partial cross-sectional view of the spirally wound electrode body 20 is similar to that illustrated in FIG. 3A.

In a lithium ion secondary battery 100 of Example 4, the spirally wound electrode body 20 and a pair of insulating plates 112 and 113 are contained in a battery can 111 that is substantially shaped in a hollow cylinder. The spirally wound electrode body 20 can be produced, for example, by laminating the positive electrode 23 and the negative electrode 24 with the separator 25 interposed therebetween to obtain a laminate and then spirally winding the obtained laminate.

The battery can 111 has a hollow structure in which one end of the battery can is closed and the other end thereof is open, and is made of iron (Fe), aluminum (Al), or the like. A surface of the battery can 111 may be plated with nickel (Ni) or the like. The pair of insulating plates 112 and 113 is so disposed as to interpose the spirally wound electrode body 20 therebetween and extend perpendicularly to a spirally wound periphery surface of the spirally wound electrode body 20. At the open end of the battery can 111, a battery cover 114, a safety valve mechanism 115, and a positive temperature coefficient device (PTC device) 116 are swaged with a gasket 117, by which the battery can 111 is hermetically sealed. The battery cover 114 is made of, for example, a similar material to the material of the battery can 111. The safety valve mechanism 115 and the positive temperature coefficient device 116 are provided on the inner side of the battery cover 114, and the safety valve mechanism 115 is electrically connected to the battery cover 114 via the positive temperature coefficient device 116. In the safety valve mechanism 115, when an internal pressure of the battery can reaches a certain level or higher as a result of, for example, internal short circuit or heating from outside, a disk plate 115A inverts. Then, this cuts electric connection between the battery cover 114 and the spirally wound electrode body 20. In order to prevent abnormal heat generation resulting from a large current, resistance of the positive temperature coefficient device 116 increases as a temperature rises. The gasket 117 is made of, for example, an insulating material. A surface of the gasket 117 may be coated with asphalt or the like.

A center pin 118 is inserted in the center of the spirally wound electrode body 20. However, the center pin 118 may not be inserted in the center of the spirally wound electrode body. A positive electrode lead 119A made of a conductive material such as aluminum is connected to the positive electrode 23. Specifically, the positive electrode lead 119A is attached to the positive electrode current collector 23A. A negative electrode lead 119B made of a conductive material such as copper or nickel is connected to the negative electrode 24. Specifically, the negative electrode lead 119B is connected to the negative electrode current collector 24A. In addition, the positive electrode lead 119A is welded to the safety valve mechanism 115 and is electrically connected to the battery cover 114. The negative electrode lead 119B is welded to the battery can 111 and is electrically connected to the battery can 111. Incidentally, in an example illustrated in FIG. 21, the negative electrode lead 119B is provided on one place (the outermost periphery of the spirally wound electrode body 20), but may be provided on two places (the outermost periphery and the innermost periphery of the spirally wound electrode body 20) in some cases.

In the case of producing the positive electrode 23, first, lithium carbonate $<Li_2CO_3>$ and cobalt carbonate $<CoCO_3>$ are mixed and the mixture is then fired (900° C.×5 hours) in air to obtain lithium-containing composite oxide ($LiCoO_2$). In this case, the mixing ratio is, for example, $Li_2CO_3$:$CoCO_3$=0.5:1 at molar ratio. Then, 91 parts by mass of a positive electrode active material ($LiCoO_2$), 3 parts by mass of a positive electrode binder (polyvinylidene fluoride), and 6 parts by mass of a positive electrode conducting agent (graphite) are mixed to obtain a positive electrode mixture. Then, the positive electrode mixture is mixed with an organic solvent (N-methyl-2-pyrrolidone) to obtain paste positive electrode mixture slurry. Thereafter, the positive electrode mixture slurry is applied on both surfaces of the strip-shaped positive electrode current collector 23A (an aluminum foil having a thickness of 12 km) using a coating apparatus, and then the positive electrode mixture slurry is dried to form the positive electrode active material layer 23B. Then, the positive electrode active material layer 23B is compression-molded using a roll pressing machine.

In a case where $Li_{1.15}(Mn_{0.65}Ni_{0.22}Co_{0.13})_{0.85}O_2$ is used as the positive electrode active material, first, nickel sulfate $<NiSO_4>$, cobalt sulfate $<CoSO_4>$, and manganese sulfate <MnSO₄> are mixed. Then, the mixture is dispersed in water to prepare an aqueous solution. Subsequently, sodium hydroxide <NaOH> was added to the aqueous solution while the aqueous solution was sufficiently stirred, thereby obtaining a coprecipitate (a manganese-nickel-cobalt composite coprecipitated hydroxide). Thereafter, the coprecipitate was washed with water and dried, and then lithium hydroxide monohydrate was added to the coprecipitate to obtain a precursor. Then, the precursor was fired (800° C.×10 hours) in air so that it was possible to obtain the above-described positive electrode active material.

Further, in a case where $LiNi_{0.5}Mn_{1.50}O_4$ is used as the positive electrode active material, first, lithium carbonate <$Li_2CO_3$>, manganese oxide <$MnO_2$>, and nickel oxide <NiO> are weighed and the weighed materials are mixed using a ball mill. In this case, the mixing ratio (molar ratio) of the main elements was set to Ni:Mn=25:75. Next, the mixture was fired (800° C.×10 hours) in air and then cooled. Then, the fired product was mixed again using the ball mill and then the fired product was fired again (700° C.×10 hours) in air so that it was possible to obtain the above-described positive electrode active material.

Alternatively, as the positive electrode active material, a compound represented by the following Formula (A) or a LiNiMnO-based material can also be used.

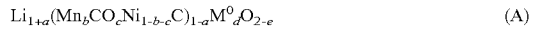

$$Li_{1+a}(Mn_bCo_cNi_{1-b-c}C)_{1-a}M^0_dO_{2-e} \quad (A)$$

Herein, "$M^0$" is at least one of elements that belong to Group 2 to Group 15 in the long period periodic table (provided that, manganese, cobalt, and nickel are excluded), and the following in equations are satisfied: 0<a<0.25, 0.3≤b<0.7, 0≤c<1−b, 0≤d≤1, and 0≤e≤1. Specifically, $Li_{1.15}(Mn_{0.65}Ni_{0.22}Co_{0.13})_{0.85}O_2$ can be exemplified. In addition, as the LiNiMnO-based material, specifically, $LiNi_{0.5}Mn_{1.50}O_4$ can be exemplified.

In the case of producing the negative electrode 24, first, 97 parts by mass of a negative electrode active material (graphite) and 3 parts by mass of a negative electrode binder (polyvinylidene fluoride) are mixed to obtain a negative electrode mixture. The average particle diameter $d_{50}$ of graphite is set to 20 μm. Further, as the negative electrode binder, for example, a mixture of 1.5 parts by mass of an acrylic-modified product of a styrene-butadiene copolymer and 1.5 parts by mass carboxymethylcellulose is used. Then, the negative electrode mixture is mixed with water to obtain paste negative electrode mixture slurry. Subsequently, the negative electrode mixture slurry is applied on both surfaces of the strip-shaped negative electrode current collector 24A (a copper foil having a thickness of 15 μm) using a coating apparatus, and then the negative electrode mixture slurry is dried to form the negative electrode active material layer 24B. Then, the negative electrode active material layer 24B is compression-molded using a roll pressing machine.

The separator 25 is formed from a microporous polyethylene film having a thickness of 20 μm. In addition, the spirally wound electrode body 20 is impregnated with the organic electrolytic solution or non-aqueous electrolytic solution that is a liquid electrolyte described in Example 1.

An insulating material may be provided in any part in a region between the positive electrode active material contained in the positive electrode 23 and the negative electrode active material contained in the negative electrode 24 (a region between the active materials). The place at which the insulating material is arranged is not particularly limited as long as it is in any part in the region between the active materials. That is, the insulating material may be present in the positive electrode 23 (the positive electrode active material layer 23B), may be present in the negative electrode 24 (the negative electrode active material layer 24B), or may be present between the positive electrode 23 and the negative electrode 24. To give an example, for the place at which the insulating material is arranged, for example, as described below, three aspects can be exemplified.

Figure 3B:
FIG. 3B is a schematic cross-sectional view for describing a first aspect relating to arrangement of insulating materials.

In a first aspect, as illustrated in FIG. 3B, the positive electrode active material layer 23B contains a particulate positive electrode active material 211. Then, a layer containing an insulating material (an active material insulating layer 212 that is a first insulating layer) is formed on the surface of the positive electrode active material 211. Only a part of the surface of the positive electrode active material 211 may be coated with the active material insulating layer 212 or the entire surface may be coated therewith. In a case where a part of the surface of the positive electrode active material 211 is coated with the active material insulating layer 212, a plurality of active material insulating layers 212 separated from each other may exist. The active material insulating layer 212 may be a single layer or a multilayer.

The active material insulating layer 212 is formed from an inorganic insulating material such as insulating ceramics, an organic insulating material such as an insulating polymer compound, or an inorganic insulating material and an organic insulating material. Specific examples of the insulating ceramics may include aluminum oxide <$Al_2O_3$>, silicon oxide <$SiO_2$>, magnesium oxide <MgO>, titanium oxide <$TiO_2$>, and zirconium oxide <$ZrO_2$>, and may also include $LiNbO_3$, LIPON <$Li_{3+y}PO_{4-x}N_x$, provided that, 0.5≤x≤1, −0.3<y<0.3>, a material that is called Lithium-Super-IOn-CONductor (LISICON), Thio-LISICON (for example, $Li_{3.25}Ge_{0.25}PO_{0.75}S_4$), $Li_2S$, $Li_2S$—$P_2S_5$, $Li_2S$—$SiS_2$, $Li_2S$—$GeS_2$, $Li_2S$—$B_2S_5$, $Li_2S$—$Al_2S_5$, and $Li_2O$—$Al_2O_3$—$TiO_2$—$P_2O_5$(LATP). The insulating polymer compound can be configured to be similar to the material that constitutes a positive electrode binder or a negative electrode binder, but of them, a homopolymer of vinylidene fluoride (for example, polyvinylidene fluoride) or a copolymer of vinylidene fluoride (for example, a copolymer of vinylidene fluoride and hexafluoropropylene) is preferable. The reason for this is that the homopolymer or copolymer of vinylidene fluoride is excellent in physical strength and is electrochemically stable. A monomer that is copolymerized with vinylidene fluoride may be a monomer other than hexafluoropropylene.

Figure 3C:
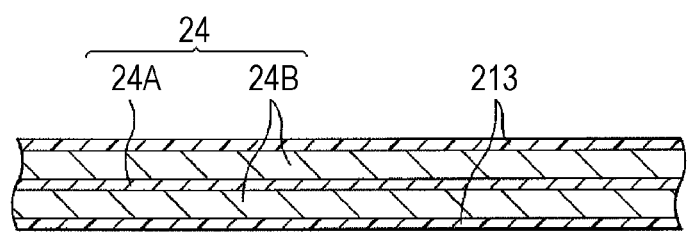
FIG. 3C is a schematic partial cross-sectional view for describing a second aspect relating to arrangement of insulating materials.

In a second aspect, as illustrated in FIG. 3C, a layer containing an insulating material (a negative electrode insulating layer 213 that is a second insulating layer) is provided on the surface of the negative electrode 24 (the negative electrode active material layer 24B). The details of the coating state, the layer structure, the constituent material, and the like of the negative electrode insulating layer 213 are similar to those of the above-described active material insulating layer 212. Further, in this case, particularly, when the negative electrode insulating layer 213 contains an insulating polymer compound, adhesibility of the separator 25 with respect to the negative electrode 24 is improved so that the spirally wound electrode body 20 is difficult to strain. Further, with this arrangement, the decomposition reaction of the organic electrolytic solution or the non-aqueous electrolytic solution is suppressed and liquid leakage of the organic electrolytic solution or the non-aqueous electrolytic solution with which the separator 25 is impregnated is also suppressed. Therefore, even when charging and discharging are repeated, resistance is difficult to increase and the lithium ion secondary battery is difficult to swell.

Figure 3D:
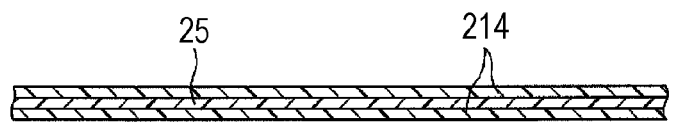
FIG. 3D is a schematic partial cross-sectional view for describing a third aspect relating to arrangement of insulating materials.

In a third aspect, as described in FIG. 3D, a layer containing an insulating material (a separator insulating layer 214 that is a third insulating layer) is provided on the surface of the separator 25. The separator insulating layer 214 may be provided on a surface of the separator 25 facing the positive electrode 23, on a surface of the separator 25 facing the negative electrode 24, or both surfaces of the separator 25. The details of the coating state, the layer structure, the constituent material, and the like of the separator insulating layer 214 are similar to those of the above-described active material insulating layer 212. Further, in this case, particularly, when the separator insulating layer 214 contains an insulating polymer compound, adhesibility of the separator 25 with respect to the positive electrode 23 and the negative electrode 24 is improved so that the similar advantage to a case where the negative electrode insulating layer 213 contains a polymer compound is obtained.

The lithium ion secondary battery of Example 4 can be produced on the basis of the following step, for example. That is, in the case of producing the positive electrode 23, first, a positive electrode active material, and if necessary, a positive electrode binder, a positive electrode conducting agent, and the like are mixed to obtain a positive electrode mixture. Then, the positive electrode mixture is mixed with an organic solvent or the like to obtain paste positive electrode mixture slurry. Subsequently, the positive electrode mixture slurry is applied on both surfaces of the positive electrode current collector 23A, and then the positive electrode mixture slurry is dried to form the positive electrode active material layer 23B. Next, the positive electrode active material layer 23B is compression-molded using a roll pressing machine or the like while the positive electrode active material layer 23B is heated if necessary. In this case, compression molding may be repeated in plural times.

The procedure of forming the active material insulating layer 212 on the surface of the positive electrode active material 211 is, for example, as follows. Incidentally, a case where the active material insulating layer 212 contains insulating ceramics will be described as an example. In the case of forming the active material insulating layer 212, particles of the positive electrode active material 211 and particles of insulating ceramics are mixed. Then, with use of a ball mill, a jet mill, a stone mill, a fine grinding mill, or the like, the mixture is pulverized and mixed. In this case, a dispersion medium, such as water, or a solvent may be added to the mixture. According to this procedure, the insulating ceramics is deposited on the surface of the positive electrode active material 211 so that the active material insulating layer 212 is formed. Other than the method described above, the insulating ceramics may be deposited with use of a mechanochemical treatment such as mechano-fusion. Further, the insulating ceramics may be deposited on the surface of the positive electrode active material 211 on the basis of a PVD method, such as a sputtering method, or a CVD method. Alternatively, a sol-gel method may be used, and in this case, the positive electrode active material 211 may be impregnated with an alkoxide solution containing aluminum, silicon, and the like, a precursor layer may be deposited on the surface of the positive electrode active material 211, and then the precursor layer may be fired.

In the case of producing the negative electrode 24, the negative electrode active material layer 24B is formed on the negative electrode current collector 24A by the similar procedure to the case of the positive electrode 23. Specifically, a negative electrode active material, a negative electrode binder, a negative electrode conducting agent, and the like are mixed to obtain a negative electrode mixture, and then the negative electrode mixture is mixed with an organic solvent or the like to obtain paste negative electrode mixture slurry. Then, the negative electrode mixture slurry is applied on both surfaces of the negative electrode current collector 24A, and then the negative electrode mixture slurry is dried to form the negative electrode active material layer 24B. Then, the negative electrode active material layer 24B is compression-molded using a roll pressing machine, or the like.

The procedure of forming the negative electrode insulating layer 213 on the surface of the negative electrode active material layer 24B is, for example, as follows. Incidentally, a case where the negative electrode insulating layer 213 contains insulating ceramics and an insulating polymer compound will be described as an example. In the case of forming the negative electrode insulating layer 213, particles of the insulating ceramics, the insulating polymer compound, and a solvent such as N-methyl-2-pyrrolidone are mixed to disperse the particles of the insulating ceramics in the solvent and dissolve the insulating polymer compound in the solvent. Then, the negative electrode 24 is impregnated with the mixed liquid, and then the negative electrode 24 is extracted from the mixed liquid and dried. According to this procedure, the solvent in the mixed liquid is evaporated and the insulating polymer compound forms a film so that the negative electrode insulating layer 213 is formed on the surface of the negative electrode active material layer 24B. In this case, the negative electrode 24 may be pressurized before being dried to adjust the thickness of the negative electrode insulating layer 213. Instead of impregnating of the negative electrode 24 with the mixed liquid, the mixed liquid may be applied on the surface of the negative electrode active material layer 24B.

Alternatively, in the case of forming the negative electrode insulating layer 213, first, 80 parts by mass of powdery insulating ceramics and 20 parts by mass of an insulating polymer compound (polyvinylidene fluoride) are mixed and then the mixture is dispersed in an organic solvent to prepare a treatment solution. As the powdery insulating ceramics, aluminum oxide <$Al_2O_3$> and silicon oxide <$SiO_2$> are used. The average particle diameter $d_{50}$ of the insulating ceramics is set to 0.51 μm. Then, the negative electrode 24 is impregnated with the treatment solution, and then the thickness of the treatment solution supplied to the surface of the negative electrode 24 is adjusted using a gravure roller. Then, the treatment solution is dried at 120° C. using a dryer to evaporate the organic solvent in the treatment solution. In this way, the negative electrode insulating layer 213 can be formed on the surface of the negative electrode active material layer 24B. The thickness of the negative electrode insulating layer 213 is set to 5 μm, for example.

The procedure of forming the separator insulating layer 214 on the surface of the separator 25 is similar to the procedure of forming the above-described negative electrode insulating layer 213. In a case where the separator insulating layer 214 contains only the insulating polymer compound, except for a case where particles of the insulating ceramics are not used, the similar procedure to a case where the separator insulating layer 214 contains insulating ceramics and an insulating polymer compound may be used.

Alternatively, in the case of forming the separator insulating layer 214, first, a treatment solution is prepared on the basis of the similar procedure to the case of preparing the negative electrode insulating layer 213. Next, the separator 25 is impregnated with the treatment solution. Then, the separator 25 is pulled up from the treatment solution and the separator 25 is washed with water. Then, the treatment solution supplied to the surface of the separator 25 is dried at 80° C. by hot air to evaporate the organic solvent in the treatment solution. In this way, the separator insulating layer 214 can be formed on both surfaces of the separator 25. The thickness (the total thickness) of the separator insulating layer 214 formed on the both surfaces of the separator 25 is set to 4.5 μm, for example.

In a case where the lithium ion secondary battery is assembled using the positive electrode 23 and the negative electrode 24, the positive electrode lead 119A is attached to the positive electrode current collector 23A and the negative electrode lead 119B is attached to the negative electrode current collector 24A with use of a welding method or the like. Then, the positive electrode 23 and the negative electrode 24 are laminated with the separator 25 interposed therebetween and spirally wound (more specifically, a laminate of the positive electrode 23/the separator 25/the negative electrode 24/the separator 25 is spirally wound), the winding end portion of the spirally wound body is fixed with an adhesive tape to produce the spirally wound electrode body 20, and then the center pin 118 is inserted in the center of the spirally wound electrode body 20. Subsequently, the spirally wound electrode body 20 is contained inside of the battery can 111 while the spirally wound electrode body 20 is interposed between the pair of insulating plates 112 and 113. In this case, with use of a welding method or the like, tip portions of the positive electrode lead 119A are attached to the safety valve mechanism 115 and tip portions of the negative electrode lead 119B are attached to the battery can 111. Thereafter, an organic electrolytic solution or a non-aqueous electrolytic solution is injected in the inside of the battery can 111 on the basis of a decompression method, and the separator 25 is impregnated with the organic electrolytic solution or the non-aqueous electrolytic solution. Subsequently, at the open end of the battery can 111, the battery cover 114, the safety valve mechanism 115, and the positive temperature coefficient device 116 are swaged with the gasket 117.

When the insulating material is arranged in any part in the region between the active materials, a balance between battery characteristics and safety can be achieved. That is, when the insulating material is arranged in the region between the active materials, abnormality such as thermal runaway is difficult to occur inside of the lithium ion secondary battery, and thus safety is improved. Incidentally, such a configuration can be applied to Example 1 to Example 3.

Hereinbefore, the present disclosure has been described on the basis of preferred Examples, but the present disclosure is not intended to be limited to these Examples. Various modifications can be made. The configuration and the structure of the lithium ion secondary battery described in Examples are only for illustrative purposes, and can be arbitrarily changed. In addition, various technical matters described above related to the charging control apparatus can be applied to the charging apparatus. That is, by reading the charging control apparatus described above as the "charging apparatus," it is possible to achieve a charging apparatus that charges the secondary battery on the basis of the secondary battery charging method according to the first and second aspects of the present disclosure.

Hereinafter, the aforementioned positive electrode, negative electrode, non-aqueous electrolytic solution, and the like that constitute the lithium ion secondary battery will be described in detail.

The details of the lithium-containing composite oxide and the lithium-containing phosphate compound that are preferred materials constituting the material for the positive electrode are as follows. Incidentally, other elements that constitute the lithium-containing composite oxide and the lithium-containing phosphate compound are not particularly limited, but examples thereof may include any one or two or more kinds of elements that belong to Group 2 to Group 15 in the long period periodic table. From the viewpoint of achieving a high voltage, it is preferable to use nickel <Ni>, cobalt <Co>, manganese <Mn>, and iron <Fe>.

Specific examples of the lithium-containing composite oxide having a layered rock-salt crystal structure may include compounds represented by Formula (B), Formula (C), and Formula (D).

$$Li_aMn_{1-b-c}Ni_bM^{11}{}_cO_{2-d}F_e \quad (B)$$

Herein, $M^{11}$ is at least one element selected from the group consisting of cobalt <Co>, magnesium <Mg>, aluminum <Al>, boron <B>, titanium <Ti>, vanadium <V>, chromium <Cr>, iron <Fe>, copper <Cu>, zinc <Zn>, zirconium <Zr>, molybdenum <Mo>, tin <Sn>, calcium <Ca>, strontium <Sr>, and tungsten <W>, and values of a, b, c, d, and e satisfy $$0.8 \le a \le 1.2,$$

$$0 < b < 0.5,$$

$$0 \le c \le 0.5,$$

$$b+c<1,$$

$$-0.1 \le d \le 0.2, \text{ and}$$

$$0 \le e \le 0.1.$$

Here, the composition varies depending on charge and discharge states, and a is a value in a completely-discharged state.

$$Li_aNi_{1-b}M^{12}{}_bO_{2-c}F_d \quad (C)$$

Herein, $M^{12}$ is at least one element selected from the group consisting of cobalt <Co>, manganese <Mn>, magnesium <Mg>, aluminum <Al>, boron <B>, titanium <Ti>, vanadium <V>, chromium <Cr>, iron <Fe>, copper <Cu>, zinc <Zn>, molybdenum <Mo>, tin <Sn>, calcium <Ca>, strontium <Sr>, and tungsten <W>, and values of a, b, c, and d satisfy $$0.8 \le a \le 1.2,$$

$$0.005 \le b \le 0.5,$$

$$-0.1 \le c \le 0.2, \text{ and}$$

$$0 \le d \le 0.1.$$

Here, the composition varies depending on charge and discharge states, and a is a value in a completely-discharged state.

$$Li_aC_{1-b}M^{13}{}_bO_{2-c}F_d \quad (D)$$

Herein, $M^{13}$ is at least one element selected from the group consisting of nickel <Ni>, manganese <Mn>, magnesium <Mg>, aluminum <Al>, boron <B>, titanium <Ti>, vanadium <V>, chromium <Cr>, iron <Fe>, copper <Cu>, zinc <Zn>, molybdenum <Mo>, tin <Sn>, calcium <Ca>, strontium <Sr>, and tungsten <W>, and values of a, b, c, and d satisfy $$0.8 \le a \le 1.2,$$

$$0 \le b < 0.5,$$

$$-0.1 \le c \le 0.2, \text{ and}$$

$$0 \le d \le 0.1$$

Here, the composition varies depending on charge and discharge states, and a is a value in a completely-discharged state.

Specific examples of the lithium-containing composite oxide having a layered rock-salt crystal structure may include $LiNiO_2$, $LiCoO_2$, $LiC_{0.98}Al_{0.01}Mg_{0.1}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, and $Li_{1.15}(Mn_{0.65}Ni_{0.22}Co_{0.13})O_2$.

Further, examples of the lithium-containing composite oxide having a spinel crystal structure may include a compound represented by Formula (E).

$$Li_aMn_{2-b}M^{14}{}_bO_cF_d \qquad (E)$$

Herein, $M^{14}$ is at least one element selected from the group consisting of cobalt <Co>, nickel <Ni>, magnesium <Mg>, aluminum <Al>, boron <B>, titanium <Ti>, vanadium <V>, chromium <Cr>, iron <Fe>, copper <Cu>, zinc <Zn>, molybdenum <Mo>, tin <Sn>, calcium <Ca>, strontium <Sr>, and tungsten <W>, and values of a, b, c, and d satisfy $$0.9 \le a \le 1.1,$$

$$0 \le b \le 0.6,$$

$$3.7 \le c \le 4.1, \text{ and}$$

$$0 \le d \le 0.1.$$

Here, the composition varies depending on charge and discharge states, and a is a value in a completely-discharged state. Specific examples of the lithium-containing composite oxide having a spinel crystal structure may include $LiMn_2O_4$.

Furthermore, examples of the lithium-containing phosphate compound having an olivine crystal structure may include a compound represented by Formula (F).

$$Li_aM^{15}PO_4 \qquad (F)$$

Herein, $M^{15}$ is at least one element selected from the group consisting of cobalt <Co>, manganese <Mn>, iron <Fe>, nickel <Ni>, magnesium <Mg>, aluminum <Al>, boron <B>, titanium <Ti>, vanadium <V>, niobium <Nb>, copper <Cu>, zinc <Zn>, molybdenum <Mo>, calcium <Ca>, strontium <Sr>, tungsten <W>, and zirconium <Zr>, a value of a satisfies $$0.9 \le a \le 1.1.$$

Here, the composition varies depending on charge and discharge states, and a is a value in a completely-discharged state. Specific examples of the lithium-containing phosphate compound having an olivine crystal structure may include $LiFePO_4$, $LiMnPO_4$, $LiFe_{0.5}Mn_{0.5}PO_4$, and $LiFe_{0.3}Mn_{0.7}PO_4$.

Alternatively, examples of the lithium-containing composite oxide may include a compound represented by Formula (G).

$$(Li_2MnO_3)_x(LiMnO_2)_{1-x} \qquad (G)$$

Herein, a value of x satisfies $$0 \le x \le 1.$$

Here, the composition varies depending on charge and discharge states, and x is a value in a completely-discharged state.

In addition, the positive electrode may include, for example, an oxide such as titanium oxide, vanadium oxide, or manganese dioxide; a disulfide such as titanium disulfide or molybdenum sulfide; a chalcogenide such as niobium selenide; and a conductive polymer such as sulfur, polyaniline, or polythiophene.

Specific examples of the binder may include synthetic rubber such as styrene-butadiene-based rubber, fluorine-based rubber, or ethylene propylene diene; a polymer material such as polyvinylidene fluoride or polyimide; and the like. Further, examples of the conducting agent may include a carbon material such as graphite, carbon black, acetylene black, or Ketjen black, but the conducting agent may be a metal material, a conductive polymer, or the like as long as it is a material having conductivity.

The details of materials that constitute the negative electrode are as follows.

Examples of the materials that constitute the negative electrode may include a carbon material. The carbon material causes an extremely small change in a crystal structure thereof at the time of insertion and extraction of lithium, which stably achieves high energy density. Further, the carbon material also serves as a negative electrode conducting agent, which improves conductivity of the negative electrode active material layer. Examples of the carbon material may include graphitizable carbon (soft carbon), nongraphitizable carbon (hard carbon), and graphite. It is to be noted that a spacing of (002) plane in the nongraphitizable carbon is preferably 0.37 nm or more, and a spacing of (002) plane in the graphite is preferably 0.34 nm or less. More specific examples of the carbon material may include pyrolytic carbons; cokes such as pitch coke, needle coke, and petroleum coke; glassy carbon fibers; an organic polymer compound fired body that can be obtained by firing (carbonizing) a polymer compound such as a phenolic resin or a furan resin at an appropriate temperature; activated carbon; and carbon blacks. Further, other than the materials mentioned above, the carbon material may be low crystalline carbon that is subjected to heat treatment at a temperature of about 1000° C. or lower and amorphous carbon. The shape of the carbon material may be any of a fibrous shape, a spherical shape, a granular shape, and a scale-like shape.

Alternatively, examples of the materials that constitute the negative electrode may include a material containing any one or two or more kinds of metal elements and metalloid elements as constituent elements (hereinafter, referred to as a "metal-based material"), and this makes it possible to achieve high energy density. The metal-based material may be any of a simple substance, an alloy, and a compound, may be a material formed from two or more kinds thereof, or may be a material having one or two or more phases thereof at least in part. The alloy also includes a material that contains one or more metal elements and one or more metalloid elements in addition to a material that is formed from two or more kinds of metal elements. Further, the alloy may contain a nonmetallic element. Examples of a structure of the metal-based material may include a solid solution, a eutectic crystal (a eutectic mixture), an intermetallic compound, and a structure in which two or more kinds thereof coexist.

The metal elements and the metalloid elements may be, for example, metal elements and metalloid elements that are able to form an alloy with lithium. Specific examples thereof may include magnesium <Mg>, boron <B>, aluminum <Al>, gallium <Ga>, indium <In>, silicon <Si>, germanium <Ge>, tin <Sn>, lead <Pb>, bismuth <Bi>, cadmium <Cd>, silver <Ag>, zinc <Zn>, hafnium <Hf>, zirconium <Zr>, yttrium <Y>, palladium <Pd>, and platinum <Pt>. Of them, silicon <Si> and tin <Sn> are preferable from the viewpoint of having superior ability to insert and extract lithium and achieving remarkably high energy density.

Examples of a material containing silicon as a constituent element may include a simple substance of silicon, a silicon alloy, and a silicon compound, may be a material formed from two or more kinds thereof, or may be a material having one or two or more phases thereof at least in part. Examples of a material containing tin as a constituent element may include a simple substance of tin, a tin alloy, and a tin compound, may be a material formed from two or more kinds thereof, or may be a material having one or two or more phases thereof at least in part. The simple substance merely refers to a simple substance in a general sense, may contain a trace amount of impurity, and does not necessarily refer to a simple substance having a purity of 100%.

Examples of an element other than silicon that constitutes the silicon alloy or the silicon compound may include tin <Sn>, nickel <Ni>, copper <Cu>, iron <Fe>, cobalt <Co>, manganese <Mn>, zinc <Zn>, indium <In>, silver <Ag>, titanium <Ti>, germanium <Ge>, bismuth <Bi>, antimony <Sb>, and chromium <Cr>, and may also include carbon <C> and oxygen <O>. Specific examples of the silicon alloy or the silicon compound may include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v\leq2$, preferably, $0.2<v<1.4$), and LiSiO.

Examples of an element other than tin that constitutes the tin alloy or the tin compound may include silicon <Si>, nickel <Ni>, copper <Cu>, iron <Fe>, cobalt <Co>, manganese <Mn>, zinc <Zn>, indium <In>, silver <Ag>, titanium <Ti>, germanium <Ge>, bismuth <Bi>, antimony <Sb>, and chromium <Cr>, and may also include carbon <C> and oxygen <O>. Specific examples of the tin alloy or the tin compound may include $SnO_w$ ($0<w\leq2$), $SnSiO_3$, LiSnO, and $Mg_2Sn$. In particular, the material having tin as a constituent element is preferably, for example, a material that contains a second constituent element and a third constituent element with tin (a first constituent element) (hereinafter, referred to as a "Sn-containing material"). Examples of the second constituent element may include cobalt <Co>, iron <Fe>, magnesium <Mg>, titanium <Ti>, vanadium <V>, chromium <Cr>, manganese <Mn>, nickel <Ni>, copper <Cu>, zinc <Zn>, gallium <Ga>, zirconium<Zr>, niobium<Nb>, molybdenum<Mo>, silver <Ag>, indium <In>, cesium <Ce>, hafnium <Hf>, tantalum <Ta>, tungsten <W>, bismuth <Bi>, and silicon <Si>, and examples of the third constituent element may include boron <B>, carbon <C>, aluminum <Al>, and phosphorus <P>. When the Sn-containing material contains the second constituent element and the third constituent element, high battery capacity, excellent cycle characteristics, and the like are achieved.

In particular, the Sn-containing material is preferably a material that contains tin <Sn>, cobalt <Co>, and carbon <C> as constituent elements (referred to as a "SnCoC-containing material"). In the SnCoC-containing material, for example, the content of carbon is 9.9% by mass to 29.7% by mass, and a ratio of contents of tin and cobalt {Co/(Sn+Co)} is 20% by mass to 70% by mass. This makes it possible to achieve high energy density. The SnCoC-containing material preferably has a phase that contains tin, cobalt, and carbon and such a phase is preferably low crystalline or amorphous. This phase is a reaction phase that is able to react with lithium. Thus, existence of the reaction phase results in achievement of superior characteristics. A half width (a diffraction angle 2θ) of a diffraction peak obtained by X-ray diffraction of this reaction phase is preferably 10 or more in a case where a CuKα ray is used as a specific X-ray and an insertion rate is 1/min. This makes it possible to insert and extract lithium more smoothly and to decrease reactivity with the organic electrolytic solution and the non-aqueous electrolytic solution. In some cases, the SnCoC-containing material may include a phase that contains simple substances of respective constituent elements or part thereof in addition to the low-crystalline phase or the amorphous phase.

Comparison between X-ray diffraction charts before and after an electrochemical reaction with lithium makes it possible to easily determine whether the diffraction peak obtained by the X-ray diffraction corresponds to the reaction phase that is able to react with lithium. For example, if a position of the diffraction peak after the electrochemical reaction with lithium is changed from the position of the diffraction peak before the electrochemical reaction with lithium, the obtained diffraction peak corresponds to the reaction phase that is able to react with lithium. In this case, for example, the diffraction peak of the low-crystalline reaction phase or the amorphous reaction phase is seen in a range of 2θ that is from 20° to 50°. Such a reaction phase includes, for example, the respective constituent elements described above, and it may be considered that such a reaction phase has become low crystalline or amorphous mainly because of existence of carbon.

In the SnCoC-containing material, at least apart of carbon that is the constituent element thereof is preferably bound to a metal element or a metalloid element. The reason for this is that binding at least a part of carbon suppresses cohesion or crystallization of, for example, tin. It is possible to confirm a binding state of the elements, for example, by using X-ray photoelectron spectroscopy (XPS) using an Al-Kα ray, a Mg-Kα ray, or the like as a soft X-ray source. In a case where at least a part of carbon is bound to a metal element, a metalloid element, or the like, a peak of a synthetic wave of 1s orbit of carbon (C1s) appears in a region lower than 284.5 eV. Incidentally, energy calibration is so made that a peak of 4f orbit of a gold atom (Au4f) is obtained at 84.0 eV. In this case, generally, surface contamination carbon exists on the material surface. Thus, a peak of C1s of the surface contamination carbon is regarded to be at 284.8 eV, and this peak is used as energy standard. In XPS measurement, a waveform of the peak of C1s is obtained as a form that includes the peak of the surface contamination carbon and the peak of the carbon in the SnCoC-containing material. Therefore, the two peaks may be separated from each other, for example, by analysis with use of commercially-available software. In the analysis of the waveform, a position of the main peak that exists on the lowest bound energy side is regarded as the energy standard (284.8 eV).

The SnCoC-containing material is not limited to a material (SnCoC) that contains only tin, cobalt, and carbon as constituent elements. The SnCoC-containing material may contain, for example, any one or two or more kinds of elements such as silicon <Si>, iron <Fe>, nickel <Ni>, chromium <Cr>, indium <In>, niobium <Nb>, germanium <Ge>, titanium <Ti>, molybdenum <Mo>, aluminum <Al>, phosphorus <P>, gallium <Ga>, and bismuth <Bi> as constituent elements in addition to tin, cobalt, and carbon.

Other than the SnCoC-containing material, a material that contains tin, cobalt, iron, and carbon as constituent elements (hereinafter, referred to as a "SnCoFeC-containing material") is also preferable. Any composition of the SnCoFeC-containing material may be adopted. To give an example, in a case where the content of iron is set smaller, the content of carbon is 9.9% by mass to 29.7% by mass, the content of iron is 0.3% by mass to 5.9% by mass, and a ratio of contents of tin and cobalt {Co/(Sn+Co)} is 30% by mass to 70% by mass. Further, in a case where the content of iron is set larger, the content of carbon is 11.9% by mass to 29.7% by mass, and a ratio of contents of tin, cobalt, and iron {Co+Fe)/(Sn+Co+Fe)} is 26.4% by mass to 48.5% by mass and a ratio of contents of cobalt and iron {Co/(Co+Fe)} is 9.9% by mass to 79.5% by mass. Such composition ranges allow for achievement of high energy density. Physical characteristics (such as a half width) of the SnCoFeC-containing material are similar to physical characteristics of the SnCoC-containing material.

Other than the materials described above, examples of a material that constitutes the negative electrode may include a metal oxide such as iron oxide, ruthenium oxide, or molybdenum oxide; and a polymer compound such as polyacetylene, polyaniline, or polypyrrole.

In particular, the material that constitutes the negative electrode preferably contains, from the following reason, both of the carbon material and the metal-based material. That is, the metal-based material, particularly, a material that contains at least one of silicon and tin as a constituent element is easily and radically expanded or contracted when the secondary battery is charged or discharged, whereas such a material has an advantage of high theoretical capacity. On the other hand, the carbon material has an advantage that the carbon material is difficult to expand or contract when the secondary battery is charged or discharged, whereas the carbon material has low theoretical capacity. Thus, using both the carbon material and the metal-based material makes it possible to suppress expansion and contraction during charging and discharging of the secondary battery while achieving high theoretical capacity (in other words, battery capacity).

As described above, the non-aqueous electrolytic solution suitable for use in the lithium ion secondary battery is not limited, but examples thereof may include a non-aqueous electrolytic solution that contains a compound represented by Formula (1), at least one compound of a compound represented by Formula (2-A) and a compound represented by Formula (2-B), and at least one compound of compounds represented by Formula (3-A) to Formula (3-F).

Incidentally, it is desirable that the content of the compound represented by Formula (1) in the non-aqueous electrolytic solution is 2.5 mol/L to 6 mol/L, and preferably 3 mol/L to 6 mol/L.

$$M^+[(Z^1Y^1)(Z^2Y^2)N]^- \quad (1)$$

Here, M is a metal element, each of $Z^1$ and $Z^2$ is any of a fluorine group <—F>, a monovalent hydrocarbon group, and a monovalent fluorinated hydrocarbon group, at least one of $Z^1$ and $Z^2$ is any of a fluorine group <—F> and a monovalent fluorinated hydrocarbon group, and each of $Y^1$ and $Y^2$ is any of a sulfonyl group <—S(=O)$_2$—> and a carbonyl group <—C(=O)—>.

$$R^1\text{—CN} \quad (2\text{-A})$$

$$R^2\text{—X—CN} \quad (2\text{-B})$$

Here, $R^1$ is a monovalent hydrocarbon group, $R^2$ is a monovalent hydrocarbon group, and X is a group in which one or two or more ether bonds <—O—> and one or two or more divalent hydrocarbon groups are bound in an arbitrary order.

(3-A)

(3-B)

(3-C)

(3-D)

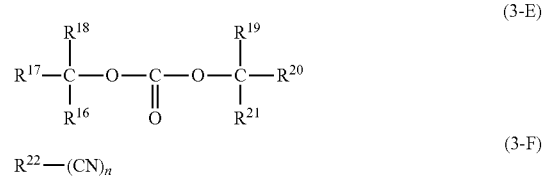

(3-E)

$$R^{22}\text{—(CN)}_n \quad (3\text{-F})$$

Herein, in Formula (3-A), each of $R^3$ and $R^4$ is any of a hydrogen group <—H> and a monovalent hydrocarbon group. Further, in Formula (3-B), each of $R^5$, $R^6$, $R^7$, and $R^8$ is any of a hydrogen group, a monovalent saturated hydrocarbon group, and a monovalent unsaturated hydrocarbon group and at least one of $R^5$, $R^6$, $R^7$, and $R^8$ is a monovalent unsaturated hydrocarbon group. Furthermore, in Formula (3-C), $R^9$ is a group represented by >CR$^{10}$R$^{11}$, and each of $R^{10}$ and $R^{11}$ is any of a hydrogen group and a monovalent hydrocarbon group. Further, in Formula (3-D), each of $R^{12}$, $R^{13}$, $R^{14}$, and $R^{15}$ is any of a hydrogen group, a halogen group, a monovalent hydrocarbon group, and a monovalent halogenated hydrocarbon group and at least one of $R^{12}$, $R^{13}$, $R^{14}$, and $R^{15}$ is any of a halogen group and a monovalent halogenated hydrocarbon group. Furthermore, in Formula (3-E), each of $R^{16}$, $R^{17}$, $R^{18}$, $R^{19}$, $R^{20}$, and $R^{21}$ is any of a hydrogen group, a halogen group, a monovalent hydrocarbon group, and a monovalent halogenated hydrocarbon group and at least one of $R^{16}$, $R^{17}$, $R^{18}$, $R^{19}$, $R^{20}$, and $R^{21}$ is any of a halogen group and a monovalent halogenated hydrocarbon group. Further, in Formula (3-F), $R^{22}$ is an n-valent (provided that, n is an integer of 2 or more) hydrocarbon group. Incidentally, ">C" and "C<" indicate that two linking bonds extend from the carbon atom.

Specifically, the non-aqueous electrolytic solution contains a first compound having a sulfonylimide structure, a second compound having an acetonitrile structure, and a third compound having a reactive group such as an unsaturated hydrocarbon group. Herein, the reason why the non-aqueous electrolytic solution has such a composition is that the following advantages are obtainable. That is, when the non-aqueous electrolytic solution contains all of the first compound, the second compound, and the third compound and the content of the first compound in the non-aqueous electrolytic solution is within the above-described range (2.5 mol/L to 6 mol/L), the synergic interaction among the first compound, the second compound, and the third compound causes chemical stability of the non-aqueous electrolytic solution to be specifically improved and decomposition reaction of the non-aqueous electrolytic solution at the time of charging and discharging to be suppressed. Therefore, even if charging and discharging are repeated, the discharge capacity is difficult to decrease and thus the battery characteristics of the lithium ion secondary battery can be improved. In particular, whether specific synergic interaction described herein is obtainable depends on the content of the first compound. For this reason, the specific synergic interaction is obtainable only in a case where the content of the first compound is within the above range.

The first compound contains one or two or more kinds of the compound represented by Formula (1). Since the first compound is a salt containing cation ($M^+$) and anion ($[(Z^1Y^1)(Z^2Y^2)N]^-$), the first compound may function as a part of an electrolyte salt in the lithium ion secondary battery.

"M" in Formula (1) is not particularly limited as long as it is a metal element, and examples thereof may include alkali metal elements and alkali earth metal elements. In particular, "M" is preferably an alkali metal element. This makes it possible to achieve high energy density. Examples of the alkali metal elements may include lithium <Li>, sodium <Na>, potassium <K>, rubidium <Rb>, cesium <Cs>, and the like, but of these, lithium <Li> is preferable. The alkali metal element is preferably the same as the alkali metal element that constitutes the electrode reactant. This makes it possible to achieve high energy density. The electrode reactant is a substance involving in electrode reaction and is, for example, lithium in the case of the lithium ion secondary battery. For this reason, "M" is preferably lithium in the case of being used in the lithium ion secondary battery.

$Z^1$ and $Z^2$ may be the same group or different groups from each other. The monovalent hydrocarbon group in $Z^1$ and $Z^2$ is a general term for monovalent groups composed of carbon <C> and hydrogen <H>, and may be linear or branched with one or two or more side chains. Further, the monovalent saturated hydrocarbon group may be a saturated hydrocarbon group not containing an unsaturated bond or may be an unsaturated hydrocarbon group containing one or two or more unsaturated bonds. The unsaturated bond is either or both of a carbon-carbon double bond (>C=C<) and a carbon-carbon triple bond (—C≡C—).

Examples of the monovalent hydrocarbon group may include an alkyl group, an alkenyl group, an alkynyl group, a cycloalkyl group, an aryl group, and a group including two or more kinds of these groups bound to each other to have a monovalent. In other words, the monovalent saturated hydrocarbon group is, for example, an alkyl group, a cycloalkyl group, and a group including two or more kinds of these groups bound to each other to have a monovalent. The monovalent unsaturated hydrocarbon group is, for example, an alkenyl group, an alkynyl group, an aryl group, a group including one or more kinds of these groups, and a group including two or more kinds of these groups bound to each other to have a monovalent. Examples of the group including two or more kinds of groups bound to each other in the monovalent hydrocarbon group may include a group including an alkyl group and an alkenyl group bound to each other, a group including an alkyl group and an alkynyl group bound to each other, a group including an alkenyl group and an alkynyl group bound to each other, a group including an alkyl group and a cycloalkyl group bound to each other, and a group including an alkyl group and an aryl group bound to each other. Examples of the group including two or more kinds of groups bound to each other in the monovalent saturated hydrocarbon group may include a group including an alkyl group and a cycloalkyl group bound to each other. Examples of the group including two or more kinds of groups bound to each other in the monovalent unsaturated hydrocarbon group may include a group including an alkyl group and an alkenyl group bound to each other.

Specific examples of the alkyl group may include a methyl group <—$CH_3$>, an ethyl group <—$C_2H_5$>, a propyl group <—$C_3H_7$>, a n-butyl group <—$C_4H_8$>, and a t-butyl group <—$C(CH_3)_2$—$CH_3$>. Specific examples of the alkenyl group may include a vinyl group <—CH=$CH_2$> and an allyl group <—$CH_2$—CH=$CH_2$>. Specific examples of the alkynyl group may include an ethynyl group <—C≡CH>. Specific examples of the cycloalkyl group may include a cyclopropyl group, a cyclobutyl group, a cyclopentyl group, a cyclohexyl group, a cycloheptyl group, and a cyclooctyl group. Specific examples of the aryl group may include a phenyl group and a naphthyl group. Specific examples of the group including two or more kinds of groups bound to each other may include a group including a methyl group and an ethynyl group bound to each other, a group including a vinyl group and an ethynyl group bound to each other, a group including a methyl group and a cyclopropyl group bound to each other, and a group including a methyl group and a phenyl group bound to each other.

The monovalent fluorinated hydrocarbon group is a group in which one or two or more hydrogen groups <—H> in the above-described monovalent hydrocarbon group are substituted with a fluorine group <—F>. Specific examples of the monovalent fluorinated hydrocarbon group may include a fluorinated alkyl group, a fluorinated alkenyl group, a fluorinated alkynyl group, a fluorinated cycloalkyl group, a fluorinated aryl group, and a group including two or more kinds of these groups bound to each other to have a monovalent.

Specific examples of the fluorinated alkyl group may include a fluoromethyl group <—$CH_2F$>, a difluoromethyl group <—$CHF_2$>, a perfluoromethyl group <—$CF_3$>, a perfluoroethyl group <—$C_2F_5$>, a perfluoropropyl group <—$C_3F_7$>, a n-perfluorobutyl group <—$C_4F_8$>, and a t-perfluorobutyl group <—$C(CF_3)_2$—$CF_3$>. Specific examples of the fluorinated alkenyl group may include a perfluorovinyl group <—CF=$CF_2$> and a perfluoroallyl group <—$CF_2$—CF=$CF_2$>. Specific examples of the fluorinated alkynyl group may include a perfluoroethynyl group <—F=CF>. Specific examples of the fluorinated cycloalkyl group may include a perfluorocyclopropyl group, a perfluorocyclobutyl group, a perfluorocyclopentyl group, a perfluorocyclohexyl group, a perfluorocycloheptyl group, and a perfluorocyclooctyl group. Specific examples of the fluorinated aryl group may include a perfluorophenyl group and a perfluoronaphthyl group. In particular, the fluorinated alkyl group, the fluorinated alkenyl group, the fluorinated alkynyl group, the fluorinated cycloalkyl group, and the fluorinated aryl group are preferably a perfluoro group and more preferably a perfluoroalkyl group. This makes it possible to easily perform synthesis and easily achieve synergic interaction described later.

The number of carbon atoms in the monovalent hydrocarbon group and the monovalent fluorinated hydrocarbon group is not particularly limited, but it is preferable that the number of carbon atoms not be extremely too large. This makes it possible to improve solubility, compatibility, and the like of the first compound. Specifically, the number of carbon atoms in the fluorinated alkyl group is preferably 1 to 4. The number of carbon atoms in each of the fluorinated alkenyl group and the fluorinated alkynyl group is preferably 2 to 4. The number of carbon atoms in each of the fluorinated cycloalkyl group and the fluorinated aryl group is 6 to 12.

One or both of $Z^1$ and $Z^2$ in Formula (1) are any of a fluorine group <—F> and a monovalent fluorinated hydrocarbon group. This makes it possible to easily perform synthesis and easily achieve synergic interaction described later. With this reason, in a case where one of $Z^1$ and $Z^2$ is a monovalent hydrocarbon group, the other one is any of a fluorine group <—F> and a monovalent fluorinated hydrocarbon group. That is, both of $Z^1$ and $Z^2$ are not a monovalent hydrocarbon group.

Each of $Y^1$ and $Y^2$ in Formula (1) is not particularly limited as long as it is any of a sulfonyl group and a carbonyl group. $Y^1$ and $Y^2$ may be the same group or different groups from each other.

Specific examples of the first compound may include lithium bis(fluorosulfonyl)imide <LiN(FSO$_2$)$_2$>, lithium bis(trifluoromethylsulfonyl)imide <LiN(CF$_3$SO$_2$)$_2$>, lithium (fluorosulfonyl) (trifluoromethylsulfonyl)imide <LiN (FSO$_2$) (CF$_3$SO$_2$) >, lithium(fluorosulfonyl) (pentafluoroethylsulfonyl)imide <LiN(FSO$_2$) (C$_2$F$_5$SO$_2$) >, lithium(fluorosulfonyl) (nonafluorobutylsulfonyl)imide <LiN(FSO$_2$) (C$_4$F$_9$SO$_2$) >, lithium(fluorosulfonyl) (phenylsulfonyl)imide <LiN(FSO$_2$) (C$_6$H$_5$SO$_2$) >, lithium(fluorosulfonyl) (pentafluorophenylsulfonyl)imide <LiN(FSO$_2$) (C$_6$F$_5$SO$_2$)>, and lithium(fluorosulfonyl) (vinylsulfonyl)imide <LiN(FSO$_2$) (C$_2$F$_3$SO$_2$) >.

The aforementioned second compound contains either or both of the compounds represented by Formula (2-A) and Formula (2-B). However, the second compound may contain two or more kinds of the compound represented by Formula (2-A) or may contain two or more kinds of the compound represented by Formula (2-B).

The compound represented by Formula (2-A) is amononitrile compound not containing an ether bond (a mononitrile compound not containing oxygen). $R^1$ is not particularly limited as long as it is a monovalent hydrocarbon group. The details of the monovalent hydrocarbon group are as described above. Specific examples of the mononitrile compound not containing oxygen may include acetonitrile <CH$_3$CN>, propionitrile <C$_3$H$_7$CN>, and butyronitrile <C$_4$H$_9$CN>.

The compound represented by Formula (2-B) is amononitrile compound containing an ether bond (an oxygen-containing mononitrile compound). $R^2$ is not particularly limited as long as it is a monovalent hydrocarbon group. The details of the monovalent hydrocarbon group are as described above. For "X" in Formula (2-B), the divalent hydrocarbon group is a general term for divalent groups composed of carbon and hydrogen, and may be linear or branched with one or two or more side chains. Specific examples of the divalent hydrocarbon group may include an alkylene group, an alkenylene group, an alkynylene group, a cycloalkylene group, an arylene group, and a group including two or more kinds of these groups bound to each other to have a divalent. Specific examples of the group including two or more kinds of groups bound to each other may include a group including an alkylene group and an alkenylene group bound to each other, a group including an alkyl group and an alkynylene group bound to each other, a group including an alkenylene group and an alkynylene group bound to each other, a group including analkylene group and a cycloalkylene group, and a group including an alkylene group and an arylene group bound to each other.

Specific examples of the alkylene group may include a methylene group <—CH$_2$—>, an ethylene group <—C$_2$H$_4$—>, a propylene group <—C$_3$H$_6$—>, a n-butylene group <—C$_4$H$_8$—>, and a t-butylene group <—C(CH$_3$)$_2$—CH$_2$—>. Specific examples of the alkenylene group may include a vinylene group <—CH=CH—> and an allylene group <—CH$_2$—CH=CH—>. Specific examples of the alkynylene group may include an ethynylene group <—C≡C—>. Specific examples of the cycloalkylene group may include a cyclopropylene group, a cyclobutylene group, a cyclopentylene group, a cyclohexylene group, a cycloheptylene group, and a cyclooctylene group. Specific examples of the arylene group may include a phenylene group and a naphthylene group. Specific examples of the group including two or more kinds of groups bound to each other may include a group including a methylene group and an ethynylene group bound to each other, a group including a vinylene group and an ethynylene group bound to each other, a group including a methylene group and a cyclopropylene group bound to each other, and a group including a methylene group and a phenylene group bound to each other.

The number of carbon atoms in the divalent hydrocarbon group is not particularly limited, but it is preferable that the number of carbon atoms not be extremely too large. This makes it possible to improve solubility, compatibility, and the like of the second compound. Specifically, the number of carbon atoms in the alkylene group is preferably 1 to 4. The number of carbon atoms in each of the alkenylene group and the alkynylene group is preferably 2 to 4. The number of carbon atoms in each of the cycloalkylene group and the arylene group is preferably 6 to 12.

"X" is not particularly limited as long as it is a group in which one or two or more ether bonds and one or two or more divalent hydrocarbon groups are bound in an arbitrary order. That is, the number of ether bonds contained in "X" may be one or two or more. Similarly, the number of divalent hydrocarbon groups contained in "X" may be one or two or more. In a case where the number of divalent hydrocarbon groups is two or more, the two or more divalent hydrocarbon groups may be the same group or different groups from each other. Some of the two or more divalent hydrocarbon groups may be the same group. Since the order of binding ether bonds and divalent hydrocarbon groups may be arbitrary, the ether bonds may be bound to each other, the divalent hydrocarbon groups may be bound to each other, or the ether bond and the divalent hydrocarbon group may be bound to each other.

In particular, "X" is preferably a group represented by —O—Y— (Y is a divalent hydrocarbon group). This makes it possible to easily perform synthesis and easily achieve synergic interaction described later. The details of the divalent hydrocarbon group are as described above. However, in X (that is, —O—Y—) described herein, an ether bond (—O—) is bound to $R^2$ and Y is bound to a cyano group <—CN>. Specific examples of "X" may include —O—CH$_2$—, —CH$_2$—O—, —O—CH$_2$—O—, and —O—C$_2$H$_5$—.

Specific examples of the oxygen-containing mononitrile compound may include methoxyacetonitrile <CH$_3$—O—CH$_2$—CN>, ethoxyacetonitrile <C$_2$H$_5$—O—CH$_2$—CN>, and propoxyacetonitrile <C$_3$H$_7$—O—CH$_2$—CN>.

The content of the second compound in the non-aqueous electrolytic solution is not particularly limited, but is, for example, preferably 20% by mass to 100% by mass. This makes it possible to easily achieve synergic interaction described later. In a case where the second compound contains both the mononitrile compound not containing oxygen and the oxygen-containing mononitrile compound, the content of the second compound is the sum of the content of the mononitrile compound not containing oxygen and the content of the oxygen-containing mononitrile compound. The fact that the content means the sum in this way also applies to the following description.

The aforementioned third compound contains any one or two or more kinds of an unsaturated cyclic carbonic acid ester, a halogenated cyclic carbonic acid ester, and a polynitrile compound. However, the third compound may contain two or more kinds of the unsaturated cyclic carbonic acid ester. The fact that two or more kinds of the unsaturated cyclic carbonic acid ester may be contained also applies to the halogenated cyclic carbonic acid ester and the polynitrile compound.

The unsaturated cyclic carbonic acid ester contains any one or two or more kinds of compounds represented by Formula (3-A), Formula (3-B), and Formula (3-C). Herein, the unsaturated cyclic carbonic acid ester is a cyclic carbonic acid ester containing one or two or more unsaturated bonds (carbon-carbon double bonds).

The compound represented by Formula (3-A) is a vinylene carbonate-based compound. Each of $R^3$ and $R^4$ is not particularly limited as long as it is any of a hydrogen group and a monovalent hydrocarbon group. The details of the monovalent hydrocarbon group are as described above. $R^3$ and $R^4$ may be the same group or different groups from each other.

Specific examples of the vinylene carbonate-based compound may include vinylene carbonate (1,3-dioxol-2-one), methylvinylene carbonate (4-methyl-1,3-dioxol-2-one), ethylvinylene carbonate (4-ethyl-1,3-dioxol-2-one), 4,5-dimethyl-1,3-dioxol-2-one, 4,5-diethyl-1,3-dioxol-2-one, 4-fluoro-1,3-dioxol-2-one, and 4-trifluoromethyl-1,3-dioxol-2-one. Of them, from the viewpoint that synthesis can be easily performed, vinylene carbonate is preferable.

The compound represented by Formula (3-B) is a vinyl ethylene carbonate-based compound. Each of $R^5$, $R^6$, $R^7$, and $R^8$ is not particularly limited as long as it is any of a hydrogen group, a monovalent saturated hydrocarbon group, and a monovalent unsaturated hydrocarbon group. The details of the monovalent saturated hydrocarbon group and the monovalent unsaturated hydrocarbon group are as described above. However, one or two or more of $R^5$, $R^6$, $R^7$, and $R^8$ are a monovalent unsaturated hydrocarbon group. The reason for this is that the vinyl ethylene carbonate-based compound necessarily contains one or two or more unsaturated bonds (carbon-carbon double bonds). $R^5$, $R^6$, $R^7$, and $R^8$ may be the same group or different groups from each other. Some of $R^5$, $R^6$, $R^7$, and $R^8$ may be the same group.

Specific examples of the vinyl ethylene carbonate-based compound may include vinyl ethylene carbonate (4-vinyl-1,3-dioxolane-2-one), 4-methyl-4-vinyl-1,3-dioxolane-2-one, 4-ethyl-4-vinyl-1,3-dioxolane-2-one, 4-n-propyl-4-vinyl-1,3-dioxolane-2-one, 5-methyl-4-vinyl-1,3-dioxolane-2-one, 4,4-divinyl-1,3-dioxolane-2-one, and 4,5-divinyl-1,3-dioxolane-2-one. Of them, from the viewpoint that synthesis can be easily performed, vinyl ethylene carbonate is preferable.

The compound represented by Formula (3-C) is a methylene ethylene carbonate-based compound. $R^9$ is not particularly limited as long as it is a group represented by >CR$^{10}$R$^{11}$. The details of the monovalent hydrocarbon group are as described above. $R^{10}$ and $R^{11}$ may be the same group or different groups from each other.

Specific examples of the methylene ethylene carbonate-based compound may include methylene ethylene carbonate (4-methylene-1,3-dioxolane-2-one), 4,4-dimethyl-5-methylene-1,3-dioxolane-2-one, and 4,4-diethyl-5-methylene-1,3-dioxolane-2-one.

In addition, the unsaturated cyclic carbonic acid ester may be a compound containing two methylene groups, catechol carbonate containing a benzene ring, or the like. The compound containing two methylene groups is a compound containing >C=CH$_2$ instead of >C=R$^9$ and containing >C=CH$_2$ instead of >CH$_2$ in Formula (3-C).

The content of the unsaturated cyclic carbonic acid ester in the non-aqueous electrolytic solution is not particularly limited, but is, for example, preferably 0.01% by mass to 20% by mass with respect to the total content except for the unsaturated cyclic carbonic acid ester.

The halogenated cyclic carbonic acid ester contains any one or two or more kinds of the compounds represented by Formula (3-D) and Formula (3-E). The halogenated carbonic acid ester is a carbonic acid ester having one or two or more halogen groups.

The compound represented by Formula (3-D) is a halogenated cyclic carbonic acid ester. $R^{12}$ to $R^{15}$ are not particularly limited as long as they are any of a hydrogen group, a halogen group, a monovalent hydrocarbon group, and a monovalent halogenated hydrocarbon group. The details of the monovalent hydrocarbon group are as described above. However, one or two or more of $R^{12}$ to $R^{15}$ are any of a halogen group and a monovalent halogenated hydrocarbon group. The reason for this is that the halogenated cyclic carbonic acid ester necessarily contains one or two or more halogen groups. $R^{12}$ to $R^{15}$ may be the same group or different groups from each other. Some of $R^{12}$ to $R^{15}$ may be the same group.

The monovalent halogenated hydrocarbon group is a group in which one or two or more hydrogen groups in the above-described monovalent hydrocarbon group are substituted with a halogen group. The halogen group is not particularly limited, but for example, is any of a fluorine group <—F>, a chlorine group <—Cl>, a bromine group <—Br>, an iodine group <—I>, and the like. Of them, a fluorine group <—F> is preferable. This makes it possible to easily perform synthesis and easily achieve synergic interaction described later. The number of halogen groups is more preferably two than one, and further, may be three or more. This makes it possible to achieve higher effect.

Specific examples of the monovalent halogenated hydrocarbon group may include a halogenated alkyl group, a halogenated alkenyl group, a halogenated alkynyl group, a halogenated cycloalkyl group, a halogenated aryl group, and a group including two or more kinds of these groups bound to each other to have a monovalent.

Specific examples of the fluorinated alkyl group, the fluorinated alkenyl group, the fluorinated alkynyl group, fluorinated cycloalkyl group, and the fluorinated aryl group in the halogenated alkyl group are as described above.

Specific examples of the chlorinated alkyl group, the brominated alkyl group, and the iodinated alkyl group include compounds in which a fluorine group in the specific examples of the fluorinated alkyl group is changed to a chlorine group, a bromine group, or an iodine group. Changing of a fluorine group to a chlorine group, a bromine group, or an iodine group in this way also applies to a chlorinated alkenyl group, a chlorinated alkynyl group, a chlorinated cycloalkyl group, a chlorinated aryl group, a brominated alkenyl group, a brominated alkynyl group, a brominated cycloalkyl group, a brominated aryl group, an iodinated alkenyl group, an iodinated alkynyl group, an iodinated cycloalkyl group, and an iodinated aryl group.

Specific examples of the halogenated cyclic carbonic acid ester may include 4-fluoro-1,3-dioxolane-2-one, 4-chloro-1,3-dioxolane-2-one, 4,5-difluoro-1,3-dioxolane-2-one, tetrafluoro-1,3-dioxolane-2-one, 4-chloro-5-fluoro-1,3-dioxolane-2-one, 4,5-dichloro-1,3-oxalane-2-one, tetrachloro-1,3-dioxolane-2-one, 4,5-bistrifluoromethyl-1,3-dioxolane-2-one, 4-trifluoromethyl-1,3-dioxolane-2-one, 4,5-difluoro-4,5-dimethyl-1,3-dioxolane-2-one, 4,4-difluoro-5-methyl-1,3-dioxolane-2-one, 4-ethyl-5,5-difluoro-1,3-dioxolane-2-one, 4-fluoro-5-trifluoromethyl-1,3-dioxolane-2-one, 4-methyl-5-trifluoromethyl-1,3-dioxolane-2-one, 4-fluoro-4,5-dimethyl-1,3-dioxolane-2-one, 5-1,1-difluoroethyl-4,4-difluoro-1,3-dioxolane-2-one, 4,5-dichloro-4,5-dimethyl-1,3-dioxolane-2-one, 4-ethyl-5-fluoro-1,3-dioxolane-2-one, 4-ethyl-4,5-difluoro-1,3-dioxolane-2-one, 4-ethyl-4,5,5-trifluoro-1,3-dioxolane-2-one, and 4-fluoro-4-methyl-1,3-dioxolane-2-one. Isomers (cis isomers and trans isomers) are included in the specific examples of the halogenated cyclic carbonic acid ester described herein.

The compound represented by Formula (3-E) is a halogenated chain ester carbonate. $R^{16}$ to $R^{21}$ are not particularly limited as long as they are any of a hydrogen group, a halogen group, a monovalent hydrocarbon group, and a monovalent halogenated hydrocarbon group. The details of the monovalent hydrocarbon group and the monovalent halogenated hydrocarbon group are as described above. However, from the similar reason to the above-described reason for the halogenated cyclic carbonic acid ester, one or two or more of $R^{16}$ to $R^{21}$ are any of a halogen group and a monovalent halogenated hydrocarbon group. $R^{16}$ to $R^{21}$ may be the same group or different groups from each other. Some of $R^{16}$ to $R^{21}$ may be the same group. Specific examples of the halogenated chain ester carbonate may include fluoromethylmethyl carbonate, bis(fluoromethyl) carbonate, and difluoromethylmethyl carbonate. The content of the halogenated cyclic carbonic acid ester in the non-aqueous electrolytic solution is not particularly limited, but is, for example, preferably 0.01% by mass to 20% by mass with respect to the total content except for the halogenated cyclic carbonic acid ester.

The polynitrile compound contains one or two kinds of compounds represented by Formula (3-F). The polynitrile compound is a compound containing two or more nitrile groups, and the second compound is not included in the polynitrile compound described herein. The reason for this is that the second compound does not contain two or more nitrile groups.

$R^{22}$ is not particularly limited as long as it is an n-valent hydrocarbon group. To give an example, in a case where the number of carbon atoms in $R^{22}$ is one, —$CH_2$— can be exemplified as the divalent hydrocarbon group and >CH— or the like can be exemplified as the trivalent hydrocarbon group. Similarly, in a case where the number of carbon atoms in $R^{22}$ is two, —$CH_2$—$CH_2$— can be exemplified as the divalent hydrocarbon group and >CH—$CH_2$— or the like can be exemplified as the trivalent hydrocarbon group. In particular, $R^{22}$ is preferably a divalent hydrocarbon group. This makes it possible to easily achieve synergic interaction described later since the number of cyano groups <—CN> becomes two. The details of the divalent hydrocarbon group are as described above.

Specific examples of the polynitrile compound may include malononitrile, succinonitrile, glutaronitrile, adiponitrile, pimelonitrile, suberonitrile, azelanitrile, sebaconitrile, undecanedinitrile, dodecanedinitrile, phthalonitrile, and tetracyanoquinodimethane. The content of the polynitrile compound in the non-aqueous electrolytic solution is not particularly limited, but is, for example, preferably 0.01% by mass to 10% by mass with respect to the total content except for the polynitrile compound.

The non-aqueous electrolytic solution may contain one or two or more kinds of other materials in addition to the first compound, the second compound, and the third compound. Specific examples of the other compounds may include any one or two or more kinds of sulfonic acid ester, acid anhydride, cyclic carboxylic acid ester (lactone), dialkyl sulfoxide, chain carbonic acid diester (see the following Formula (10)), aromatic carbonic acid ester (see the following Formula (11)), cyclic carbonic acid ester (see the following Formula (12)), chain carbonic acid monoester (see the following Formula (13)), chain carboxylic acid ester (see the following Formula (14)), phosphoric acid ester (see the following Formula (15)), lithium monofluorophosphate <$Li_2PO_3F$>, and lithium difluorophosphate <$LiPO_2F_2$>.

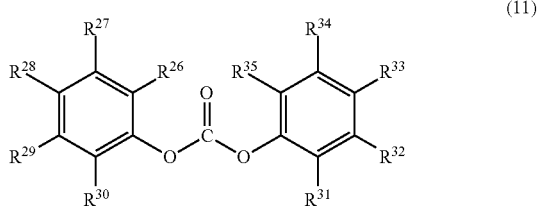

Here, each of $R^{23}$ and $R^{24}$ is any of a monovalent hydrocarbon group and a monovalent halogenated hydrocarbon group, and $R^{25}$ is any of a divalent hydrocarbon group and a divalent halogenated hydrocarbon group. In addition, each of $R^{26}$, $R^{27}$, $R^{28}$, $R^{29}$, $R^{30}$, $R^{31}$, $R^{32}$, $R^{33}$, $R^{34}$, and $R^{35}$ is any of a monovalent hydrocarbon group, a monovalent oxygen-containing hydrocarbon group, a monovalent nitrogen-containing hydrocarbon group, a monovalent halogenated hydrocarbon group, a monovalent halogenated oxygen-containing hydrocarbon group, a monovalent halogenated nitrogen-containing hydrocarbon group, and a group including two or more kinds of these groups bound to each other to have a monovalent. Furthermore, each of $R^{36}$, $R^{37}$, $R^{38}$, and $R^{39}$ is any of a hydrogen group and a monovalent hydrocarbon group. Further, each of $R^{40}$ and $R^{41}$ is any of a hydrogen group and a monovalent hydrocarbon group. Furthermore, each of $R^{42}$ and $R^{43}$ is any of a hydrogen group and a monovalent hydrocarbon group. Further, each of $R^{44}$, $R^{45}$, and $R^{46}$ is any of a monovalent hydrocarbon group and a monovalent halogenated hydrocarbon group.

Specific examples of the sulfonic acid ester may include monosulfonic acid ester and sulfonic acid diester. The content of the sulfonic acid ester in the non-aqueous electrolytic solution is not particularly limited, but is, for example, preferably 0.01% by mass to 10% by mass with respect to the total content except for the sulfonic acid ester.

The monosulfonic acid ester may be cyclic monosulfonic acid ester or chain monosulfonic acid ester. Specific examples of the cyclic monosulfonic acid ester may include sultones such as propane sultone and propene sultone. Specific examples of the chain monosulfonic acid ester may include compounds in which the cyclic monosulfonic acid ester is cleaved at a middle site. To give an example, as a compound in which propane sultone is cleaved at a middle site, $CH_3$—$CH_2$—$CH_2$—$SO_3$—$CH_3$ can be exemplified. The orientation of —$SO_3$—(—$S(=O)_2$—$O$—) is not particularly limited. That is, $CH_3$—$CH_2$—$CH_2$—$SO_3$—$CH_3$ described above may be $CH_3$—$CH_2$—$CH_2$—$S(=O)_2$—$O$—$CH_3$ or $CH_3$—$CH_2$—$CH_2$—$O$—$S(=O)_2$—$CH_3$.

The sulfonic acid diester may be cyclic sulfonic acid diester or chain sulfonic acid diester. Specific examples of the cyclic sulfonic acid diester may include compounds represented by Formula (16-1), Formula (16-2), and Formula (16-3) The chain sulfonic acid diester is a compound in which the cyclic sulfonic acid diester is cleaved at a middle site. Specific examples of the compound in which the compound represented by Formula (16-2) is cleaved at a middle site may include $CH_3$—$SO_3$—$CH_2$—$CH_2$—$SO_3$—$CH_3$. The two orientations of —$SO_3$—(—$S(=O)_2$—$O$—) are not particularly limited. That is, $CH_3$—$SO_3$—$CH_2$—$CH_2$—$SO_3$—$CH_3$ described above may be $CH_3$—$S(=O)_2$—$O$—$CH_2$—$CH_2$—$S(=O)_2$—$O$—$CH_3$, $CH_3$—$O$—$S(=O)_2$—$CH_2$—$CH_2$—$S(=O)_2$—$O$—$CH_3$, or $CH_3$—$S(=O)_2$—$O$—$CH_2$—$CH_2$—$O$—$S(=O)_2$—$CH_3$.

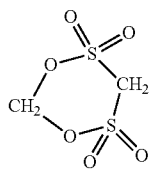
(16-1)

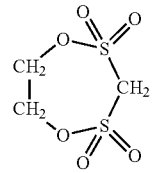
(16-2)

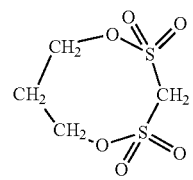
(16-3)

Specific examples of the acid anhydride may include carboxylic anhydrides such as benzoic anhydride, succinic anhydride, glutaric anhydride, and maleic anhydride; disulfonic anhydrides such as ethane disulfonic anhydride and propane disulfonic anhydride; and carboxylic sulfonic anhydrides such as sulfobenzoic anhydride, sulfopropionic anhydride, and sulfobutyric anhydride. The content of the acid anhydride in the non-aqueous electrolytic solution is not particularly limited, but is, for example, preferably 0.01% by mass to 10% by mass with respect to the total content except for the acid anhydride.

Specific examples of the cyclic carboxylic acid ester may include γ-butyrolactone and γ-valerolactone. The content of the cyclic carboxylic acid ester in the non-aqueous electrolytic solution is not particularly limited, but is, for example, preferably 0.01% by mass to 10% by mass with respect to the total content except for the cyclic carboxylic acid ester.

Specific examples of the dialkyl sulfoxide may include dimethyl sulfoxide $<(CH_3)_2SO>$ and diethyl sulfoxide $<(C_2H_5)_2SO>$. The content of the dialkyl sulfoxide in the non-aqueous electrolytic solution is not particularly limited, but is, for example, preferably 0.01% by mass to 10% by mass with respect to the total content except for the dialkyl sulfoxide.

The chain carbonic acid diester is any one or two or more compounds of the compounds represented by the above Formula (10). $R^{23}$ and $R^{24}$ are not particularly limited as long as they are any of a monovalent hydrocarbon group and a monovalent halogenated hydrocarbon group. $R^{23}$ and $R^{24}$ may be the same group or different groups from each other. $R^{25}$ is not particularly limited as long as it is any of a divalent hydrocarbon group and a divalent halogenated hydrocarbon group. The details of the monovalent hydrocarbon group and the monovalent halogenated hydrocarbon group are as described above. The divalent halogenated hydrocarbon group is a group in which one or two or more hydrogen groups in the divalent hydrocarbon group are substituted with a halogen group. The details of the divalent hydrocarbon group and the halogen group are as described above. Specific examples of the divalent halogenated hydrocarbon group may include a perfluoromethylene group <—$CF_2$—>, a perfluoroethylene group <—$C_2F_4$—>, a perfluoropropylene group <—$C_3F_6$—>, a n-perfluorobutylene group <—$C_4F_8$—>, and a t-perfluorobutylene group <—$C(CF_3)_2$—$CF_2$—>. Specific examples of the chain carbonic acid diester may include ethane-1,2-diyl dimethyl dicarbonate, ethane-1,2-diyl ethylmethyl dicarbonate, ethane-1,2-diyl diethyl dicarbonate, dimethyl(oxybis(ethane-2,1-diyl) dicarbonate, ethylmethyl(oxybis(ethane-2,1-diyl) dicarbonate, and diethyl(oxybis(ethane-2,1-diyl) dicarbonate. The content of the chain carbonic acid diester in the non-aqueous electrolytic solution is not particularly limited, but is, for example, preferably 0.01% by mass to 10% by mass with respect to the total content except for the chain carbonic acid diester.

The aromatic carbonic acid ester is any one or two or more compounds of the compounds represented by the above Formula (11). $R^{26}$ to $R^{35}$ are not particularly limited as long as they are any of a monovalent hydrocarbon group, a monovalent oxygen-containing hydrocarbon group, a monovalent nitrogen-containing hydrocarbon group, a monovalent halogenated hydrocarbon group, a monovalent halogenated oxygen-containing hydrocarbon group, a monovalent halogenated nitrogen-containing hydrocarbon group, and a group including two or more kinds of these groups bound to each other to have a monovalent. $R^{26}$ to $R^{35}$ may be the same group or different groups from each other. Some of $R^{26}$ to $R^{35}$ may be the same group. The details of the monovalent hydrocarbon group and the monovalent halogenated hydrocarbon group are as described above.

The monovalent oxygen-containing hydrocarbon group is a general term for monovalent groups composed of carbon, hydrogen, and oxygen, and may be linear or branched with one or two or more side chains. Specific examples of the monovalent oxygen-containing hydrocarbon group may include an alkoxy group, and specific examples of the alkoxy group may include a methoxy group <—$OCH_3$>, an ethoxy group <—$OC_2H_5$>, and a propoxy group <—$OC_3H_7$>.

The monovalent nitrogen-containing hydrocarbon group is a general term for monovalent groups composed of carbon, hydrogen, and nitrogen, and may be linear or branched with one or two or more side chains. Specific examples of the monovalent nitrogen-containing hydrocarbon group may include an amino group <—$NH_2$>.

The monovalent halogenated oxygen-containing hydrocarbon group is a group in which one or two or more hydrogen groups in the monovalent oxygen-containing hydrocarbon group are substituted with a halogen group. The details of the monovalent oxygen-containing hydrocarbon group and the halogen group are as described above. Specific examples of the monovalent halogenated oxygen-containing hydrocarbon group may include a perfluoromethoxy group <—$OCF_3$—> and a perfluoroethoxy group <—$OC_2F_4$—>.

The monovalent halogenated nitrogen-containing hydrocarbon group is a group in which one or two or more hydrogen groups in the monovalent nitrogen-containing hydrocarbon group are substituted with a halogen group. The details of the monovalent nitrogen-containing hydrocarbon group and the halogen group are as described above. Specific examples of the monovalent halogenated nitrogen-containing hydrocarbon group may include a perfluoroamino group <—$NF_2$> and a perfluoromethylamino group <—$CF_2$—$NF_2$>.

Specific examples of the group including two or more kinds of groups bound to each other may include a group including an alkyl group and an alkoxy group bound to each other to have a monovalent (an alkylalkoxy group) and a group including an alkyl group and an amino group bound to each other to have a monovalent (an alkylamino group). Specific examples of the alkylalkoxy group may include a methylmethoxy group <—$CH_2$—$OCH_3$>. Specific examples of the alkylamino group may include a methylamino group <—$CH_2$—$NH_2$>.

Specific examples of the aromatic carbonic acid ester may include diphenyl carbonate, bis(4-methylphenyl) carbonate, and bispentafluorophenyl carbonate.

The content of the aromatic carbonic acid ester in the non-aqueous electrolytic solution is not particularly limited, but is, for example, preferably 0.01% by mass to 10% by mass with respect to the total content except for the aromatic carbonic acid ester.

The cyclic carbonic acid ester is any one or two or more compounds of the compounds represented by the above Formula (12). $R^{36}$ to $R^{39}$ are not particularly limited as long as they are any of a hydrogen group and a monovalent hydrocarbon group. $R^{36}$ to $R^{39}$ may be the same group or different groups from each other. Some of $R^{36}$ to $R^{39}$ may be the same group. The details of the monovalent hydrocarbon group are as described above. Specific examples of the cyclic carbonic acid ester may include ethylene carbonate, propylene carbonate, and butylene carbonate. The content of the cyclic carbonic acid ester in the non-aqueous electrolytic solution is not particularly limited, but is, for example, preferably 0.01% by mass to 80% by mass.

The chain carbonic acid monoester is any one or two or more compounds of the compounds represented by the above Formula (13). $R^{40}$ and $R^{41}$ are not particularly limited as long as they are any of a hydrogen group and a monovalent hydrocarbon group. $R^{40}$ and $R^{41}$ may be the same group or different groups from each other. Some of $R^{40}$ and $R^{41}$ may be the same group. The details of the monovalent hydrocarbon group are as described above. Specific examples of the chain carbonic acid monoester may include dimethyl carbonate, diethyl carbonate, methylethyl carbonate, and methylpropyl carbonate. The content of the chain carbonic acid monoester in the non-aqueous electrolytic solution is not particularly limited, but is, for example, preferably 0.01% by mass to 70% by mass.

The chain carboxylic acid ester is any one or two or more compounds of the compounds represented by the above Formula (14). $R^{42}$ and $R^{43}$ are not particularly limited as long as they are any of a hydrogen group and a monovalent hydrocarbon group. $R^{42}$ and $R^{43}$ may be the same group or different groups from each other. The details of the monovalent hydrocarbon group are as described above. Specific examples of the chain carboxylic acid ester may include methyl acetate, ethyl acetate, methyl propionate, ethyl propionate, methyl butyrate, isomethyl butyrate, trimethylmethyl acetate, and trimethylethyl acetate. The content of the chain carboxylic acid ester in the non-aqueous electrolytic solution is not particularly limited, but is, for example, preferably 0.01% by mass to 50% by mass with respect to the total content except for the chain carboxylic acid ester.

The phosphoric acid ester is any one or two or more compounds of the compounds represented by the above Formula (15). $R^{44}$ to $R^{46}$ are not particularly limited as long as they are any of a monovalent hydrocarbon group and a monovalent halogenated hydrocarbon group. $R^{44}$ to $R^{46}$ may be the same group or different groups from each other. Some of $R^{44}$ to $R^{46}$ may be the same group. The details of the monovalent hydrocarbon group and the monovalent halogenated hydrocarbon group are as described above. Specific examples of the phosphoric acid ester may include trimethyl phosphate, triethyl phosphate, trifluoroethyl phosphate, and tripropyl phosphate. The content of the phosphoric acid ester in the non-aqueous electrolytic solution is not particularly limited, but is, for example, preferably 0.01% by mass to 50% by mass with respect to the total content except for the phosphoric acid ester.

Furthermore, as other materials, any one or two or more kinds of solvents such as non-aqueous solvents (organic solvents) can be exemplified. However, the other materials such as sulfonic acid ester described above are excluded from the non-aqueous solvent described herein.

In addition, as other materials, for example, any one or two or more kinds of electrolyte salts such as a lithium salt can be exemplified. However, the electrolyte salt may include, for example, salts other than the lithium salt. The salts other than the lithium salt are, for example, light metal salts and the like other than the lithium salt.

Hereinafter, the description will be made while the lithium salt as the specific examples of the electrolyte salt is used as an example, but the lithium salt may be changed to a salt other than the lithium salt. That is, for example, lithium hexafluorophosphate to be described later may be changed to other light metal salts such as sodium hexafluorophosphate and potassium hexafluorophosphate.

As the lithium salt, specifically, various lithium salts mentioned above can be exemplified, and thus a decrease in internal resistance can be achieved. In particular, any one or two or more kinds of lithium hexafluorophosphate <LiPF$_6$>, lithium tetrafluoroborate <LiBF$_4$>, lithium perchlorate <LiClO$_4$>, and lithium hexafluoroarsenate <LiAsF$_6$> are preferable. This makes it possible to further decrease the internal resistance. In particular, lithium hexafluorophosphate <LiPF$_6$> and lithium tetrafluoroborate <LiBF$_4$> are further preferable, and lithium hexafluorophosphate <LiPF$_6$> is still further preferable.

The electrolyte salt may be any one or two or more kinds of compounds represented by Formula (17), Formula (18), and Formula (19). $R^{51}$ and $R^{53}$ may be the same group or different groups from each other. This also applies to $R^{61}$, $R^{62}$, and $R^{63}$, and also applies to $R^{71}$ and $R^{72}$. Two of $R^{61}$, $R^{62}$, and $R^{63}$ may be the same group.

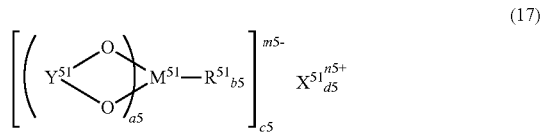

(17)

Herein, $X^{51}$ is any of a Group 1 element and a Group 2 element in the long period periodic table and Al. $M^{51}$ is any of a transition metal and a Group 13 element, a Group 14 element, and a Group 15 element in the long period periodic table. $R^{51}$ is a halogen group. Further, $Y^{51}$ is any of —C(=O)—$R^{52}$—C(=O)—, —C(=O)—$CR^{53}_2$—, and —C(=O)—C(=O)—. However, $R^{52}$ is any of an alkylene group, a halogenated alkylene group, an arylene group, and a halogenated arylene group, and $R^{53}$ is any of an alkyl group, a halogenated alkyl group, an aryl group, and a halogenated aryl group. Further, a5 is an integer of 1 to 4, b5 is any of 0, 2, and 4, and c5, d5, m5, and n5 are an integer of 1 to 3.

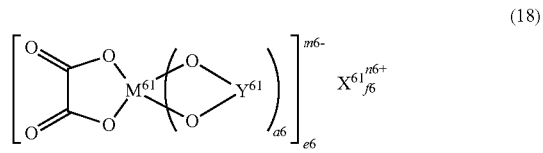

(18)

Herein, $X^{61}$ is any of a Group 1 element and a Group 2 element in the long period periodic table. $M^{61}$ is any of a transition metal and a Group 13 element, a Group 14 element, and a Group 15 element in the long period periodic table. $Y^{61}$ is any of —C(=O)—$(CR^{61}_2)_{b6}$—C(=O)—, —$R^{63}_2$C—$(CR^{62}_2)_{c6}$—C(=O)—, —$R^{63}_2$C—$(CR^{62}_2)_{c6}$—$CR^{63}_2$—, —$R^{63}_2$C—$(CR^{62}_2)_{c6}$—S(=O)$_2$—, —S(=O)$_2$—$(CR^{62}_2)_{d6}$—S(=O)$_2$—, and —C(=O)—$(CR^{62}_2)_{d6}$—S(=O)$_2$—. However, each of $R^{61}$ and $R^{63}$ is any of a hydrogen group, an alkyl group, a halogen group, and a halogenated alkyl group. However, $R^{61}$ is any of a halogen group and a halogenated alkyl group, and $R^{63}$ is any of a halogen group and a halogenated alkyl group. $R^{62}$ is any of a hydrogen group, an alkyl group, a halogen group, and a halogenated alkyl group. Further, a6, e6, and n6 are an integer of 1 or 2, b6 and d6 are an integer of 1 to 4, c6 is an integer of 0 to 4, and f6 and m6 are an integer of 1 to 3.

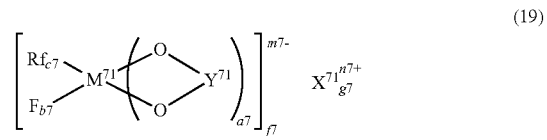

(19)

Herein, $X^{71}$ is any of a Group 1 element and a Group 2 element in the long period periodic table. $M^{71}$ is any of a transition metal and a Group 13 element, a Group 14 element, and a Group 15 element in the long period periodic table. $R_f$ is any of a fluorinated alkyl group and a fluorinated aryl group, and the number of carbon atoms in each of the fluorinated alkyl group and the fluorinated aryl group is 1 to 10. $Y^{71}$ is any of —C(=O)—$(CR^{71}_2)_{d7}$—C(=O)—, —$R^{72}_2$C—$(CR^{71}_2)_{d7}$—C(=O)—, —$R^{72}_2$C—$(CR^{71}_2)_{d7}$—$CR^{72}_2$—, —$R^{72}_2$C—$(CR^{71}_2)_{d7}$—S(=O)$_2$—, —S(=O)$_2$—$(CR^{71}_2)_{e7}$—S(=O)$_2$—, and —C(=O)—$(CR^{71}_2)_{e7}$—S(=O)$_2$—. However, $R^{71}$ is any of a hydrogen group, an alkyl group, a halogen group, and a halogenated alkyl group, $R^{72}$ is any of a hydrogen group, an alkyl group, a halogen group, and a halogenated alkyl group, and $R^{72}$ is any of a halogen group and a halogenated alkyl group. Further, a7, f7, and n7 are an integer of 1 or 2, b7, c7, and e7 are an integer of 1 to 4, d7 is an integer of 0 to 4, and g7 and m7 are an integer of 1 to 3.

The Group 1 element represents hydrogen <H>, lithium <Li>, sodium <Na>, potassium <K>, rubidium <Rb>, cesium <Cs>, and francium <Fr>. The Group 2 element represents beryllium <Be>, magnesium <Mg>, calcium <Ca>, strontium <Sr>, barium <Ba>, and radium <Ra>. The Group 13 element represents boron <B>, aluminum <Al>, gallium <Ga>, indium <In>, and thallium <Tl>. The Group 14 element represents carbon <C>, silicon <Si>, germanium <Ge>, tin <Sn>, and lead <Pb>. The Group 15 element represents nitrogen <N>, phosphorus <P>, arsenic <As>, antimony <Sb>, and bismuth <Bi>.

Specific examples of the compound shown in Formula (17) may include compounds represented by Formula (17-1) to Formula (17-6). Specific examples of the compound shown in Formula (18) may include compounds represented by Formula (18-1) to Formula (18-8). Specific examples of the compound shown in Formula (19) may include a compound represented by Formula (19-1).

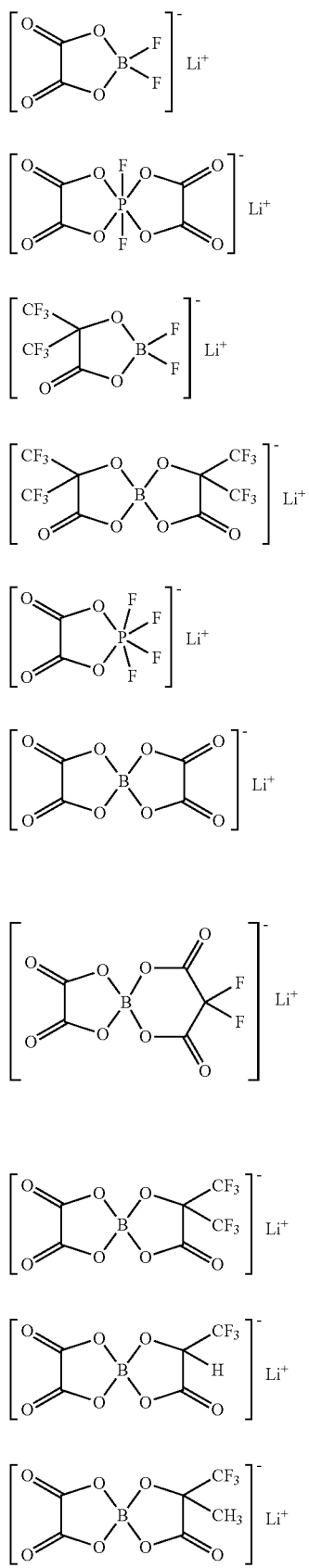

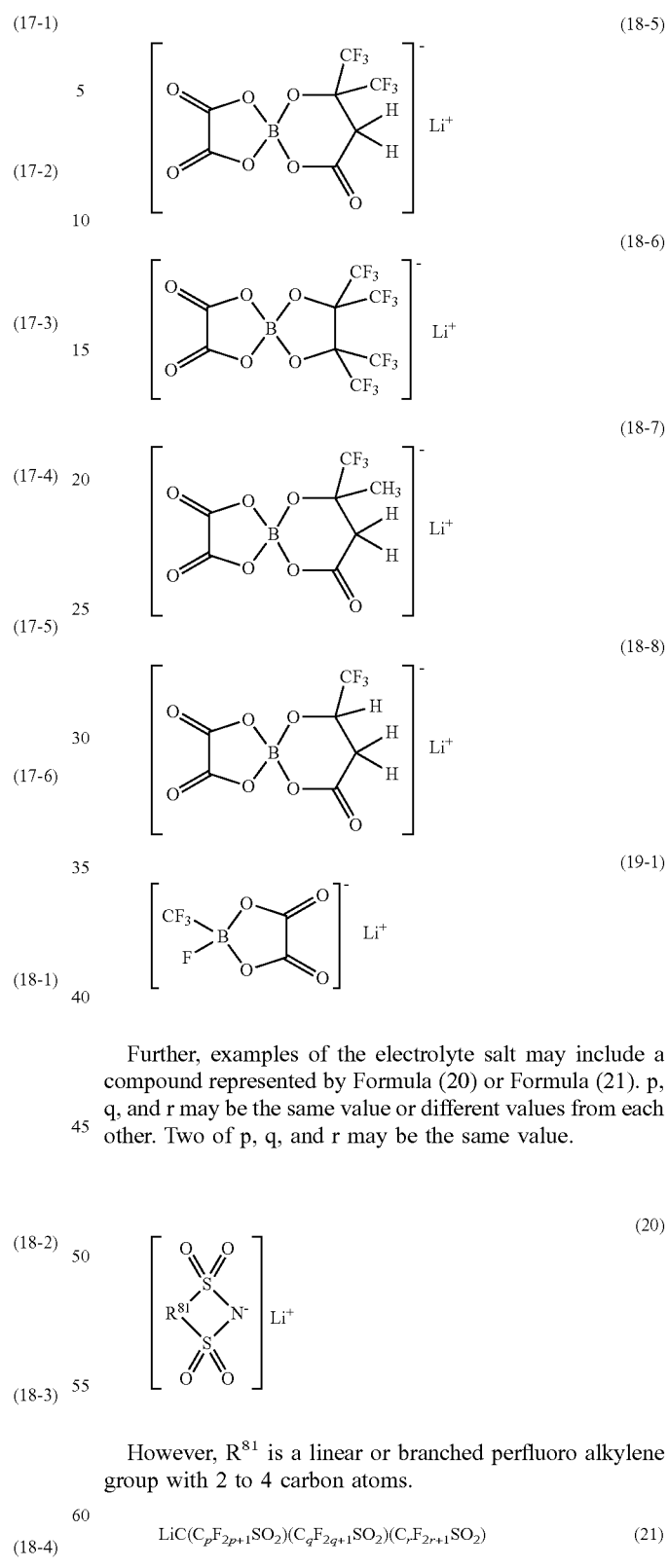

Further, examples of the electrolyte salt may include a compound represented by Formula (20) or Formula (21). p, q, and r may be the same value or different values from each other. Two of p, q, and r may be the same value.

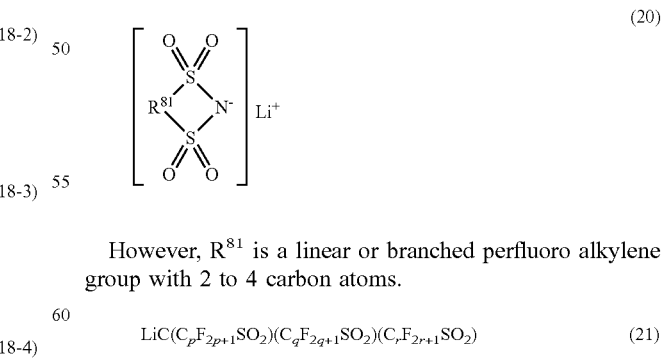

However, $R^{81}$ is a linear or branched perfluoro alkylene group with 2 to 4 carbon atoms.

$$\text{LiC}(C_pF_{2p+1}SO_2)(C_qF_{2q+1}SO_2)(C_rF_{2r+1}SO_2) \tag{21}$$

However, p, q, and r are an integer of 1 or more.

The compound shown in Formula (20) is a cyclic imide compound. Specific examples of the cyclic imide compound may include compounds represented by Formula (20-1) to Formula (20-4).

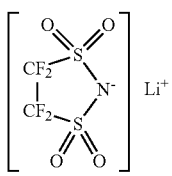

(20-1)

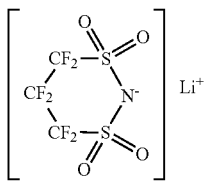

(20-2)

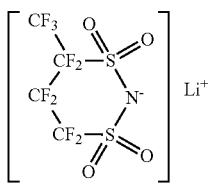

(20-3)

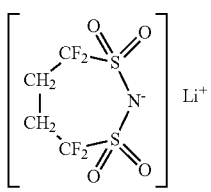

(20-4)

The compound shown in Formula (21) is a chain methyde compound. Specific example of the chain methyde compound may include lithium tristrifluoromethanesulfonylmethyde <LiC(CF$_3$SO$_2$)$_3$>.

The content of the electrolyte salt is not particularly limited, but is preferably 0.3 mol/kg to 3.0 mol/kg with respect to the solvent from the viewpoint of achieving high ionic conductivity. In the case of calculating the content of the electrolyte salt, the amount of the electrolyte salt may include amounts of the first compound, lithium monofluorophosphate, and lithium difluorophosphate. Further, the amount of the solvent may include amounts of the second compound, the third compound, sulfonic acid ester, acid anhydride, cyclic carboxylic acid ester, dialkyl sulfoxide, chain carbonic acid diester, aromatic carbonic acid ester, cyclic carbonic acid ester, chain carbonic acid monoester, chain carboxylic acid ester, and phosphoric acid ester.

The inherent viscosity of the non-aqueous electrolytic solution is not particularly limited, but is preferably 10 mPa/s or less at 25° C. from the viewpoint of ensuring dissociation of the electrolyte salt, ion mobility, and the like.

In particular, when the non-aqueous electrolytic solution contains any one or two or more kinds of sulfonic acid ester, acid anhydride, cyclic carboxylic acid ester, dialkyl sulfoxide, chain carbonic acid diester, aromatic carbonic acid ester, cyclic carbonic acid ester, chain carbonic acid monoester, chain carboxylic acid ester, phosphoric acid ester, lithium monofluorophosphate, and lithium difluorophosphate, higher effect can be achieved.

In addition, when the non-aqueous electrolytic solution contains at least one of lithium hexafluorophosphate and lithium tetrafluoroborate, higher effect can be achieved.

Incidentally, the present disclosure may also be configured as below.

[A01]<<Secondary Battery Charging Method: First Aspect>>

A secondary battery charging method in which constant current charging is performed until a first predetermined voltage $V_0$ is attained, constant voltage charging is then performed at the first predetermined voltage $V_0$, the first constant voltage charging is completed when a charge current becomes $(I_n-\Delta I_n)$ from $I_n$, and then n is incremented by one, and constant voltage charging is performed at a voltage $V_n=V_{n-1}+\Delta V_n$, a step of completing the n-th constant voltage charging when the charge current becomes $(I_n-\Delta I_n)$ from $I_n$ is repeated by incrementing n by one, and the N-th constant voltage charging in which a value of the voltage $V_n$ reaches a second predetermined voltage $V_N$ ($>V_0$) is completed to terminate the constant voltage charging.

[A02]<<Secondary Battery Charging Method: Second Aspect>>

A secondary battery charging method in which when a value of a constant current in constant current charging is regarded as $I_0$, constant current charging is performed by combining a constant current value $k_1 \cdot I_0$ (provided that, $0.4<k_1<1$) and the constant current value $I_0$, and then constant voltage charging is performed.

[A03] The secondary battery charging method described in [A02], in which constant current charging is performed until a first predetermined voltage $V_0$ is attained, constant voltage charging is then performed at the first predetermined voltage $V_0$, the first constant voltage charging is completed when a charge current becomes $(I_n-\Delta I_n)$ from $I_n$, and then n is incremented by one, and constant voltage charging is performed at a voltage $V_n=V_{n-1}+\Delta V_n$, a step of completing the n-th constant voltage charging when the charge current becomes $(I_n-\Delta I_n)$ from $I_n$ is repeated by incrementing n by one, and the N-th constant voltage charging in which a value of the voltage $V_n$ reaches a second predetermined voltage $V_N$ ($>V_0$) is completed to terminate the constant voltage charging.

[A04] The secondary battery charging method described in [A02] or [A03], in which constant current charging is performed at the constant current value $I_0$, and then constant current charging is performed at the constant current value $k_1 \cdot I_0$.

[A05] The secondary battery charging method described in any one of [A02] to [A04], in which constant current charging is further performed by combination with a constant current value $k_2 \cdot I_0$ (provided that, $1<k_2<1.6$).

[A06] The secondary battery charging method described in [A05], in which the constant current charging is performed at the constant current value $k_2 \cdot I_0$ before the constant current charging is performed at the constant current value $I_0$.

[A07] The secondary battery charging method described in any one of [A02] to [A06], in which when an average value of a negative electrode diffusion time constant during the constant current charging at the constant current value $I_0$ is regarded as A (sec) and an average value of a negative electrode diffusion time constant during the constant current charging at the constant current value $k_1 \cdot I_0$ is regarded as B (sec), the following in equation is satisfied.

$$0.1 \leq B/A \leq 5$$

[A08] The secondary battery charging method described in any one of [A01] to [A07], in which an SOC value at the time of completion of the constant current charging is 30% or more and 90% or less, provided that, the SOC value is defined by the following equation.

SOC value=(Electrical quantity having been charged)/(Full charge capacity)×100(%)

[A09] The secondary battery charging method described in [A08], in which the SOC value at the time of completion of the constant current charging is 70% or more and 90% or less.
[A10] The secondary battery charging method described in any one of [A01] to [A09], in which the SOC value at the time of completion of the constant current charging is lowered as the number of charge and discharge cycles is increased.
[A11] The secondary battery charging method described in any one of [A01], [A03], and [A04] to [A10] that depend from [A03], in which the following in equation is satisfied.

$$0.95 \times V_N \le V_0 \le 0.99 \times V_N$$

[A12] The secondary battery charging method described in any one of [A01], [A03], and [A04] to [A11] that depend from [A03], in which the second predetermined voltage $V_N$ is equal to or less than a set voltage.
[A13] The secondary battery charging method described in any one of [A01], [A03], and [A04] to [A12] that depend from [A03], in which the value of N is 3 to 8.
[A14] The secondary battery charging method described in any one of [A01], [A03], and [A04] to [A13] that depend from [A03], in which the value of $\Delta V_n$ is positive.
[A15] The secondary battery charging method described in [A14], in which the value of $\Delta V_n$ is 1.05 V or less.
[A16] The secondary battery charging method described in any one of [A01], [A03], and [A04] to [A13] that depend from [A03], in which the value of $\Delta V_n$ is positive and negative.
[A17] The secondary battery charging method described in any one of [A01] to [A16], in which the secondary battery is a lithium ion secondary battery, and
a negative electrode is formed by a graphite material, silicon, or a mixed material of the graphite material and silicon.
[A18] The secondary battery charging method described in [A17], in which an area density of the negative electrode is 10 mg/cm² to 51 mg/cm².
[A19] The secondary battery charging method described in [A17], in which a volume density of the negative electrode is 1.1 g/cm³ to 3 g/cm³.
[A20] The secondary battery charging method described in any one of [A01] to [A19], in which a value obtained by dividing a charge current value by a value of the first discharge capacity at 0.05 C is 0.2 or more and 100 or less.
[B01] The secondary battery charging method described in any one of [A01] to [A20], in which the secondary battery is configured as a lithium ion secondary battery in which a structure obtained by spirally winding or laminating a positive electrode, a separator, and a negative electrode is contained in an outer package member and an electrolyte is filled.
[B02] The secondary battery charging method described in [B01], in which the outer package member has a laminate structure of a plastic material layer, a metal layer, and a plastic material layer.
[B03] The secondary battery charging method described in [B01] or [B02], in which the electrolyte is formed from a gel electrolyte.

[B04] The secondary battery charging method described in any one of [B01] to [B03], in which a material for forming the separator is a polypropylene resin, a polyethylene resin, or a polyimide resin.
[C01] The secondary battery charging method described in any one of [B01] to [B04], in which the electrolyte is formed from a non-aqueous electrolytic solution,
the non-aqueous electrolytic solution contains
a compound represented by Formula (1),
at least one compound of a compound represented by Formula (2-A) and a compound represented by Formula (2-B), and
at least one compound of compounds represented by Formula (3-A) to Formula (3-F), and
a content of the compound represented by Formula (1) is 2.5 mol/L to 6 mol/L, and preferably 3 mol/L to 6 mol/L.

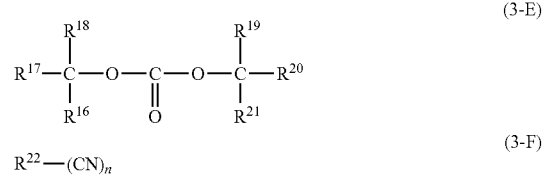

Here,
in Formula (1), M is a metal element, each of $Z^1$ and $Z^2$ is any of a fluorine group, a monovalent hydrocarbon group, and a monovalent fluorinated hydrocarbon group, at least one of $Z^1$ and $Z^2$ is any of a fluorine group and a monovalent fluorinated hydrocarbon group, and each of $Y^1$ and $Y^2$ is any of a sulfonyl group and a carbonyl group;

in Formula (2-A), $R^1$ is a monovalent hydrocarbon group;

in Formula (2-B), $R^2$ is a monovalent hydrocarbon group, and X is a group in which one or two or more ether bonds and one or two or more divalent hydrocarbon groups are bound in an arbitrary order;

in Formula (3-A), each of $R^3$ and $R^4$ is any of a hydrogen group and a monovalent hydrocarbon group;

in Formula (3-B), each of $R^5$, $R^6$, $R^7$, and $R^8$ is any of a hydrogen group, a monovalent saturated hydrocarbon group, and a monovalent unsaturated hydrocarbon group, and at least one of $R^5$, $R^6$, $R^7$, and $R^8$ is a monovalent unsaturated hydrocarbon group;

in Formula (3-C), $R^9$ is a group represented by $>CR^{10}R^{11}$, and each of $R^{10}$ and $R^{11}$ is any of a hydrogen group and a monovalent hydrocarbon group;

in Formula (3-D), each of $R^{12}$, $R^{13}$, $R^{14}$, and $R^{15}$ is any of a hydrogen group, a halogen group, a monovalent hydrocarbon group, and a monovalent halogenated hydrocarbon group and at least one of $R^{12}$, $R^{13}$, $R^{14}$, and $R^{15}$ is any of a halogen group and a monovalent halogenated hydrocarbon group;

in Formula (3-E), each of $R^{16}$, $R^{17}$, $R^{18}$, $R^{19}$, $R^{20}$, and $R^{21}$ is any of a hydrogen group, a halogen group, a monovalent hydrocarbon group, and a monovalent halogenated hydrocarbon group and at least one of $R^{16}$, $R^{17}$, $R^{18}$, $R^{19}$, $R^{20}$, and $R^{21}$ is any of a halogen group and a monovalent halogenated hydrocarbon group; and in Formula (3-F), $R^{22}$ is an n-valent (provided that, n is an integer of 2 or more) hydrocarbon group.

[C02] The secondary battery charging method described in [C01], in which M is an alkali metal element, the monovalent hydrocarbon group is any of an alkyl group, an alkenyl group, an alkynyl group, a cycloalkyl group, an aryl group, and a group including two or more kinds of these groups bound to each other to have a monovalent, the monovalent fluorinated hydrocarbon group is a group in which at least one hydrogen group in the monovalent hydrocarbon group is substituted with a fluorine group, the divalent hydrocarbon group is any of an alkylene group, an alkenylene group, an alkynylene group, a cycloalkylene group, an arylene group, and a group including two or more kinds of these groups bound to each other, the monovalent saturated hydrocarbon group is any of an alkyl group, a cycloalkyl group, and a group including these groups bound to each other to have a monovalent, the monovalent unsaturated hydrocarbon group is any of an alkenyl group, an alkynyl group, an aryl group, a group including one or more kinds of these groups, and a group including two or more kinds of these groups bound to each other to have a monovalent, the halogen group is any of a fluorine group, a chlorine group, a bromine group, and an iodine group, and the monovalent halogenated hydrocarbon group is a group in which at least one hydrogen group in the monovalent hydrocarbon group is substituted with a halogen group.

[C03] The secondary battery charging method described in [C01] or [C02], in which M is lithium, the monovalent fluorinated hydrocarbon group is a perfluoroalkyl group, and X is a group represented by —O—Y— (provided that, Y is a divalent hydrocarbon group).

[C04] The secondary battery charging method described in any one of [C01] to [C03], in which the non-aqueous electrolytic solution contains at least one kind of sulfonic acid ester, acid anhydride, cyclic carboxylic acid ester, dialkyl sulfoxide, compounds represented by Formula (10) to Formula (15), lithium monofluorophosphate, and lithium difluorophosphate.

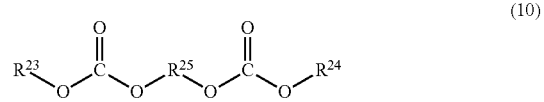

(10)

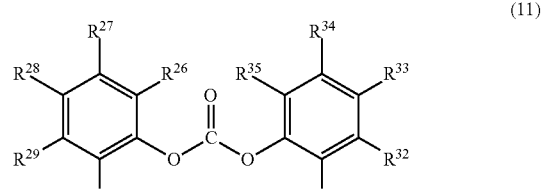

(11)

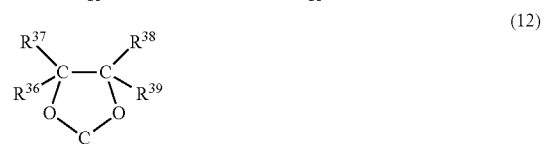

(12)

(13)

(14)

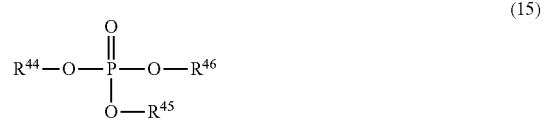

(15)

Here, each of $R^{23}$ and $R^{24}$ is any of a monovalent hydrocarbon group and a monovalent halogenated hydrocarbon group;

$R^{25}$ is any of a divalent hydrocarbon group and a divalent halogenated hydrocarbon group;

each of $R^{26}$, $R^{27}$, $R^{28}$, $R^{29}$, $R^{30}$, $R^{31}$, $R^{32}$, $R^{33}$, $R^{34}$, and $R^{35}$ is any of a monovalent hydrocarbon group, a monovalent oxygen-containing hydrocarbon group, a monovalent nitrogen-containing hydrocarbon group, a monovalent halogenated hydrocarbon group, a monovalent halogenated oxygen-containing hydrocarbon group, a monovalent halogenated nitrogen-containing hydrocarbon group, and a group including two or more kinds of these groups bound to each other to have a monovalent; each of $R^{36}$, $R^{37}$, $R^{38}$, and $R^{39}$ is any of a hydrogen group and a monovalent hydrocarbon group;

each of $R^{40}$ and $R^{41}$ is any of a hydrogen group and a monovalent hydrocarbon group;

each of $R^{42}$ and $R^{43}$ is any of a hydrogen group and a monovalent hydrocarbon group; and each of $R^{44}$, $R^{45}$, and $R^{46}$ is any of a monovalent hydrocarbon group and a monovalent halogenated hydrocarbon group.

[C05] The secondary battery charging method described in [C04], in which the divalent halogenated hydrocarbon group is a group in which at least one hydrogen group in the divalent hydrocarbon group is substituted with a halogen group, the halogen group is any of a fluorine group, a chlorine group, a bromine group, and an iodine group, the monovalent oxygen-containing hydrocarbon group is an alkoxy group, the monovalent nitrogen-containing hydrocarbon group is an alkylamino group, the monovalent halogenated oxygen-containing hydrocarbon group is a group in which at least one hydrogen group in the monovalent oxygen-containing hydrocarbon group is substituted with a halogen group, and the monovalent halogenated nitrogen-containing hydrocarbon group is a group in which at least one hydrogen group in the monovalent nitrogen-containing hydrocarbon group is substituted with a halogen group.

[C06] The secondary battery charging method described in any one of [C01] to [C05], in which the non-aqueous electrolytic solution contains at least one of lithium hexafluorophosphate and lithium tetrafluoroborate.

[C07] The secondary battery charging method described in any one of [C01] to [C06], in which the positive electrode contains a positive electrode active material that has ability to insert and extract an electrode reactant, the negative electrode contains a negative electrode active material that has ability to insert and extract an electrode reactant, an insulating material is provided between the positive electrode active material and the negative electrode active material, and the insulating material contains at least one of insulating ceramics and an insulating polymer compound.

[C08] The secondary battery charging method described in [C07], in which the insulating ceramics contains at least one of aluminum oxide, silicon oxide, magnesium oxide, titanium oxide, and zirconium oxide, and the insulating polymer compound contains at least one of a homopolymer of vinylidenefluoride and a copolymer of vinylidene fluoride.

[C09] The secondary battery charging method described in [C07] or [C08], in which a first insulating layer containing an insulating material is provided on the surface of the positive electrode active material.

[C10] The secondary battery charging method described in [C07] or [C08], in which a second insulating layer containing an insulating material is provided on the surface of the negative electrode.

[C11] The secondary battery charging method described in [C07] or [C08], in which a third insulating layer containing an insulating material is provided on the surface of the separator.

[D01]<<Charging Control Apparatus (or Charging Apparatus): First Aspect>>

A charging control apparatus (or a charging apparatus) configured to control charging of a secondary battery, the charging control apparatus (or the charging apparatus) performing, on the secondary battery, a process of:

performing constant current charging until a first predetermined voltage $V_0$ is attained, then performing constant voltage charging at the first predetermined voltage $V_0$, completing the first constant voltage charging when a charge current becomes $(I_n-\Delta I_n)$ from $I_n$, and then incrementing n by one, and performing constant voltage charging at a voltage $V_n=V_{n-1}+\Delta V_n$, repeating a step of completing the n-th constant voltage charging when the charge current becomes $(I_n-\Delta I_n)$ from $I_n$, by incrementing n by one, and completing the N-th constant voltage charging in which a value of the voltage $V_n$ reaches a second predetermined voltage $V_N$ ($>V_0$) to terminate the constant voltage charging.

[D02]<<Charging Control Apparatus (or Charging Apparatus): Second Aspect>>

A charging control apparatus (or a charging apparatus) configured to control charging of a secondary battery, the charging control apparatus (or the charging apparatus) performing, on the secondary battery, a process of:

when a value of a constant current in constant current charging is regarded as $I_0$, performing constant current charging by combining a constant current value $k_1 \cdot I_0$ (provided that, $0.4<k_1<1$) and the constant current value $I_0$, and then performing constant voltage charging.

[D03] The charging control apparatus (or the charging apparatus) described in [D02], in which the charging control apparatus (or the charging apparatus) performs a process of performing constant current charging until a first predetermined voltage $V_0$ is attained, then performing constant voltage charging at the first predetermined voltage $V_0$, completing the first constant voltage charging when a charge current becomes $(I_n-\Delta I_n)$ from $I_n$, and then incrementing n by one, and performing constant voltage charging at a voltage $V_n=V_{n-1}+\Delta V_n$, repeating a step of completing the n-th constant voltage charging when the charge current becomes $(I_n-\Delta I_n)$ from $I_n$, by incrementing n by one, and completing the N-th constant voltage charging in which a value of the voltage $V_n$ reaches a second predetermined voltage $V_N$ ($>V_0$) to terminate the constant voltage charging.

[D04] The charging control apparatus (or the charging apparatus) described in any one of [D01] to [D03], in which an SOC value at the time of completion of the constant current charging is 30% or more and 90% or less, provided that, the SOC value is defined by the following equation.

$$SOC \text{ value} = (\text{Electrical quantity having been charged})/(\text{Full charge capacity}) \times 100(\%)$$

[D05] The charging control apparatus (or the charging apparatus) described in any one of [D01], [D03], and [D04] that depends from [D03], in which the following in equation is satisfied.

$$0.95 \times V_N \leq V_0 \leq 0.99 \times V_N$$

[D06] The charging control apparatus (or the charging apparatus) described in any one of [D01], [D03], and [D04] and [D05] that depend from [D03], in which the second predetermined voltage $V_N$ is equal to or less than a set voltage.

[D07] The charging control apparatus (or the charging apparatus) described in any one of [D01], [D03], and [D04] to [D06] that depend from [D03], in which the value of N is 3 to 8.

[D08] The charging control apparatus (or the charging apparatus) described in any one of [D01], [D03], and [D04] to [D07] that depend from [D03], in which the value of $\Delta V_n$ is positive.

[D09] The charging control apparatus (or the charging apparatus) described in [D08], in which the value of $\Delta V_n$ is 1.05 V or less.

[D10] The charging control apparatus (or the charging apparatus) described in any one of [D01], [D03], and [D04] to [D07] that depend from [D03], in which the value of $\Delta V_n$ is positive and negative.

[D11] The charging control apparatus (or the charging apparatus) described in any one of [D01] to [D10], in which the secondary battery is a lithium ion secondary battery, and a negative electrode is formed by a graphite material, silicon, or a mixed material of the graphite material and silicon.

[D12] The charging control apparatus (or the charging apparatus) described in [D11], in which an area density of the negative electrode is 10 mg/cm$^2$ to 51 mg/cm$^2$.

[D13] The charging control apparatus (or the charging apparatus) described in [D11], in which a volume density of the negative electrode is 1.1 g/cm$^3$ to 3 g/cm$^3$.

[D14] The charging control apparatus (or the charging apparatus) described in any one of [D01] to [D13], in which a value obtained by dividing a charge current value by a value of the first discharge capacity at 0.05 C is 0.2 or more and 100 or less.

[E01]<<Secondary Battery: First Aspect>>

A secondary battery on which a process of performing constant current charging until a first predetermined voltage $V_0$ is attained, then performing constant voltage charging at the first predetermined voltage $V_0$, completing the first constant voltage charging when a charge current becomes $(I_n-\Delta I_n)$ from $I_n$, and then incrementing n by one, and performing constant voltage charging at a voltage $V_n=V_{n-1}+\Delta V_n$, repeating a step of completing the n-th constant voltage charging when the charge current becomes $(I_n-\Delta I_n)$ from $I_n$, by incrementing n by one, and completing the N-th constant voltage charging in which a value of the voltage $V_n$ reaches a second predetermined voltage $V_N$ ($>V_0$) to terminate the constant voltage charging, is performed.

[E02]<<Secondary Battery: Second Aspect>>

A secondary battery on which a process of, when a value of a constant current in constant current charging is regarded as $I_0$, performing constant current charging by combining a constant current value $k_1 \cdot I_0$ (provided that, $0.4<k_1<1$) and the constant current value $I_0$, and then performing constant voltage charging, is performed.

[E03] The secondary battery described in [E02], on which a process of performing constant current charging until a first predetermined voltage $V_0$ is attained, then performing constant voltage charging at the first predetermined voltage $V_0$, completing the first constant voltage charging when a charge current becomes $(I_n-\Delta I_n)$ from $I_n$, and then incrementing n by one, and performing constant voltage charging at a voltage $V_n=V_{n-1}+\Delta V_n$, repeating a step of completing the n-th constant voltage charging when the charge current becomes $(I_n-\Delta I_n)$ from $I_n$, by incrementing n by one, and completing the N-th constant voltage charging in which a value of the voltage $V_n$ reaches a second predetermined voltage $V_N$ ($>V_0$) to terminate the constant voltage charging, is performed.

[E04] The secondary battery described in any one of [E01] to [E03], in which an SOC value at the time of completion of the constant current charging is 30% or more and 90% or less, provided that, the SOC value is defined by the following equation.

$SOC$ value=(Electrical quantity having been charged)/(Full charge capacity)×100(%)

[E05] The secondary battery described in any one of [E01], [E03], and [E04] that depends from [E03], in which the following in equation is satisfied.

$0.95 \times V_N \leq V_0 \leq 0.99 \times V_N$

[E06] The secondary battery described in any one of [E01], [E03], and [E04] and [E05] that depend from [E03], in which the second predetermined voltage $V_N$ is equal to or less than a set voltage.

[E07] The secondary battery described in anyone of [E01], [E03], and [E04] to [E06] that depend from [E03], in which the value of N is 3 to 8.

[E08] The secondary battery described in any one of [E01], [E03], and [E04] to [E07] that depend from [E03], in which the value of $\Delta V_n$ is positive.

[E09] The secondary battery described in [E08], in which the value of $\Delta V_n$ is 1.05 V or less.

[E10] The secondary battery described in anyone of [E01], [E03], and [E04] to [E07] that depend from [E03], in which the value of $\Delta V_n$ is positive and negative.

[E11] The secondary battery described in any one of [E01] to [E10], in which the secondary battery is a lithium ion secondary battery, and a negative electrode is formed by a graphite material, silicon, or a mixed material of the graphite material and silicon.

[E12] The secondary battery described in [E11], in which an area density of the negative electrode is 10 mg/cm$^2$ to 51 mg/cm$^2$.

[E13] The secondary battery described in [E11], in which a volume density of the negative electrode is 1.1 g/cm$^3$ to 3 g/cm$^3$.

[E14] The secondary battery described in any one of [E01] to [E13], in which a value obtained by dividing a charge current value by a value of the first discharge capacity at 0.05 C is 0.2 or more and 100 or less.

[F01]<<Battery Pack>>

A battery pack including:

a secondary battery;

the charging control apparatus described in any one of [D01] to [D14] configured to control charging of the secondary battery;

a controller configured to control an operation of the secondary battery; and a switch section configured to switch the operation of the secondary battery in accordance with an instruction of the controller.

[F02]<<Electric Vehicle>>

An electric vehicle including:

a secondary battery;

a conversion section configured to convert electric power supplied from the secondary battery into drive power;

a drive section driven in accordance with the drive power;

the charging control apparatus described in any one of [D01] to [D14] configured to control charging of the secondary battery; and a controller configured to control an operation of the secondary battery.

[F03]<<Electric Power Storage System>>

An electric power storage system including:

a secondary battery;

one or two or more electrical apparatuses to which electric power is supplied from the secondary battery;

the charging control apparatus described in any one of [D01] to [D14] configured to control charging of the secondary battery; and a controller configured to control electric power supply from the secondary battery to the electrical apparatuses.

[F04]<<Electric Power Tool>>

An electric power tool including:

a secondary battery;

a movable section to which electric power is supplied from the secondary battery; and the charging control apparatus described in any one of [D01] to [D14] configured to control charging of the secondary battery.

[F05]<<Electronic Apparatus>>

An electronic apparatus including:

a secondary battery as an electric power supply source; and the charging control apparatus described in any one of [D01] to [D14] configured to control charging of the secondary battery.

[F06]<<Battery Pack>>

A battery pack including:

the secondary battery described in any one of [E01] to [E14];

a charging control apparatus configured to control charging of the secondary battery;

a controller configured to control an operation of the secondary battery; and a switch section configured to switch the operation of the secondary battery in accordance with an instruction of the controller.

[F07]<<Electric Vehicle>>

An electric vehicle including:

the secondary battery described in any one of [E01] to [E14];

a conversion section configured to convert electric power supplied from the secondary battery into drive power;

a drive section driven in accordance with the drive power;

a charging control apparatus configured to control charging of the secondary battery; and a controller configured to control an operation of the secondary battery.

[F08]<<Electric Power Storage System>>

An electric power storage system including:

the secondary battery described in any one of [E01] to [E14];

one or two or more electrical apparatuses to which electric power is supplied from the secondary battery;

a charging control apparatus configured to control charging of the secondary battery; and a controller configured to control electric power supply from the secondary battery to the electrical apparatuses.

[F09]<<Electric Power Tool>>

An electric power tool including:

the secondary battery described in any one of [E01] to [E14];

a movable section to which electric power is supplied from the secondary battery; and a charging control apparatus configured to control charging of the secondary battery.

[F10]<<Electronic Apparatus>>

An electronic apparatus including:

the secondary battery described in any one of [E01] to [E14] as an electric power supply source; and a charging control apparatus configured to control charging of the secondary battery.

REFERENCE SIGNS LIST

10 Outer package member
11 Adhesive film
20 Spirally wound electrode body (structure)
21 Positive electrode lead
22 Negative electrode lead
23 Positive electrode
23A Positive electrode current collector
23B Positive electrode active material layer
24 Negative electrode
24A Negative electrode current collector
24B Negative electrode active material layer
25 Separator
26 Electrolyte layer
27 Protective tape
111 Battery can
112, 113 Insulating plate
114 Battery cover
115 Safety valve mechanism
115A Disk plate
116 Positive temperature coefficient device (PTC device)
117 Gasket
118 Center pin
119A Positive electrode lead
119B Negative electrode lead
211 Positive electrode active material
212 Active material insulating layer
213 Negative electrode insulating layer
214 Separator insulating layer
1001 Cell (assembled battery)
1002 Magnesium secondary battery
1010 Controller
1011 Memory
1012 Voltage measurement section
1013 Current measurement section
1014 Current detection resistor
1015 Temperature measurement section
1016 Temperature detecting element
1020 Switch controller
1021 Switch section
1022 Charge control switch
1024 Discharge control switch
1023, 1025 Diode
1031 Positive electrode terminal
1032 Negative electrode terminal
CO, DO Control signal
2000 Housing
2001 Controller
2002 Various sensors
2003 Power source
2010 Engine
2011 Electric generator
2012, 2013 Inverter
2014 Driving motor
2015 Differential
2016 Transmission
2017 Clutch
2021 Front drive shaft
2022 Front tire
2023 Rear drive shaft
2024 Rear tire
3000 House
3001 Controller
3002 Power source
3003 Smart meter
3004 Power hub
3010 Electrical device (electronic device)
3011 Electric vehicle
3021 Private power generator
3022 Concentrating electric power system
4000 Tool body
4001 Controller
4002 Power source
4003 Drill section

The invention claimed is:

1. A secondary battery charging method in which constant current charging is performed until a first predetermined voltage $V_0$ is attained, constant voltage charging is then performed at the first predetermined voltage $V_0$, the first constant voltage charging is completed when a charge current becomes $(I_n-\Delta I_n)$ from $I_n$, and then n is incremented by one, and constant voltage charging is performed at a voltage $V_n=V_{n-1}+\Delta V_n$, a step of completing a $n^{th}$ constant voltage charging when the charge current becomes $(I_n-\Delta I_n)$ from L is repeated by incrementing n by one, and a $N^{th}$ constant voltage charging in which a value of the voltage $V_n$ reaches a second predetermined voltage $V_N$ ($>V_0$) is completed to terminate the constant voltage charging.

2. A secondary battery charging method in which when a value of a constant current in constant current charging is regarded as $I_0$, constant current charging is performed by combining a constant current value $k_1 \cdot I_0$ (provided that, $0.4<k_1<1$) and the constant current value $I_0$, and then constant voltage charging is performed.

3. The secondary battery charging method according to claim 2, wherein constant current charging is performed until a first predetermined voltage $V_0$ is attained, constant voltage charging is then performed at the first predetermined voltage $V_0$, the first constant voltage charging is completed when a charge current becomes $(I_n-\Delta I_n)$ from $I_n$, and then n is incremented by one, and constant voltage charging is performed at a voltage $V_n=V_{n-1}+\Delta V_n$, a step of completing a $n^{th}$ constant voltage charging when the charge current becomes $(I_n-\Delta I_n)$ from L is repeated by incrementing n by one, and a $N^{th}$ constant voltage charging in which a value of the voltage $V_n$ reaches a second predetermined voltage $V_N$ ($>V_0$) is completed to terminate the constant voltage charging.

4. The secondary battery charging method according to claim 2, wherein constant current charging is performed at the constant current value $I_0$, and then constant current charging is performed at the constant current value $k_1 \cdot I_0$.

5. The secondary battery charging method according to claim 2, wherein constant current charging is further performed by combination with a constant current value $k_2 \cdot I_0$ (provided that, $1<k_2<1.6$).

6. The secondary battery charging method according to claim 5, wherein the constant current charging is performed at the constant current value $k_2 \cdot I_0$ before the constant current charging is performed at the constant current value $I_0$.

7. The secondary battery charging method according to claim 2, wherein when an average value of a negative electrode diffusion time constant during the constant current charging at the constant current value $I_0$ is regarded as A (sec) and an average value of a negative electrode diffusion time constant during the constant current charging at the constant current value $k_1 \cdot I_0$ is regarded as B (sec), the following inequation is satisfied.

$0.1 \leq B/A \leq 5$

8. The secondary battery charging method according to claim 1, wherein an SOC value at the time of completion of the constant current charging is 30% or more and 90% or less, provided that, the SOC value is defined by the following equation.

SOC value=(Electrical quantity having been charged)/(Full charge capacity)×100(%)

9. The secondary battery charging method according to claim 8, wherein the SOC value at the time of completion of the constant current charging is 70% or more and 90% or less.

10. The secondary battery charging method according to claim 8, wherein the SOC value at the time of completion of the constant current charging is lowered as the number of charge and discharge cycles is increased.

11. The secondary battery charging method according to claim 1, wherein the following inequation is satisfied.

$0.95 \times V_N \leq V_0 \leq 0.99 \times V_N$

12. The secondary battery charging method according to claim 1, wherein a value obtained by dividing a charge current value by a value of a first discharge capacity at 0.05 C is 0.2 or more and 100 or less.

13. A charging control apparatus configured to control charging of a secondary battery, the charging control apparatus performing, on the secondary battery, a process of:

performing constant current charging until a first predetermined voltage $V_0$ is attained, then performing constant voltage charging at the first predetermined voltage $V_0$, completing the first constant voltage charging when a charge current becomes $(I_n-\Delta I_n)$ from $I_n$, and then incrementing n by one, and performing constant voltage charging at a voltage $V_n=V_{n-1}+\Delta V_n$, repeating a step of completing a $n^{th}$ constant voltage charging when the charge current becomes $(I_n-\Delta I_n)$ from $I_n$, by incrementing n by one, and completing a $N^{th}$ constant voltage charging in which a value of the voltage $V_n$ reaches a second predetermined voltage $V_N$ ($>V_0$) to terminate the constant voltage charging.

14. A charging control apparatus configured to control charging of a secondary battery, the charging control apparatus performing, on the secondary battery, a process of:

when a value of a constant current in constant current charging is regarded as $I_0$, performing constant current charging by combining a constant current value $k_1 \cdot I_0$ (provided that, $0.4<k_1<1$) and the constant current value $I_0$, and then performing constant voltage charging.

15. The charging control apparatus according to claim 14, wherein the charging control apparatus performs a process of performing constant current charging until a first predetermined voltage $V_0$ is attained, then performing constant voltage charging at the first predetermined voltage $V_0$, completing the first constant voltage charging when a charge current becomes $(I_n-\Delta I_n)$ from $I_n$, and then incrementing n by one, and performing constant voltage charging at a voltage $V_n=V_{n-1}+\Delta V_n$, repeating a step of completing a $n^{th}$ constant voltage charging when the charge current becomes $(I_n-\Delta I_n)$ from $I_n$, by incrementing n by one, and completing a $N^{th}$ constant voltage charging in which a value of the voltage $V_n$ reaches a second predetermined voltage $V_N$ ($>V_0$) to terminate the constant voltage charging.

16. A secondary battery on which a process of performing constant current charging until a first predetermined voltage $V_0$ is attained, then performing constant voltage charging at the first predetermined voltage $V_0$, completing the first constant voltage charging when a charge current becomes $(I_n-\Delta I_n)$ from $I_n$, and then incrementing n by one, and performing constant voltage charging at a voltage $V_n=V_{n-1}+\Delta V_n$, repeating a step of completing a $n^{th}$ constant voltage charging when the charge current becomes $(I_n-\Delta I_n)$ from $I_n$, by incrementing n by one, and completing a $N_{th}$ constant voltage charging in which a value of the voltage $V_n$ reaches a second predetermined voltage $V_N$ ($>V_0$) to terminate the constant voltage charging, is performed.

17. A secondary battery on which a process of, when a value of a constant current in constant current charging is regarded as $I_0$, performing constant current charging by combining a constant current value $k_1 \cdot I_0$ (provided that, $0.4<k_1<1$) and the constant current value $I_0$, and then performing constant voltage charging, is performed.

18. The secondary battery according to claim 17, on which a process of performing constant current charging until a first predetermined voltage $V_0$ is attained, then performing constant voltage charging at the first predetermined voltage $V_0$, completing the first constant voltage charging when a charge current becomes $(I_n-\Delta I_n)$ from $I_n$, and then incrementing n by one, and performing constant voltage charging at a voltage $V_n=V_{n-1}+\Delta V_n$, repeating a step of completing a $n^{th}$ constant voltage charging when the charge current becomes $(I_n-\Delta I_n)$ from $I_n$, by incrementing n by one, and completing a $N^{th}$ constant voltage charging in which a value of the voltage $V_n$ reaches a second predetermined voltage $V_N$ ($>V_0$) to terminate the constant voltage charging, is performed.

* * * * *